United States Patent
Lundberg et al.

(10) Patent No.: US 12,361,380 B2
(45) Date of Patent: *Jul. 15, 2025

(54) PATENT MAPPING

(71) Applicant: Black Hills IP Holdings, LLC, Minneapolis, MN (US)

(72) Inventors: Steven W. Lundberg, Edina, MN (US); Thomas G. Marlow, Portland, ME (US)

(73) Assignee: Black Hills IP Holdings, LLC, Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/589,635

(22) Filed: Jan. 31, 2022

(65) Prior Publication Data

US 2022/0230137 A1 Jul. 21, 2022

Related U.S. Application Data

(63) Continuation of application No. 16/730,678, filed on Dec. 30, 2019, now Pat. No. 11,301,810, which is a continuation of application No. 15/801,056, filed on Nov. 1, 2017, now Pat. No. 10,546,273, which is a
(Continued)

(51) Int. Cl.
   *G06F 15/16* (2006.01)
   *G06F 16/3331* (2025.01)
   *G06Q 10/10* (2023.01)

(52) U.S. Cl.
   CPC ......... *G06Q 10/10* (2013.01); *G06F 16/3331* (2019.01)

(58) Field of Classification Search
   None
   See application file for complete search history.

(56) References Cited

U.S. PATENT DOCUMENTS

| 4,807,154 A | 2/1989 | Scully et al. |
| 4,868,733 A | 9/1989 | Fujisawa et al. |
| 5,297,039 A | 3/1994 | Kanaegami et al. |

(Continued)

FOREIGN PATENT DOCUMENTS

| AU | 2006272510 | 2/2012 |
| AU | 2012200701 B2 | 5/2014 |

(Continued)

OTHER PUBLICATIONS

"U.S. Appl. No. 13/310,279, Corrected Notice of Allowability dated Mar. 8, 2022", 5 pgs.
(Continued)

*Primary Examiner* — Alex Gofman
(74) *Attorney, Agent, or Firm* — Schwegman Lundberg & Woessner, P.A.

(57) ABSTRACT

System and method permit patent mapping. A method may comprise maintaining a database of patent portfolios and a database of patents with each patent stored in the database of patents associated with one or more patent portfolios stored in the database of patent portfolios. A search query may be received associated with a first patent portfolio and the first portfolio may be searched as a function of the search query. Search results may be generate which include one or more patent claims associated with the search query. The one or more patent claims may be mapped to a patent concept.

20 Claims, 24 Drawing Sheets

Related U.S. Application Data continuation of application No. 12/605,030, filed on Oct. 23, 2009, now abandoned.

(60) Provisional application No. 61/107,930, filed on Oct. 23, 2008.

(56) References Cited

U.S. PATENT DOCUMENTS

| | | |
|---|---|---|
| 5,329,447 A | 7/1994 | Leedom, Jr. |
| 5,404,506 A | 4/1995 | Fujisawa et al. |
| 5,410,646 A | 4/1995 | Tondevold et al. |
| 5,530,852 A | 6/1996 | Meske et al. |
| 5,548,506 A | 8/1996 | Srinivasan |
| 5,548,753 A | 8/1996 | Linstead et al. |
| 5,553,226 A | 9/1996 | Kiuchi et al. |
| 5,555,408 A | 9/1996 | Fujisawa et al. |
| 5,557,515 A | 9/1996 | Abbruzzese et al. |
| 5,592,664 A | 1/1997 | Starkey |
| 5,623,679 A | 4/1997 | Rivette et al. |
| 5,623,681 A | 4/1997 | Rivette et al. |
| 5,644,740 A | 7/1997 | Kiuchi |
| 5,659,729 A | 8/1997 | Nielsen |
| 5,664,063 A | 9/1997 | Johnson et al. |
| 5,664,714 A | 9/1997 | Navarro et al. |
| 5,694,523 A | 12/1997 | Wical |
| 5,696,916 A | 12/1997 | Yamazaki et al. |
| 5,699,528 A | 12/1997 | Hogan |
| 5,706,497 A | 1/1998 | Takahashi et al. |
| 5,721,910 A | 2/1998 | Unger et al. |
| 5,742,834 A | 4/1998 | Kobayashi |
| 5,745,745 A | 4/1998 | Tada et al. |
| 5,754,840 A | 5/1998 | Rivette et al. |
| 5,758,328 A | 5/1998 | Giovannoli |
| 5,768,580 A | 6/1998 | Wical |
| 5,774,833 A | 6/1998 | Newman |
| 5,787,411 A | 7/1998 | Groff et al. |
| 5,794,236 A | 8/1998 | Mehrle |
| 5,799,325 A | 8/1998 | Rivette et al. |
| 5,809,318 A | 9/1998 | Rivette et al. |
| 5,850,520 A | 12/1998 | Greibenow et al. |
| 5,870,745 A | 2/1999 | McCune |
| 5,895,468 A | 4/1999 | Whitmyer, Jr. |
| 5,903,881 A | 5/1999 | Schrader et al. |
| 5,907,837 A | 5/1999 | Ferrel et al. |
| 5,926,811 A | 7/1999 | Miller et al. |
| 5,940,821 A | 8/1999 | Wical |
| 5,953,726 A | 9/1999 | Carter et al. |
| 5,970,463 A | 10/1999 | Cave et al. |
| 5,991,751 A | 11/1999 | Rivette et al. |
| 5,991,756 A | 11/1999 | Wu |
| 5,991,780 A | 11/1999 | Rivette et al. |
| 5,999,907 A | 12/1999 | Donner et al. |
| 6,006,221 A | 12/1999 | Liddy et al. |
| 6,014,663 A | 1/2000 | Rivette et al. |
| 6,038,561 A | 3/2000 | Snyder et al. |
| 6,049,801 A | 4/2000 | Whitmyer, Jr. |
| 6,055,538 A | 4/2000 | Kessenich et al. |
| 6,076,088 A | 6/2000 | Paik et al. |
| 6,094,652 A | 7/2000 | Faisal |
| 6,182,062 B1 | 1/2001 | Fujisawa et al. |
| 6,182,078 B1 | 1/2001 | Whitmyer, Jr. |
| 6,216,128 B1 | 4/2001 | Di-Criescenzo et al. |
| 6,226,792 B1 | 5/2001 | Goiffon et al. |
| 6,263,335 B1 | 7/2001 | Paik et al. |
| 6,327,593 B1 | 12/2001 | Goiffon |
| 6,339,767 B1 | 1/2002 | Rivette et al. |
| 6,363,361 B1 | 3/2002 | Lundberg |
| 6,363,375 B1 | 3/2002 | Hoshino et al. |
| 6,363,378 B1 | 3/2002 | Conklin et al. |
| 6,401,118 B1 | 6/2002 | Thomas |
| 6,405,190 B1 | 6/2002 | Conklin |
| 6,415,283 B1 | 7/2002 | Conklin |
| 6,415,319 B1 | 7/2002 | Ambroziak |
| 6,434,580 B1 | 8/2002 | Takano et al. |
| 6,453,312 B1 | 9/2002 | Goiffon et al. |
| 6,460,034 B1 | 10/2002 | Wical |
| 6,460,043 B1 | 10/2002 | Tabbara et al. |
| 6,490,581 B1 | 12/2002 | Neshatfar et al. |
| 6,499,026 B1 | 12/2002 | Rivette et al. |
| 6,502,081 B1 | 12/2002 | Wiltshire, Jr. et al. |
| 6,513,027 B1 | 1/2003 | Powers et al. |
| 6,526,440 B1 | 2/2003 | Bharat |
| 6,542,884 B1 | 4/2003 | Soderberg et al. |
| 6,556,710 B2 | 4/2003 | Pass et al. |
| 6,556,992 B1 | 4/2003 | Barney et al. |
| 6,560,620 B1 | 5/2003 | Ching |
| 6,574,632 B2 | 6/2003 | Fox et al. |
| 6,629,097 B1 | 9/2003 | Keith |
| 6,654,731 B1 | 11/2003 | Mahesh |
| 6,662,178 B2 | 12/2003 | Lee |
| 6,665,656 B1 | 12/2003 | Carter |
| 6,665,670 B2 | 12/2003 | Winer et al. |
| 6,675,159 B1 | 1/2004 | Lin et al. |
| 6,678,692 B1 | 1/2004 | Hyatt |
| 6,694,315 B1 | 2/2004 | Grow |
| 6,694,331 B2 | 2/2004 | Lee |
| 6,701,309 B1 | 3/2004 | Beeferman et al. |
| 6,738,678 B1 | 5/2004 | Bharat et al. |
| 6,751,621 B1 | 6/2004 | Calistri-Yeh et al. |
| 6,766,315 B1 | 7/2004 | Bratsos et al. |
| 6,789,092 B1 | 9/2004 | Oppedahl et al. |
| 6,820,237 B1 | 11/2004 | Abu-hakima et al. |
| 6,823,331 B1 | 11/2004 | Abu-Hakima |
| 6,839,665 B1 | 1/2005 | Meyers |
| 6,847,960 B1 | 1/2005 | Li et al. |
| 6,847,966 B1 | 1/2005 | Sommer et al. |
| 6,847,979 B2 | 1/2005 | Allemang et al. |
| 6,879,990 B1 | 4/2005 | Boyer et al. |
| 6,885,999 B1 | 4/2005 | Corless |
| 6,889,223 B2 | 5/2005 | Hattori et al. |
| 6,941,553 B2 | 9/2005 | Eisler et al. |
| 6,970,842 B1 | 11/2005 | Ashby |
| 6,970,881 B1 | 11/2005 | Mohan et al. |
| 6,976,016 B2 | 12/2005 | Chang |
| 6,980,984 B1 | 12/2005 | Huffman et al. |
| 6,981,007 B1 | 12/2005 | Whitmyer, Jr. |
| 7,003,516 B2 | 2/2006 | Dehlinger et al. |
| 7,016,852 B1 | 3/2006 | Lee |
| 7,016,895 B2 | 3/2006 | Dehlinger et al. |
| 7,024,408 B2 | 4/2006 | Dehlinger et al. |
| 7,035,463 B1 | 4/2006 | Monobe et al. |
| 7,051,022 B1 | 5/2006 | Faisal |
| 7,054,854 B1 | 5/2006 | Hattori et al. |
| 7,054,856 B2 | 5/2006 | Won et al. |
| 7,080,067 B2 | 7/2006 | Nonomura et al. |
| 7,085,771 B2 | 8/2006 | Chung et al. |
| 7,158,983 B2 | 1/2007 | Willse et al. |
| 7,165,024 B2 | 1/2007 | Glover et al. |
| 7,185,172 B1 | 2/2007 | Mick, Jr. et al. |
| 7,221,016 B2 | 5/2007 | Inoue |
| 7,231,384 B2 | 6/2007 | Wu et al. |
| 7,231,386 B2 | 6/2007 | Nonomura et al. |
| 7,281,008 B1 | 10/2007 | Lawrence et al. |
| 7,293,018 B2 | 11/2007 | Hattori et al. |
| 7,296,015 B2 | 11/2007 | Poltorak |
| 7,305,625 B1 | 12/2007 | Zilka et al. |
| 7,369,701 B2 | 5/2008 | Lundberg |
| 7,383,294 B1 | 6/2008 | Tamer et al. |
| 7,386,460 B1 | 6/2008 | Frank et al. |
| 7,395,261 B1 | 7/2008 | Atzel |
| 7,433,884 B2 | 10/2008 | Breitzman |
| 7,444,589 B2 | 10/2008 | Zellner et al. |
| 7,483,829 B2 | 1/2009 | Murakami et al. |
| 7,493,253 B1 | 2/2009 | Ceusters et al. |
| 7,496,892 B2 | 2/2009 | Nuss |
| 7,523,126 B2 | 4/2009 | Rivette et al. |
| 7,536,446 B2 | 5/2009 | Blumberg |
| 7,610,185 B1 | 10/2009 | Ershov |
| 7,653,631 B1 | 1/2010 | Lundberg |
| 7,676,375 B1 | 3/2010 | Neifeld et al. |
| 7,680,733 B1 | 3/2010 | Lundberg |
| 7,689,559 B2 | 3/2010 | Canright et al. |
| 7,698,330 B2 | 4/2010 | Kim |
| 7,702,640 B1 | 4/2010 | Vermeulen et al. |

(56) References Cited

U.S. PATENT DOCUMENTS

| | | |
|---|---|---|
| 7,716,226 B2 | 5/2010 | Barney |
| 7,716,581 B2 | 5/2010 | Tran |
| 7,734,545 B1 | 6/2010 | Fogliano et al. |
| 7,739,240 B2 | 6/2010 | Saito et al. |
| 7,761,478 B2 | 7/2010 | Akkiraju et al. |
| 7,765,227 B1 | 7/2010 | Khoshnevisan et al. |
| 7,769,685 B2 | 8/2010 | Malackowski et al. |
| 7,783,619 B2 | 8/2010 | Mcbeath et al. |
| 7,788,251 B2 | 8/2010 | Carlson et al. |
| 7,801,889 B2 | 9/2010 | Kim et al. |
| 7,801,909 B2 | 9/2010 | Poltorak |
| 7,823,061 B2 | 10/2010 | Chan |
| 7,836,048 B2 | 11/2010 | Schneider |
| 7,881,937 B2 | 2/2011 | Hasan et al. |
| 7,904,453 B2 | 3/2011 | Poltorak |
| 7,962,511 B2 | 6/2011 | Barney |
| 7,966,328 B2 | 6/2011 | Germeraad et al. |
| 7,983,928 B2 | 7/2011 | Lee |
| 7,996,753 B1 | 8/2011 | Chan et al. |
| 8,000,528 B2 | 8/2011 | Ming et al. |
| 8,005,760 B1 | 8/2011 | Lee |
| 8,032,515 B2 | 10/2011 | Miller |
| 8,041,739 B2 | 10/2011 | Glasgow |
| 8,064,736 B2 | 11/2011 | Chan et al. |
| 8,078,545 B1 | 12/2011 | Zilka et al. |
| 8,095,581 B2 | 1/2012 | Stobbs et al. |
| 8,112,440 B2 | 2/2012 | Wu et al. |
| 8,131,701 B2 | 3/2012 | Barney |
| 8,160,306 B1 | 4/2012 | Neustel et al. |
| 8,161,025 B2 | 4/2012 | Lundberg et al. |
| 8,161,041 B1 | 4/2012 | Grushetskyy et al. |
| 8,176,440 B2 | 5/2012 | Stading |
| 8,196,030 B1 | 6/2012 | Wang et al. |
| 8,204,816 B2 | 6/2012 | Brodsky et al. |
| 8,214,380 B1 | 7/2012 | Bettinger et al. |
| 8,214,387 B2 | 7/2012 | King et al. |
| 8,254,692 B2 | 8/2012 | Ramachandrula et al. |
| 8,275,708 B1 | 9/2012 | Dennes et al. |
| 8,335,998 B1 | 12/2012 | Rubinger et al. |
| 8,380,548 B2 | 2/2013 | Ng et al. |
| 8,386,456 B1 | 2/2013 | Paiz |
| 8,442,814 B2 | 5/2013 | Ceusters et al. |
| 8,442,923 B2 | 5/2013 | Gross |
| 8,447,758 B1 | 5/2013 | Adler et al. |
| 8,538,794 B2 | 9/2013 | Marko et al. |
| 8,543,511 B2 | 9/2013 | Wang |
| 8,589,413 B1 | 11/2013 | Mohan et al. |
| 8,600,900 B2 | 12/2013 | Lundberg |
| 8,713,078 B2 | 4/2014 | Kunjithapatham et al. |
| 8,812,292 B2 | 8/2014 | Ceusters et al. |
| 8,892,547 B2 | 11/2014 | Lundberg |
| 8,972,385 B2 | 3/2015 | Lundberg |
| 9,003,474 B1 | 4/2015 | Smith |
| 9,047,283 B1 | 6/2015 | Zhang et al. |
| 9,098,568 B2 | 8/2015 | Li et al. |
| 9,110,971 B2 | 8/2015 | Liao et al. |
| 9,146,985 B2 | 9/2015 | Carter |
| 9,177,349 B2 | 11/2015 | Barney |
| 9,201,956 B2 | 12/2015 | Lundberg et al. |
| 9,201,966 B2 | 12/2015 | Lundberg |
| 9,286,351 B2 | 3/2016 | Lundberg |
| 9,396,274 B2 | 7/2016 | Lundberg |
| 9,541,977 B1 | 1/2017 | Lee |
| 9,652,546 B2 | 5/2017 | Lundberg |
| 9,659,071 B2 | 5/2017 | Lundberg et al. |
| 9,679,019 B2 | 6/2017 | Lundberg |
| 9,747,390 B2 | 8/2017 | Cooper et al. |
| 9,811,728 B2 | 11/2017 | King et al. |
| 9,846,694 B1 | 12/2017 | Cook |
| 9,858,319 B2 | 1/2018 | Lundberg et al. |
| 9,904,726 B2 | 2/2018 | Lundberg |
| 9,965,460 B1 | 5/2018 | Wasiuk et al. |
| 10,013,726 B1 | 7/2018 | Jung et al. |
| 10,198,478 B2 | 2/2019 | Beretich, Jr. et al. |
| 10,268,731 B2 | 4/2019 | Lundberg |
| 10,546,273 B2 | 1/2020 | Lundberg et al. |
| 10,614,082 B2 | 4/2020 | Lundberg et al. |
| 10,628,429 B2 | 4/2020 | Lundberg |
| 10,706,444 B2 | 7/2020 | Bayer et al. |
| 10,778,703 B2 | 9/2020 | Muddu et al. |
| 10,810,693 B2 | 10/2020 | Lundberg et al. |
| 10,860,657 B2 | 12/2020 | Lundberg |
| 10,885,078 B2 | 1/2021 | Lundberg |
| 10,891,701 B2 | 1/2021 | Jessen et al. |
| 10,956,418 B2 | 3/2021 | Eidson et al. |
| 11,048,709 B2 | 6/2021 | Lundberg |
| 11,294,910 B2 | 4/2022 | Lundberg et al. |
| 11,301,810 B2 | 4/2022 | Lundberg et al. |
| 11,372,864 B2 | 6/2022 | Lundberg et al. |
| 11,386,096 B2 | 7/2022 | Malik et al. |
| 11,403,676 B2 | 8/2022 | Bayer et al. |
| 11,714,819 B2 | 8/2023 | Lundberg et al. |
| 11,714,839 B2 | 8/2023 | Lundberg |
| 11,797,546 B2 | 10/2023 | Lundberg |
| 11,803,560 B2 | 10/2023 | Lundberg et al. |
| 12,147,439 B2 | 11/2024 | Lundberg et al. |
| 2001/0007977 A1 | 7/2001 | Geary |
| 2001/0042064 A1 | 11/2001 | Davis et al. |
| 2001/0049688 A1 | 12/2001 | Fratkina et al. |
| 2002/0004775 A1 | 1/2002 | Kossovsky et al. |
| 2002/0007373 A1 | 1/2002 | Blair et al. |
| 2002/0022974 A1 | 2/2002 | Lindh |
| 2002/0023053 A1 | 2/2002 | Szoc et al. |
| 2002/0029208 A1 | 3/2002 | Josephson |
| 2002/0035499 A1 | 3/2002 | Germeraad et al. |
| 2002/0035571 A1 | 3/2002 | Coult |
| 2002/0042784 A1 | 4/2002 | Kerven et al. |
| 2002/0052971 A1 | 5/2002 | Okudera et al. |
| 2002/0059076 A1 | 5/2002 | Grainger et al. |
| 2002/0065675 A1 | 5/2002 | Grainger et al. |
| 2002/0065677 A1 | 5/2002 | Grainger et al. |
| 2002/0072920 A1 | 6/2002 | Grainger |
| 2002/0077835 A1 | 6/2002 | Hagelin |
| 2002/0078043 A1 | 6/2002 | Pass et al. |
| 2002/0078090 A1 | 6/2002 | Hwang et al. |
| 2002/0082778 A1 | 6/2002 | Barnett et al. |
| 2002/0091541 A1 | 7/2002 | Lundberg |
| 2002/0091542 A1 | 7/2002 | Grainger |
| 2002/0091702 A1 | 7/2002 | Mullins |
| 2002/0103654 A1 | 8/2002 | Poltorak |
| 2002/0107896 A1 | 8/2002 | Ronai |
| 2002/0111824 A1 | 8/2002 | Grainger |
| 2002/0111941 A1 | 8/2002 | Roux et al. |
| 2002/0111953 A1 | 8/2002 | Snyder |
| 2002/0116363 A1 | 8/2002 | Grainger |
| 2002/0129015 A1 | 9/2002 | Caudill et al. |
| 2002/0138384 A1 | 9/2002 | Malackowski |
| 2002/0138465 A1 | 9/2002 | Lee et al. |
| 2002/0138474 A1 | 9/2002 | Lee |
| 2002/0138475 A1 | 9/2002 | Lee |
| 2002/0143496 A1 | 10/2002 | Mactas et al. |
| 2002/0143742 A1 | 10/2002 | Nonomura et al. |
| 2002/0147711 A1 | 10/2002 | Hattori et al. |
| 2002/0147738 A1 | 10/2002 | Reader et al. |
| 2002/0161733 A1 | 10/2002 | Grainger |
| 2002/0163541 A1 | 11/2002 | Williams et al. |
| 2002/0174131 A1 | 11/2002 | Winer et al. |
| 2002/0175934 A1 | 11/2002 | Hand et al. |
| 2002/0175941 A1 | 11/2002 | Hand et al. |
| 2002/0177907 A1 | 11/2002 | Hand et al. |
| 2002/0184234 A1 | 12/2002 | Lundberg |
| 2003/0004843 A1 | 1/2003 | Frain |
| 2003/0004936 A1 | 1/2003 | Grune et al. |
| 2003/0018652 A1 | 1/2003 | Heckerman et al. |
| 2003/0026459 A1 | 2/2003 | Won et al. |
| 2003/0033295 A1 | 2/2003 | Adler et al. |
| 2003/0033333 A1 | 2/2003 | Nishino et al. |
| 2003/0046269 A1 | 3/2003 | Yamazaki |
| 2003/0046307 A1 | 3/2003 | Rivette et al. |
| 2003/0050915 A1 | 3/2003 | Allemang et al. |
| 2003/0066025 A1 | 4/2003 | Garner et al. |
| 2003/0074354 A1 | 4/2003 | Lee et al. |
| 2003/0084066 A1 | 5/2003 | Waterman et al. |
| 2003/0115191 A1 | 6/2003 | Copperman et al. |

(56) References Cited

U.S. PATENT DOCUMENTS

| | | |
|---|---|---|
| 2003/0154085 A1 | 8/2003 | Kelley |
| 2003/0167181 A1 | 9/2003 | Lundberg et al. |
| 2003/0187832 A1 | 10/2003 | Reader |
| 2003/0187874 A1 | 10/2003 | Peschel et al. |
| 2003/0191654 A1 | 10/2003 | Panchai et al. |
| 2003/0191780 A1 | 10/2003 | Heger et al. |
| 2003/0195764 A1 | 10/2003 | Baker et al. |
| 2003/0212572 A1 | 11/2003 | Poltorak |
| 2003/0212706 A1 | 11/2003 | Shih |
| 2003/0217335 A1 | 11/2003 | Chung et al. |
| 2003/0220891 A1 | 11/2003 | Fish |
| 2003/0225749 A1 | 12/2003 | Cox et al. |
| 2003/0229470 A1 | 12/2003 | Pejic |
| 2004/0002892 A1 | 1/2004 | Gluck et al. |
| 2004/0006457 A1 | 1/2004 | Dehlinger et al. |
| 2004/0006459 A1 | 1/2004 | Dehlinger et al. |
| 2004/0006547 A1 | 1/2004 | Dehlinger et al. |
| 2004/0006558 A1 | 1/2004 | Dehlinger et al. |
| 2004/0006594 A1 | 1/2004 | Boyer et al. |
| 2004/0010393 A1 | 1/2004 | Barney |
| 2004/0015481 A1 | 1/2004 | Zinda |
| 2004/0024733 A1 | 2/2004 | Won et al. |
| 2004/0024739 A1 | 2/2004 | Copperman et al. |
| 2004/0044688 A1 | 3/2004 | Brudz et al. |
| 2004/0049498 A1 | 3/2004 | Dehlinger et al. |
| 2004/0054672 A1 | 3/2004 | Tsuchitani et al. |
| 2004/0059736 A1 | 3/2004 | Willse et al. |
| 2004/0059994 A1 | 3/2004 | Fogel et al. |
| 2004/0064438 A1 | 4/2004 | Kostoff |
| 2004/0073443 A1 | 4/2004 | Gabrick et al. |
| 2004/0078190 A1 | 4/2004 | Fass et al. |
| 2004/0078192 A1 | 4/2004 | Poltorak |
| 2004/0078365 A1 | 4/2004 | Poltorak |
| 2004/0083206 A1 | 4/2004 | Wu et al. |
| 2004/0088306 A1 | 5/2004 | Murthy et al. |
| 2004/0088332 A1 | 5/2004 | Lee et al. |
| 2004/0103112 A1 | 5/2004 | Colson et al. |
| 2004/0122656 A1 | 6/2004 | Abir |
| 2004/0122841 A1 | 6/2004 | Goodman et al. |
| 2004/0133433 A1 | 7/2004 | Lee et al. |
| 2004/0133534 A1 | 7/2004 | Mahesh |
| 2004/0133555 A1 | 7/2004 | Toong et al. |
| 2004/0133566 A1 | 7/2004 | Ishiguro et al. |
| 2004/0158559 A1 | 8/2004 | Poltorak |
| 2004/0167875 A1 | 8/2004 | Sneiders |
| 2004/0177068 A1 | 9/2004 | Beretich et al. |
| 2004/0181417 A1 | 9/2004 | Piller et al. |
| 2004/0181427 A1 | 9/2004 | Stobbs et al. |
| 2004/0186705 A1 | 9/2004 | Morgan et al. |
| 2004/0186738 A1 | 9/2004 | Reisman |
| 2004/0199400 A1 | 10/2004 | Lundberg |
| 2004/0223648 A1 | 11/2004 | Hoene et al. |
| 2004/0236646 A1 | 11/2004 | Wu et al. |
| 2004/0237756 A1 | 12/2004 | Forbes |
| 2004/0260569 A1 | 12/2004 | Bell et al. |
| 2004/0268399 A1 | 12/2004 | Asakawa |
| 2005/0004806 A1 | 1/2005 | Lin et al. |
| 2005/0005239 A1 | 1/2005 | Richards et al. |
| 2005/0010555 A1 | 1/2005 | Gallivan |
| 2005/0010863 A1 | 1/2005 | Zernik |
| 2005/0021522 A1 | 1/2005 | Herman et al. |
| 2005/0060170 A1 | 3/2005 | Kummamura et al. |
| 2005/0060303 A1 | 3/2005 | Wu et al. |
| 2005/0060306 A1 | 3/2005 | Hattori et al. |
| 2005/0080656 A1 | 4/2005 | Crow et al. |
| 2005/0080723 A1 | 4/2005 | Burchetta et al. |
| 2005/0080775 A1 | 4/2005 | Colledge et al. |
| 2005/0080776 A1 | 4/2005 | Colledge et al. |
| 2005/0097628 A1 | 5/2005 | Lussier et al. |
| 2005/0108001 A1 | 5/2005 | Aarskog |
| 2005/0108652 A1 | 5/2005 | Beretich, Jr. et al. |
| 2005/0114763 A1 | 5/2005 | Nonomura et al. |
| 2005/0119995 A1 | 6/2005 | Lee |
| 2005/0120011 A1 | 6/2005 | Dehlinger et al. |
| 2005/0120026 A1 | 6/2005 | Lee et al. |
| 2005/0125459 A1 | 6/2005 | Sutinen et al. |
| 2005/0131882 A1 | 6/2005 | Beretich et al. |
| 2005/0144177 A1 | 6/2005 | Hodes |
| 2005/0154673 A1 | 7/2005 | Fellenstein et al. |
| 2005/0165600 A1 | 7/2005 | Kasravi et al. |
| 2005/0165744 A1 | 7/2005 | Taylor et al. |
| 2005/0171760 A1 | 8/2005 | Tinkler |
| 2005/0182755 A1 | 8/2005 | Tran |
| 2005/0198026 A1 | 9/2005 | Dehlinger et al. |
| 2005/0203768 A1 | 9/2005 | Florance et al. |
| 2005/0210008 A1 | 9/2005 | Tran et al. |
| 2005/0210009 A1 | 9/2005 | Tran |
| 2005/0210042 A1 | 9/2005 | Goedken |
| 2005/0216898 A1 | 9/2005 | Powell, Jr. et al. |
| 2005/0228684 A1 | 10/2005 | Pogodin et al. |
| 2005/0234738 A1 * | 10/2005 | Hodes ............... G06Q 99/00 705/310 |
| 2005/0234881 A1 | 10/2005 | Burago et al. |
| 2005/0240595 A1 | 10/2005 | Chandrasekaran |
| 2005/0246194 A1 | 11/2005 | Lundberg |
| 2005/0251383 A1 | 11/2005 | Murray |
| 2005/0256734 A1 | 11/2005 | Clikeman |
| 2005/0261927 A1 | 11/2005 | Bilak et al. |
| 2005/0289107 A1 | 12/2005 | Arrouye et al. |
| 2005/0289524 A1 | 12/2005 | McGinnes |
| 2006/0015485 A1 | 1/2006 | Hofmann |
| 2006/0026174 A1 | 2/2006 | Lundberg et al. |
| 2006/0026203 A1 | 2/2006 | Tan et al. |
| 2006/0036451 A1 | 2/2006 | Lundberg et al. |
| 2006/0036452 A1 | 2/2006 | Williams |
| 2006/0036453 A1 | 2/2006 | Williams |
| 2006/0036529 A1 | 2/2006 | Williams |
| 2006/0036632 A1 | 2/2006 | Williams |
| 2006/0036635 A1 | 2/2006 | Williams |
| 2006/0053154 A1 | 3/2006 | Yano |
| 2006/0062453 A1 | 3/2006 | Schacht |
| 2006/0074836 A1 | 4/2006 | Gardner et al. |
| 2006/0074867 A1 | 4/2006 | Breitzman |
| 2006/0074991 A1 | 4/2006 | Lussier et al. |
| 2006/0085249 A1 | 4/2006 | Diaz et al. |
| 2006/0085478 A1 | 4/2006 | Landau et al. |
| 2006/0106793 A1 | 5/2006 | Liang |
| 2006/0106847 A1 | 5/2006 | Eckardt, III et al. |
| 2006/0112084 A1 | 5/2006 | Mcbeath et al. |
| 2006/0143162 A1 | 6/2006 | Bernacki et al. |
| 2006/0149720 A1 | 7/2006 | Dehlinger |
| 2006/0150074 A1 | 7/2006 | Zellner |
| 2006/0161562 A1 | 7/2006 | McFarland et al. |
| 2006/0173903 A1 | 8/2006 | Zimmerman et al. |
| 2006/0173920 A1 | 8/2006 | Adler et al. |
| 2006/0190449 A1 | 8/2006 | Lundberg et al. |
| 2006/0190807 A1 | 8/2006 | Tran |
| 2006/0212302 A1 | 9/2006 | Lundberg et al. |
| 2006/0212402 A1 | 9/2006 | Lundberg et al. |
| 2006/0212471 A1 | 9/2006 | Lundberg et al. |
| 2006/0212480 A1 | 9/2006 | Lundberg et al. |
| 2006/0218188 A1 | 9/2006 | Duncan et al. |
| 2006/0218491 A1 | 9/2006 | Grossman et al. |
| 2006/0224412 A1 | 10/2006 | Frank et al. |
| 2006/0224999 A1 | 10/2006 | Albrecht et al. |
| 2006/0225000 A1 | 10/2006 | Albrecht et al. |
| 2006/0229983 A1 | 10/2006 | Lundberg |
| 2006/0235811 A1 | 10/2006 | Fairweather |
| 2006/0258397 A1 | 11/2006 | Kaplan et al. |
| 2006/0259479 A1 | 11/2006 | Dai |
| 2006/0287971 A1 | 12/2006 | Armstrong |
| 2007/0005575 A1 | 1/2007 | Dai et al. |
| 2007/0010994 A1 | 1/2007 | Mueller |
| 2007/0011154 A1 | 1/2007 | Musgrove et al. |
| 2007/0011175 A1 | 1/2007 | Langseth et al. |
| 2007/0050343 A1 | 3/2007 | Siddarammappa et al. |
| 2007/0057967 A1 | 3/2007 | Armstrong |
| 2007/0061384 A1 | 3/2007 | Harrington et al. |
| 2007/0067297 A1 | 3/2007 | Kublickis |
| 2007/0073625 A1 | 3/2007 | Shelton |
| 2007/0073745 A1 | 3/2007 | Scott et al. |
| 2007/0073748 A1 | 3/2007 | Barney |
| 2007/0112744 A1 | 5/2007 | Arrouye et al. |
| 2007/0130112 A1 | 6/2007 | Lin |

(56) References Cited

U.S. PATENT DOCUMENTS

| | | |
|---|---|---|
| 2007/0136116 A1 | 6/2007 | Germeraad et al. |
| 2007/0136271 A1 | 6/2007 | Masuyama et al. |
| 2007/0136373 A1 | 6/2007 | Piasecki |
| 2007/0150298 A1 | 6/2007 | Barney |
| 2007/0168345 A1 | 7/2007 | Gibbs et al. |
| 2007/0174041 A1 | 7/2007 | Yeske |
| 2007/0192272 A1 | 8/2007 | Elfayoumy et al. |
| 2007/0198578 A1 | 8/2007 | Lundberg et al. |
| 2007/0208669 A1 | 9/2007 | Rivette et al. |
| 2007/0208719 A1 | 9/2007 | Tran |
| 2007/0219853 A1 | 9/2007 | Van Luchene et al. |
| 2007/0219988 A1 | 9/2007 | Mueller et al. |
| 2007/0220041 A1 | 9/2007 | Van Luchene et al. |
| 2007/0220042 A1 | 9/2007 | Mueller et al. |
| 2007/0239705 A1 | 10/2007 | Hunt et al. |
| 2007/0245380 A1 | 10/2007 | Dommer et al. |
| 2007/0250468 A1 | 10/2007 | Pieper |
| 2007/0250488 A1 | 10/2007 | Lee |
| 2007/0250500 A1 | 10/2007 | Ismalon |
| 2007/0288256 A1 | 12/2007 | Speier |
| 2007/0288856 A1 | 12/2007 | Butlin et al. |
| 2007/0294610 A1 | 12/2007 | Ching |
| 2008/0005103 A1 | 1/2008 | Ratcliffe et al. |
| 2008/0005144 A1 | 1/2008 | Katz et al. |
| 2008/0016069 A1 | 1/2008 | Holt |
| 2008/0016233 A1 | 1/2008 | Schneider |
| 2008/0030800 A1 | 2/2008 | Matsukawa et al. |
| 2008/0033741 A1 | 2/2008 | Van et al. |
| 2008/0077570 A1 | 3/2008 | Tang et al. |
| 2008/0077577 A1 | 3/2008 | Byrne et al. |
| 2008/0097931 A1 | 4/2008 | Grotto |
| 2008/0104032 A1 | 5/2008 | Sarkar |
| 2008/0109454 A1 | 5/2008 | Willse et al. |
| 2008/0134072 A1 | 6/2008 | Basham et al. |
| 2008/0140644 A1 | 6/2008 | Franks et al. |
| 2008/0154767 A1 | 6/2008 | D'agostino |
| 2008/0154848 A1 | 6/2008 | Haslam et al. |
| 2008/0162444 A1 | 7/2008 | Lee et al. |
| 2008/0183518 A1 | 7/2008 | Jiang et al. |
| 2008/0195568 A1 | 8/2008 | Chen et al. |
| 2008/0195595 A1 | 8/2008 | Masuyama et al. |
| 2008/0195601 A1 | 8/2008 | Ntoulas et al. |
| 2008/0195604 A1 | 8/2008 | Sears |
| 2008/0216013 A1 | 9/2008 | Lundberg et al. |
| 2008/0222166 A1 | 9/2008 | Hultgren et al. |
| 2008/0243799 A1 | 10/2008 | Rozich |
| 2008/0244429 A1 | 10/2008 | Stading |
| 2008/0281748 A1 | 11/2008 | Newman |
| 2008/0281821 A1 | 11/2008 | Chen et al. |
| 2008/0301138 A1 | 12/2008 | Hasan et al. |
| 2008/0306952 A1 | 12/2008 | Lynn et al. |
| 2008/0312981 A1 | 12/2008 | Marlett et al. |
| 2009/0006328 A1 | 1/2009 | Lindberg et al. |
| 2009/0006379 A1 | 1/2009 | Shen et al. |
| 2009/0007200 A1 | 1/2009 | Amento et al. |
| 2009/0012827 A1 | 1/2009 | Avrunin |
| 2009/0012937 A1 | 1/2009 | Lee et al. |
| 2009/0030713 A1 | 1/2009 | Venkatachalam |
| 2009/0043797 A1 | 2/2009 | Dorie et al. |
| 2009/0048925 A1 | 2/2009 | Song et al. |
| 2009/0055721 A1 | 2/2009 | Kahn |
| 2009/0063468 A1 | 3/2009 | Berg |
| 2009/0070301 A1 | 3/2009 | McLean et al. |
| 2009/0083049 A1 | 3/2009 | Sciarrino et al. |
| 2009/0150326 A1 | 6/2009 | Sheets |
| 2009/0157717 A1 | 6/2009 | Palahnuk et al. |
| 2009/0164431 A1 | 6/2009 | Zivkovic et al. |
| 2009/0177656 A1 | 7/2009 | Carter |
| 2009/0192954 A1 | 7/2009 | Katukuri et al. |
| 2009/0216994 A1 | 8/2009 | Hsieh et al. |
| 2009/0228472 A1 | 9/2009 | Taylor et al. |
| 2009/0228578 A1 | 9/2009 | Demers et al. |
| 2009/0228777 A1 | 9/2009 | Henry et al. |
| 2009/0248468 A1 | 10/2009 | Cronin et al. |
| 2009/0257396 A1 | 10/2009 | Eliezer et al. |
| 2009/0259459 A1 | 10/2009 | Ceusters et al. |
| 2009/0259506 A1 | 10/2009 | Barney |
| 2009/0265274 A1 | 10/2009 | Hahn-carlson et al. |
| 2009/0282054 A1 | 11/2009 | Casey |
| 2010/0005094 A1 | 1/2010 | Poltorak |
| 2010/0023386 A1 | 1/2010 | Avisar et al. |
| 2010/0030680 A1 | 2/2010 | Malackowski et al. |
| 2010/0057533 A1 | 3/2010 | Martinez Ruiz et al. |
| 2010/0077007 A1 | 3/2010 | White et al. |
| 2010/0082395 A1 | 4/2010 | De Andrade |
| 2010/0106752 A1 | 4/2010 | Eckardt, III et al. |
| 2010/0114587 A1 | 5/2010 | Masuyama et al. |
| 2010/0131513 A1 | 5/2010 | Lundberg et al. |
| 2010/0174698 A1 | 7/2010 | Odland et al. |
| 2010/0179948 A1 | 7/2010 | Xie et al. |
| 2010/0179955 A1 | 7/2010 | Wu et al. |
| 2010/0180223 A1 | 7/2010 | Speier |
| 2010/0185689 A1 | 7/2010 | Hu et al. |
| 2010/0191622 A1 | 7/2010 | Reiss et al. |
| 2010/0191702 A1 | 7/2010 | Hofmann |
| 2010/0198650 A1 | 8/2010 | Shaw |
| 2010/0235337 A1 | 9/2010 | Shanahan et al. |
| 2010/0250479 A1 | 9/2010 | Carter |
| 2010/0287478 A1 | 11/2010 | Avasarala et al. |
| 2010/0306825 A1 | 12/2010 | Spivack |
| 2010/0324991 A1 | 12/2010 | Colledge et al. |
| 2010/0332511 A1 | 12/2010 | Stockton et al. |
| 2011/0029476 A1 | 2/2011 | Kasravi et al. |
| 2011/0029526 A1 | 2/2011 | Knight |
| 2011/0047166 A1 | 2/2011 | Stading et al. |
| 2011/0055192 A1 | 3/2011 | Tang et al. |
| 2011/0072014 A1 | 3/2011 | Lundberg et al. |
| 2011/0072024 A1 | 3/2011 | Barney |
| 2011/0093449 A1 | 4/2011 | Belenzon et al. |
| 2011/0099084 A1 | 4/2011 | Horn et al. |
| 2011/0099186 A1 | 4/2011 | Zohar et al. |
| 2011/0112824 A1 | 5/2011 | Sayers et al. |
| 2011/0113385 A1 | 5/2011 | Sayers et al. |
| 2011/0119134 A1 | 5/2011 | Zivkovic et al. |
| 2011/0143811 A1 | 6/2011 | Rodriguez |
| 2011/0153509 A1 | 6/2011 | Lundberg et al. |
| 2011/0153852 A1 | 6/2011 | Thomas |
| 2011/0179032 A1 | 7/2011 | Ceusters et al. |
| 2011/0191310 A1 | 8/2011 | Liao et al. |
| 2011/0191314 A1 | 8/2011 | Howes et al. |
| 2011/0197121 A1 | 8/2011 | Kletter |
| 2011/0202334 A1 | 8/2011 | Abir |
| 2011/0212717 A1 | 9/2011 | Rhoads et al. |
| 2011/0225159 A1 | 9/2011 | Murray |
| 2011/0231449 A1 | 9/2011 | Ashley et al. |
| 2011/0246379 A1 | 10/2011 | Maddox et al. |
| 2011/0246452 A1 | 10/2011 | Johnston |
| 2011/0246473 A1 | 10/2011 | Stec |
| 2011/0246486 A1 | 10/2011 | Peng et al. |
| 2011/0258177 A1 | 10/2011 | Wu et al. |
| 2011/0289096 A1 | 11/2011 | Barney |
| 2011/0302172 A1 | 12/2011 | Chandrasekar et al. |
| 2011/0307499 A1 | 12/2011 | Elias et al. |
| 2011/0320367 A1 | 12/2011 | Kan et al. |
| 2011/0320582 A1 | 12/2011 | Lewis |
| 2012/0016678 A1 | 1/2012 | Gruber et al. |
| 2012/0016859 A1 | 1/2012 | Sears |
| 2012/0078913 A1 | 3/2012 | Muni et al. |
| 2012/0078979 A1 | 3/2012 | Ghimire |
| 2012/0095984 A1 | 4/2012 | Wren-hilton et al. |
| 2012/0095993 A1 | 4/2012 | Shau |
| 2012/0096027 A1 | 4/2012 | Coult |
| 2012/0102427 A1 | 4/2012 | Fenster et al. |
| 2012/0109642 A1 | 5/2012 | Stobbs et al. |
| 2012/0109794 A1 | 5/2012 | Nathanson et al. |
| 2012/0116989 A1 | 5/2012 | Lai et al. |
| 2012/0117082 A1 | 5/2012 | Koperda et al. |
| 2012/0130773 A1 | 5/2012 | Abu-ghazalah et al. |
| 2012/0130993 A1 | 5/2012 | Lundberg et al. |
| 2012/0174017 A1 | 7/2012 | Tidwell et al. |
| 2012/0215768 A1 | 8/2012 | Zellweger |
| 2012/0221580 A1 | 8/2012 | Barney |
| 2012/0239591 A1 | 9/2012 | Powell, Jr. et al. |
| 2012/0240026 A1 | 9/2012 | Iyer et al. |

(56) References Cited

U.S. PATENT DOCUMENTS

| | | |
|---|---|---|
| 2012/0254155 A1 | 10/2012 | Heim et al. |
| 2012/0259787 A1 | 10/2012 | Speier |
| 2012/0278244 A1 | 11/2012 | Lee et al. |
| 2012/0284199 A1 | 11/2012 | Lundberg |
| 2012/0290487 A1 | 11/2012 | Lee et al. |
| 2012/0317041 A1 | 12/2012 | Shaffer et al. |
| 2013/0007578 A1 | 1/2013 | Shreck et al. |
| 2013/0013645 A1 | 1/2013 | Dias et al. |
| 2013/0041921 A1 | 2/2013 | Cooper et al. |
| 2013/0054581 A1 | 2/2013 | Tawfick et al. |
| 2013/0084009 A1 | 4/2013 | Lundberg |
| 2013/0085911 A1 | 4/2013 | Lundberg |
| 2013/0085912 A1 | 4/2013 | Lundberg |
| 2013/0085929 A1 | 4/2013 | Lundberg |
| 2013/0085933 A1 | 4/2013 | Lundberg |
| 2013/0085934 A1 | 4/2013 | Lundberg |
| 2013/0085946 A1 | 4/2013 | Lundberg |
| 2013/0085947 A1 | 4/2013 | Lundberg |
| 2013/0085948 A1 | 4/2013 | Lundberg |
| 2013/0085949 A1 | 4/2013 | Lundberg |
| 2013/0085950 A1 | 4/2013 | Marais |
| 2013/0085964 A1 | 4/2013 | Marais |
| 2013/0086032 A1 | 4/2013 | Lundberg |
| 2013/0086033 A1 | 4/2013 | Lundberg |
| 2013/0086042 A1 | 4/2013 | Lundberg |
| 2013/0086043 A1 | 4/2013 | Lundberg |
| 2013/0086044 A1 | 4/2013 | Lundberg |
| 2013/0086045 A1 | 4/2013 | Lundberg |
| 2013/0086046 A1 | 4/2013 | Lundberg |
| 2013/0086047 A1 | 4/2013 | Lundberg et al. |
| 2013/0086048 A1 | 4/2013 | Lundberg et al. |
| 2013/0086049 A1 | 4/2013 | Lundberg et al. |
| 2013/0086050 A1 | 4/2013 | Lundberg |
| 2013/0086070 A1 | 4/2013 | Lundberg |
| 2013/0086080 A1 | 4/2013 | Lundberg |
| 2013/0086084 A1 | 4/2013 | Lundberg |
| 2013/0086093 A1 | 4/2013 | Lundberg |
| 2013/0086094 A1 | 4/2013 | Lundberg |
| 2013/0086106 A1 | 4/2013 | Lundberg |
| 2013/0086117 A1 | 4/2013 | Lundberg |
| 2013/0086120 A1 | 4/2013 | Lundberg et al. |
| 2013/0086257 A1 | 4/2013 | Lundberg |
| 2013/0086469 A1 | 4/2013 | Lundberg |
| 2013/0132302 A1 | 5/2013 | Lundberg et al. |
| 2013/0144895 A1 | 6/2013 | Cameron |
| 2013/0282409 A1 | 10/2013 | Lundberg et al. |
| 2013/0282571 A1 | 10/2013 | Lundberg |
| 2013/0282599 A1 | 10/2013 | Kang et al. |
| 2013/0282735 A1 | 10/2013 | Pedersen et al. |
| 2013/0346116 A1 | 12/2013 | Lundberg |
| 2013/0346265 A1 | 12/2013 | Lundberg |
| 2013/0346323 A1 | 12/2013 | Lundberg |
| 2013/0346505 A1 | 12/2013 | Lundberg |
| 2014/0032513 A1 | 1/2014 | Gaither |
| 2014/0052650 A1 | 2/2014 | Lundberg et al. |
| 2014/0052667 A1 | 2/2014 | Lundberg et al. |
| 2014/0089210 A1 | 3/2014 | Lundberg |
| 2014/0317000 A1 | 10/2014 | Lundberg et al. |
| 2014/0324808 A1 | 10/2014 | Sandhu et al. |
| 2014/0379388 A1 | 12/2014 | Lundberg et al. |
| 2014/0379686 A1 | 12/2014 | Vadlamani et al. |
| 2015/0066842 A1 | 3/2015 | Lundberg |
| 2015/0134549 A1 | 5/2015 | Lundberg et al. |
| 2015/0149368 A1 | 5/2015 | Lundberg |
| 2015/0169777 A1 | 6/2015 | Lundberg |
| 2015/0324394 A1 | 11/2015 | Becker et al. |
| 2015/0347604 A1 | 12/2015 | Lundberg |
| 2015/0347605 A1 | 12/2015 | Lundberg et al. |
| 2015/0348217 A1 | 12/2015 | Lundberg |
| 2015/0371349 A1 | 12/2015 | Lundberg et al. |
| 2016/0078109 A1 | 3/2016 | Lundberg et al. |
| 2016/0154863 A1 | 6/2016 | Lundberg |
| 2016/0314122 A1 | 10/2016 | Platakis et al. |
| 2016/0350797 A1 | 12/2016 | Murdock |
| 2016/0358274 A1 | 12/2016 | George |
| 2016/0378766 A1 | 12/2016 | Lundberg |
| 2017/0046398 A1 | 2/2017 | Beretich, Jr. et al. |
| 2017/0075929 A1 | 3/2017 | Lundberg |
| 2017/0213291 A1 | 7/2017 | Plow et al. |
| 2017/0316036 A1 | 11/2017 | Lundberg |
| 2017/0351682 A1 | 12/2017 | Lundberg |
| 2018/0137194 A1 | 5/2018 | Lundberg |
| 2018/0157665 A1 | 6/2018 | Lundberg et al. |
| 2018/0204180 A1 | 7/2018 | Lundberg et al. |
| 2019/0278777 A1 | 9/2019 | Malik et al. |
| 2020/0050609 A1 | 2/2020 | Lundberg |
| 2020/0210440 A1 | 7/2020 | Lundberg et al. |
| 2020/0279222 A1 | 9/2020 | Lundberg et al. |
| 2021/0027405 A1 | 1/2021 | Lundberg et al. |
| 2021/0073932 A1 | 3/2021 | Lundberg et al. |
| 2021/0149969 A1 | 5/2021 | Lundberg |
| 2021/0173858 A1 | 6/2021 | Lundberg |
| 2021/0407025 A1 | 12/2021 | Lundberg et al. |
| 2022/0075789 A1 | 3/2022 | Lundberg |
| 2022/0157442 A1 | 5/2022 | Ning et al. |
| 2022/0391399 A1 | 12/2022 | Lundberg et al. |
| 2023/0019161 A1 | 1/2023 | Lundberg et al. |
| 2023/0229716 A1 | 7/2023 | Spangenberg et al. |
| 2024/0070159 A1 | 2/2024 | Lundberg et al. |
| 2024/0119072 A1 | 4/2024 | Lundberg |
| 2024/0126768 A1 | 4/2024 | Lundberg |
| 2024/0126769 A1 | 4/2024 | Lundberg et al. |

FOREIGN PATENT DOCUMENTS

| | | |
|---|---|---|
| AU | 2013270517 B2 | 4/2016 |
| EP | 0638870 A1 | 2/1995 |
| EP | 1814047 A1 | 8/2007 |
| GB | 2156112 A | 10/1985 |
| GB | 2260007 A | 3/1993 |
| WO | WO-9816890 A1 | 4/1998 |
| WO | WO-0054185 A1 | 9/2000 |
| WO | WO-0219155 A2 | 3/2002 |
| WO | WO-0243306 A2 | 5/2002 |
| WO | WO-02080039 A1 | 10/2002 |
| WO | WO-2006015110 A2 | 2/2006 |
| WO | WO-2006015110 A3 | 2/2006 |
| WO | WO-2006128183 A2 | 11/2006 |
| WO | WO-2006128183 A3 | 11/2006 |
| WO | WO-2007014341 A2 | 2/2007 |
| WO | WO-2007014341 A3 | 2/2007 |
| WO | WO-2007014341 C2 | 2/2007 |
| WO | WO-2007059272 A1 | 5/2007 |
| WO | WO-2008028018 A1 | 3/2008 |
| WO | WO-2011017133 A2 | 2/2011 |
| WO | 2011109445 | 9/2011 |
| WO | WO-2011123517 A1 | 10/2011 |
| WO | WO-2011130055 A1 | 10/2011 |

OTHER PUBLICATIONS

"U.S. Appl. No. 13/310,417, Response filed May 27, 2014 to Final Office Action dated Jan. 9, 2014", 14 pgs.

"U.S. Appl. No. 14/750,559, Notice of Allowance dated Jan. 14, 2020", 10 pgs.

"U.S. Appl. No. 14/750,559, Notice of Allowance dated Jun. 11, 2020", 9 pgs.

"U.S. Appl. No. 16/814,911, Response filed Jan. 18, 2022 to Non Final Office Action dated Oct. 15, 2021", 3 pgs.

"U.S. Appl. No. 17/025,847, Preliminary Amendment filed Feb. 3, 2021", 8 pgs.

"U.S. Appl. No. 17/103,870, Final Office Action dated May 6, 2022", 13 pgs.

"U.S. Appl. No. 17/103,870, Response filed Mar. 9, 2022 to Non Final Office Action dated Nov. 9, 2021", 12 pgs.

Roubtsov, Emma, "Mapping patents to products: Why should you care?", [Online] Retrieved from the Internet on Dec. 18, 2019: <URL: https://www.cpaglobal.com/cpa-global-blog/mapping-patents-to-products-why-should-you-care>, (Dec. 2009), 7 pgs.

U.S. Appl. No. 17/745,863, filed May 16, 2022, Patent Mapping.

U.S. Appl. No. 12/605,030, filed Oct. 23, 2009, Patent Mapping.

(56) References Cited

OTHER PUBLICATIONS

U.S. Appl. No. 15/801,056, U.S. Pat. No. 10,546,273, filed Nov. 1, 2017, Patent Mapping.
U.S. Appl. No. 16/730,678, U.S. Pat. No. 11,301,810, filed Dec. 30, 2019, Patent Mapping.
U.S. Appl. No. 13/253,936, U.S. Pat. No. 10,860,657, filed Oct. 5, 2011, Patent Mapping.
U.S. Appl. No. 17/103,870, filed Nov. 24, 2020, Patent Mapping.
U.S. Appl. No. 13/253,941, filed Oct. 5, 2011, Prior Art Management.
U.S. Appl. No. 13/464,598, U.S. Pat. No. 9,904,726, filed May 4, 2012, Apparatus and Method for Automated and Assisted Patent Claim Mapping and Expense Planning.
U.S. Appl. No. 15/722,868, U.S. Pat. No. 10,885,078, filed Oct. 2, 2017, Apparatus and Method for Automated and Assisted Patent Claim Mapping and Expense Planning.
U.S. Appl. No. 17/125,979, filed Dec. 17, 2020, Apparatus and Method for Automated and Assisted Patent Claim Mapping and Expense Planning.
U.S. Appl. No. 13/309,200, U.S. Pat. No. 10,268,731, filed Dec. 1, 2011, Patent Mapping.
U.S. Appl. No. 16/352,364, U.S. Pat. No. 11,048,709, filed Mar. 13, 2019, Patent Mapping.
U.S. Appl. No. 17/320,202, filed May 13, 2021, Patent Mapping.
U.S. Appl. No. 13/310,279, U.S. Pat. No. 11,294,910, filed Dec. 2, 2011, Patent Mapping.
U.S. Appl. No. 17/683,044, filed Feb. 28, 2022, Patent Claim Mapping.
U.S. Appl. No. 13/310,322, filed Dec. 2, 2011, Patent Mapping.
U.S. Appl. No. 13/310,368, U.S. Pat. No. 10,268,429, filed Dec. 2, 2011, Patent Mapping.
U.S. Appl. No. 16/814,911, filed Mar. 10, 2020, Patent Mapping.
U.S. Appl. No. 13/310,417, filed Dec. 2, 2011, Patent Mapping.
U.S. Appl. No. 13/310,452, filed Dec. 2, 2011, Patent Mapping.
U.S. Appl. No. 14/826,018, U.S. Pat. No. 9,858,319, filed Aug. 13, 2015, Patent Mapping.
U.S. Appl. No. 15/849,362, U.S. Pat. No. 10,614,082, filed Dec. 20, 2017, Patent Mapping.
"U.S. Appl. No. 10/710,656, Non Final Office Action dated Jan. 17, 2007", 16 pgs.
"U.S. Appl. No. 10/710,656, Response filed Nov. 13, 2006 to Restriction Requirement dated Oct. 13, 2006", 6 pgs.
"U.S. Appl. No. 10/710,656, Restriction Requirement dated Oct. 13, 2006", 9 pgs.
"U.S. Appl. No. 10/915,265, Advisory Action dated Jul. 31, 2008", 3 pgs.
"U.S. Appl. No. 10/915,265, Final Office Action dated Jul. 10, 2007", 26 pgs.
"U.S. Appl. No. 10/915,265, Final Office Action dated Jul. 14, 2008", 23 pgs.
"U.S. Appl. No. 10/915,265, Non Final Office Action dated Jan. 22, 2007", 15 pgs.
"U.S. Appl. No. 10/915,265, Non-Final Office Action dated Apr. 13, 2009", 27 pgs.
"U.S. Appl. No. 10/915,265, Non-Final Office Action dated Jun. 2, 2010", 29 pgs.
"U.S. Appl. No. 10/915,265, Non-Final Office Action dated Nov. 5, 2008", 27 pgs.
"U.S. Appl. No. 10/915,265, Non-Final Office Action dated Dec. 28, 2007", 25 pgs.
"U.S. Appl. No. 10/915,265, Response filed Feb. 5, 2009 to Non-Final Office Action dated Nov. 5, 2008", 11 pgs.
"U.S. Appl. No. 10/915,265, Response filed Apr. 28, 2008 to Non-Final Office Action dated Dec. 28, 2007", 14 pgs.
"U.S. Appl. No. 10/915,265, Response filed May 18, 2007 to Noon Final Office Action dated Jan. 22, 2007", 9 pgs.
"U.S. Appl. No. 10/915,265, Response filed Jul. 18, 2008 to Final Office Action dated Jul. 14, 2008", 17 pgs.
"U.S. Appl. No. 10/915,265, Response filed Sep. 1, 2010 to Non Final Office Action dated Jun. 2, 2010", 12 pgs.
"U.S. Appl. No. 10/915,265, Response filed Oct. 10, 2007 to Final Office Action filed Jul. 10, 2007", 15 pgs.
"U.S. Appl. No. 10/915,265, Response filed Nov. 13, 2006 to Restriction Requirement dated Oct. 11, 2006", 5 pgs.
"U.S. Appl. No. 10/915,265, Restriction Requirement dated Oct. 13, 2006", 10 pgs.
"U.S. Appl. No. 11/494,278, Final Office Action dated Mar. 23, 2009", 21 pgs.
"U.S. Appl. No. 11/494,278, Final Office Action dated Apr. 1, 2010", 20 pgs.
"U.S. Appl. No. 11/494,278, Non Final Office Action dated Oct. 8, 2009", 21 pgs.
"U.S. Appl. No. 11/494,278, Non-Final Office Action dated Mar. 5, 2008", 14 pgs.
"U.S. Appl. No. 11/494,278, Notice of Allowance dated May 3, 2011", 12 pgs.
"U.S. Appl. No. 11/494,278, Notice of Allowance dated Dec. 15, 2011", 14 pgs.
"U.S. Appl. No. 11/494,278, Notice of Non-Compliant Amendment dated Jun. 7, 2010", 2 pgs.
"U.S. Appl. No. 11/494,278, Preliminary Amendment filed Oct. 30, 2007", 6 pgs.
"U.S. Appl. No. 11/494,278, Response filed Feb. 10, 2010 to Non Final Office Action dated Oct. 8, 2009", 8 pgs.
"U.S. Appl. No. 11/494,278, Response filed Jun. 2, 2010 to Final Office Action dated Apr. 1, 2010", 7 pgs.
"U.S. Appl. No. 11/494,278, Response filed Jun. 5, 2008 to Non-Final Office Action dated Mar. 5, 2008", 12 pgs.
"U.S. Appl. No. 11/494,278, Response filed Jun. 9, 2010 to Notice of Non-Compliant Amendment dated Jun. 7, 2010", 7 pgs.
"U.S. Appl. No. 11/494,278, Response filed Jun. 23, 2009 to Final Office Action dated Mar. 23, 2009", 8 pgs.
"U.S. Appl. No. 11/888,632, Amendment filed Jun. 12, 2012", 8 pgs.
"U.S. Appl. No. 11/888,632, Appeal Brief filed Jun. 4, 2015", 16 pgs.
"U.S. Appl. No. 11/888,632, Appeal Decision dated Jan. 19, 2017", 8 pgs.
"U.S. Appl. No. 11/888,632, Decision on Pre-Appeal Brief dated Mar. 9, 2012", 2 pgs.
"U.S. Appl. No. 11/888,632, Final Office Action dated Sep. 8, 2014", 12 pgs.
"U.S. Appl. No. 11/888,632, Final Office Action dated Oct. 19, 2011", 9 pgs.
"U.S. Appl. No. 11/888,632, Non Final Office Action dated Jan. 19, 2011", 12 pgs.
"U.S. Appl. No. 11/888,632, Non Final Office Action dated Jan. 24, 2014", 12 pgs.
"U.S. Appl. No. 11/888,632, Pre-Appeal Brief Request filed Feb. 21, 2012", 4 pgs.
"U.S. Appl. No. 11/888,632, Response filed Jun. 24, 2014 to Non Final Office Action dated Jan. 24, 2014", 9 pgs.
"U.S. Appl. No. 11/888,632, Response filed Jul. 19, 2011 to Non Final Office Action dated Jan. 19, 2011", 8 pgs.
"U.S. Appl. No. 11/888,632, Response filed Dec. 7, 2010, to Restriction Requirement dated Jul. 7, 2010", 7 pgs.
"U.S. Appl. No. 11/888,632, Restriction Requirement dated Jul. 7, 2010", 5 pgs.
"U.S. Appl. No. 11/915,718, Advisory Action dated Feb. 15, 2012", 3 pgs.
"U.S. Appl. No. 11/915,718, Final Office Action dated Dec. 30, 2011", 13 pgs.
"U.S. Appl. No. 11/915,718, Non Final Office Action dated May 26, 2011", 9 pgs.
"U.S. Appl. No. 11/915,718, Non Final Office Action dated Jul. 7, 2014", 17 pgs.
"U.S. Appl. No. 11/915,718, Notice of Non-Compliant Amendment dated Oct. 6, 2011", 2 pgs.
"U.S. Appl. No. 11/915,718, Preliminary Amendment filed Nov. 27, 2007", 2 pgs.
"U.S. Appl. No. 11/915,718, Response filed Feb. 8, 2012 to Final Office Action dated Dec. 30, 2011", 13 pgs.

(56) References Cited

OTHER PUBLICATIONS

"U.S. Appl. No. 11/915,718, Response filed Sep. 26, 2011 to Non-Final Office Action dated May 26, 2011", 9 pgs.
"U.S. Appl. No. 11/915,718, Response filed Oct. 11, 2011 to Notice of Non-Compliant Amendment dated Oct. 6, 2011", 4 pgs.
"U.S. Appl. No. 12/605,030, Appeal Decision dated Sep. 1, 2017", 14 pgs.
"U.S. Appl. No. 12/605,030, Final Office Action dated May 21, 2012", 10 pgs.
"U.S. Appl. No. 12/605,030, Final Office Action dated Jul. 16, 2014", 16 pgs.
"U.S. Appl. No. 12/605,030, Non Final Office Action dated Oct. 7, 2011", 12 pgs.
"U.S. Appl. No. 12/605,030, Non Final Office Action dated Nov. 7, 2013", 16 pgs.
"U.S. Appl. No. 12/605,030, Response filed Feb. 7, 2012 to Non Final Office Action dated Oct. 7, 2011", 9 pgs.
"U.S. Appl. No. 12/605,030, Response Filed May 7, 2014 to Non Final Office Action dated Nov. 7, 2013", 8 pgs.
"U.S. Appl. No. 12/605,030, Response filed Oct. 22, 2012 to Final Office Action dated May 21, 2012", 8 pgs.
"U.S. Appl. No. 12/658,113, Non Final Office Action dated Feb. 28, 2011", 26 pgs.
"U.S. Appl. No. 12/958,113, Examiner Interview Summary dated Aug. 24, 2015", 2 pgs.
"U.S. Appl. No. 12/958,113, Final Office Action dated Aug. 8, 2011", 26 pgs.
"U.S. Appl. No. 12/958,113, Final Office Action dated Nov. 3, 2014", 25 pgs.
"U.S. Appl. No. 12/958,113, Non Final Office Action dated Feb. 4, 2016", 25 pgs.
"U.S. Appl. No. 12/958,113, Non Final Office Action dated Apr. 30, 2014", 21 pgs.
"U.S. Appl. No. 12/958,113, Non Final Office Action dated Aug. 20, 2015", 25 pgs.
"U.S. Appl. No. 12/958,113, Notice of Allowance dated Mar. 1, 2017", 14 pgs.
"U.S. Appl. No. 12/958,113, Response filed Feb. 3, 2015 to Final Office Action dated Nov. 3, 2014", 11 pgs.
"U.S. Appl. No. 12/958,113, Response filed Feb. 8, 2012 to Final Office Action dated Aug. 8, 2011", 12 pgs.
"U.S. Appl. No. 12/958,113, Response filed May 3, 2016 to Non Final Office Action dated Feb. 4, 2016", 11 pgs.
"U.S. Appl. No. 12/958,113, Response filed May 20, 2011 to Non Final Office Action dated Feb. 28, 2011", 13 pgs.
"U.S. Appl. No. 12/958,113, Response filed Jul. 16, 2014 to Non Final Office Action dated Apr. 30, 2014", 12 pgs.
"U.S. Appl. No. 12/958,113, Response filed Nov. 6, 2015 to Non Final Office Action dated Aug. 20, 2015", 12 pgs.
"U.S. Appl. No. 13/109,080, Response filed Mar. 28, 2013 to Final Office Action dated Nov. 5, 2012", 10 pgs.
"U.S. Appl. No. 13/253,801, Final Office Action dated Jul. 18, 2013", 39 pgs.
"U.S. Appl. No. 13/253,801, Final Office Action dated Oct. 1, 2012", 41 pgs.
"U.S. Appl. No. 13/253,801, Non Final Office Action dated Apr. 10, 2013", 37 pgs.
"U.S. Appl. No. 13/253,801, Non Final Office Action dated Aug. 2, 2012", 42 pgs.
"U.S. Appl. No. 13/253,801, Notice of Allowance dated May 16, 2014", 10 pgs.
"U.S. Appl. No. 13/253,801, Notice of Allowance dated Jul. 16, 2014", 9 pgs.
"U.S. Appl. No. 13/253,801, Preliminary Amendment filed Oct. 5, 2011", 4 pgs.
"U.S. Appl. No. 13/253,801, Response filed Mar. 20, 2013 to Final Office Action dated Oct. 1, 2012", 16 pgs.
"U.S. Appl. No. 13/253,801, Response filed Jul. 5, 2013 to Non Final Office Action dated Apr. 10, 2013", 18 pgs.
"U.S. Appl. No. 13/253,801, Response filed Sep. 7, 2012 to Non Final Office Action dated Aug. 2, 2012", 17 pgs.
"U.S. Appl. No. 13/253,801, Response filed Nov. 18, 2013 to Final Office Action dated Jul. 18, 2013", 16 pgs.
"U.S. Appl. No. 13/253,811, Appeal Decision dated Nov. 1, 2017", 21 pgs.
"U.S. Appl. No. 13/253,811, Final Office Action dated Apr. 11, 2016", 14 pgs.
"U.S. Appl. No. 13/253,811, Final Office Action dated Jul. 2, 2013", 12 pgs.
"U.S. Appl. No. 13/253,811, Final Office Action dated Dec. 9, 2014", 13 pgs.
"U.S. Appl. No. 13/253,811, Non Final Office Action dated May 1, 2014", 13 pgs.
"U.S. Appl. No. 13/253,811, Non Final Office Action dated Jun. 18, 2015", 12 pgs.
"U.S. Appl. No. 13/253,811, Non Final Office Action dated Oct. 18, 2012", 12 pgs.
"U.S. Appl. No. 13/253,811, Preliminary Amendment filed Oct. 5, 2011", 4 pgs.
"U.S. Appl. No. 13/253,811, Response filed Jan. 2, 2014 to Final Office Action dated Jul. 2, 2013", 13 pgs.
"U.S. Appl. No. 13/253,811, Response filed Mar. 18, 2013 to Non Final Office Action dated Oct. 18, 2012", 13 pgs.
"U.S. Appl. No. 13/253,811, Response filed Apr. 9, 2015 to Final Office Action dated Dec. 9, 2014", 11 pgs.
"U.S. Appl. No. 13/253,811, Response filed Oct. 1, 2014 to Non Final Office Action dated May 1, 2014", 10 pgs.
"U.S. Appl. No. 13/253,811, Response filed Oct. 19, 2015 to Non Final Office Action dated Jun. 18, 2015", 9 pgs.
"U.S. Appl. No. 13/253,825, Examiner Interview Summary dated Aug. 13, 2013", 3 pgs.
"U.S. Appl. No. 13/253,825, Final Office Action dated Aug. 14, 2013", 35 pgs.
"U.S. Appl. No. 13/253,825, Final Office Action mailed Nov. 21, 12", 33 pgs.
"U.S. Appl. No. 13/253,825, Non Final Office Action dated Feb. 11, 2014", 45 pgs.
"U.S. Appl. No. 13/253,825, Non Final Office Action dated Apr. 25, 2013", 32 pgs.
"U.S. Appl. No. 13/253,825, Non Final Office Action dated Aug. 3, 2012", 32 pgs.
"U.S. Appl. No. 13/253,825, Notice of Allowance dated Oct. 23, 2014", 16 pgs.
"U.S. Appl. No. 13/253,825, Preliminary Amendment filed Oct. 5, 2011", 4 pgs.
"U.S. Appl. No. 13/253,825, Response filed Mar. 20, 2013 to Final Office Action dated Nov. 21, 2012", 17 pgs.
"U.S. Appl. No. 13/253,825, Response filed Jun. 11, 2014 to Non Final Office Action dated Feb. 11, 2014", 16 pgs.
"U.S. Appl. No. 13/253,825, Response filed Jul. 18, 2013 to Non Final Office Action dated Apr. 25, 2013", 16 pgs.
"U.S. Appl. No. 13/253,825, Response filed Oct. 3, 2013 to Final Office Action dated Aug. 14, 2013", 15 pgs.
"U.S. Appl. No. 13/253,846, Advisory Action dated Sep. 10, 2013", 3 pgs.
"U.S. Appl. No. 13/253,846, Decision on Pre-Appeal Brief Request dated Dec. 26, 2013", 2 pgs.
"U.S. Appl. No. 13/253,846, Final Office Action dated Apr. 12, 2016", 22 pgs.
"U.S. Appl. No. 13/253,846, Final Office Action dated Jun. 19, 2013", 21 pgs.
"U.S. Appl. No. 13/253,846, Final Office Action dated Oct. 23, 2014", 19 pgs.
"U.S. Appl. No. 13/253,846, Non Final Office Action dated Mar. 7, 2014", 20 pgs.
"U.S. Appl. No. 13/253,846, Non Final Office Action dated Jun. 25, 2015", 19 pgs.
"U.S. Appl. No. 13/253,846, Non Final Office Action dated Oct. 29, 2012", 12 pgs.
"U.S. Appl. No. 13/253,846, Pre-Appeal Brief Request filed Oct. 21, 2013", 4 pgs.

(56) References Cited

OTHER PUBLICATIONS

"U.S. Appl. No. 13/253,846, Response filed Jan. 23, 2015 to Final Office Action dated Oct. 23, 2014", 15 pgs.
"U.S. Appl. No. 13/253,846, Response filed Mar. 26, 2013 to Non Final Office Action dated Oct. 29, 2012", 17 pgs.
"U.S. Appl. No. 13/253,846, Response filed Aug. 16, 2013 to Final Office Action dated Jun. 19, 2013", 16 pgs.
"U.S. Appl. No. 13/253,846, Response filed Oct. 26, 2015 to Non Final Office Action dated Jun. 25, 2015", 14 pgs.
"U.S. Appl. No. 13/253,931, Advisory Action dated Sep. 11, 2013", 3 pgs.
"U.S. Appl. No. 13/253,931, Examiner Interview Summary dated Sep. 12, 2013", 2 pgs.
"U.S. Appl. No. 13/253,931, Final Office Action dated Jun. 20, 2013", 11 pgs.
"U.S. Appl. No. 13/253,931, Final Office Action dated Dec. 3, 2014", 11 pgs.
"U.S. Appl. No. 13/253,931, Non Final Office Action dated Apr. 18, 2014", 11 pgs.
"U.S. Appl. No. 13/253,931, Non Final Office Action dated Nov. 28, 2012", 13 pgs.
"U.S. Appl. No. 13/253,931, Response filed Mar. 26, 2013 to Non Final Office Action dated Nov. 28, 2012", 13 pgs.
"U.S. Appl. No. 13/253,931, Response filed Aug. 16, 2013 to Final Office Action dated Jun. 20, 2013", 14 pgs.
"U.S. Appl. No. 13/253,931, Response filed Sep. 18, 2014 to Non Final Office Action dated Apr. 18, 2014", 9 pgs.
"U.S. Appl. No. 13/253,931, Response filed Sep. 20, 2013 to Final Office Action dated Jun. 20, 2013", 13 pgs.
"U.S. Appl. No. 13/253,936, Appeal Brief filed Jan. 8, 2016", 10 pgs.
"U.S. Appl. No. 13/253,936, Appeal Brief filed Jun. 8, 2015", 13 pgs.
"U.S. Appl. No. 13/253,936, Appeal Decision dated Aug. 3, 2017", 10 pgs.
"U.S. Appl. No. 13/253,936, Corrected Notice of Allowability dated Sep. 21, 2020", 2 pgs.
"U.S. Appl. No. 13/253,936, Corrected Notice of Allowability dated Sep. 25, 2020", 2 pgs.
"U.S. Appl. No. 13/253,936, Corrected Notice of Allowability dated Oct. 2, 2020", 2 pgs.
"U.S. Appl. No. 13/253,936, Examiner's Answer to Appeal Brief dated Jun. 23, 2016", 6 pgs.
"U.S. Appl. No. 13/253,936, Final Office Action dated Feb. 4, 2015", 14 pgs.
"U.S. Appl. No. 13/253,936, Final Office Action dated Apr. 9, 2020", 14 pgs.
"U.S. Appl. No. 13/253,936, Final Office Action dated Jun. 24, 2013", 13 pgs.
"U.S. Appl. No. 13/253,936, Final Office Action dated Jul. 11, 2018", 18 pgs.
"U.S. Appl. No. 13/253,936, Non Final Office Action dated Feb. 7, 2018", 16 pgs.
"U.S. Appl. No. 13/253,936, Non Final Office Action dated Jun. 18, 2014", 14 pgs.
"U.S. Appl. No. 13/253,936, Non Final Office Action dated Aug. 9, 2019", 15 pgs.
"U.S. Appl. No. 13/253,936, Non Final Office Action dated Oct. 8, 2015", 15 pgs.
"U.S. Appl. No. 13/253,936, Non Final Office Action dated Nov. 28, 2012", 11 pgs.
"U.S. Appl. No. 13/253,936, Notice of Allowance dated Aug. 5, 2020", 13 pgs.
"U.S. Appl. No. 13/253,936, Reply Brief filed Aug. 23, 2016", 4 pgs.
"U.S. Appl. No. 13/253,936, Response filed Feb. 10, 2020 to Non Final Office Action dated Aug. 9, 2019", 10 pgs.
"U.S. Appl. No. 13/253,936, Response filed Mar. 27, 2013 to Non Final Office Action dated Nov. 28, 2012", 11 pgs.
"U.S. Appl. No. 13/253,936, Response filed May 10, 2019 to Final Office Action dated Jul. 11, 2018", 13 pgs.
"U.S. Appl. No. 13/253,936, Response Filed Jun. 7, 2018 to Non Final Office Action dated Feb. 7, 2018", 13 pgs.
"U.S. Appl. No. 13/253,936, Response filed Jul. 9, 2020 to Final Office Action dated Apr. 9, 2020", 12 pgs.
"U.S. Appl. No. 13/253,936, Response filed Oct. 3, 2017 to Appeal Decision dated Aug. 3, 2017", 8 pgs.
"U.S. Appl. No. 13/253,936, Response filed Dec. 16, 2014 to Non Final Office Action dated Jun. 18, 2014", 9 pgs.
"U.S. Appl. No. 13/253,936, Response filed Dec. 23, 2013 to Final Office Action dated Jun. 24, 2013", 5 pgs.
"U.S. Appl. No. 13/253,941, Final Office Action dated Jun. 6, 2013", 16 pgs.
"U.S. Appl. No. 13/253,941, Final Office Action dated Dec. 26, 2014", 18 pgs.
"U.S. Appl. No. 13/253,941, Non Final Office Action dated May 7, 2014", 18 pgs.
"U.S. Appl. No. 13/253,941, Non Final Office Action dated Nov. 15, 2012", 14 pgs.
"U.S. Appl. No. 13/253,941, Response filed Apr. 15, 2013 to Non Final Office Action dated Nov. 15, 2012", 13 pgs.
"U.S. Appl. No. 13/253,941, Response filed Nov. 6, 2013 to Final Office Action dated Jun. 6, 2013", 11 pgs.
"U.S. Appl. No. 13/253,941, Response filed Nov. 7, 2014 to Non Final Office Action dated May 7, 2014", 10 pgs.
"U.S. Appl. No. 13/253,846, Response filed Aug. 6, 2014 to Non Final Office Action dated Mar. 7, 2014", 14 pgs.
"U.S. Appl. No. 13/255,825, Response filed Oct. 30, 2012 to Non Final Office Action dated Aug. 3, 2012", 18 pgs.
"U.S. Appl. No. 13/275,707, Appeal Brief filed May 26, 2015", 37 pgs.
"U.S. Appl. No. 13/275,707, Examiner Interview Summary dated Apr. 8, 2015", 3 pgs.
"U.S. Appl. No. 13/275,707, Examiner Interview Summary dated Jul. 29, 2013", 3 pgs.
"U.S. Appl. No. 13/275,707, Examiner Interview Summary dated Nov. 28, 2014", 2 pgs.
"U.S. Appl. No. 13/275,707, Final Office Action dated Jul. 30, 2013", 90 pgs.
"U.S. Appl. No. 13/275,707, Final Office Action dated Nov. 28, 2014", 57 pgs.
"U.S. Appl. No. 13/275,707, Non Final Office Action dated Apr. 30, 2014", 94 pgs.
"U.S. Appl. No. 13/275,707, Non Final Office Action dated Dec. 12, 2012", 39 pgs.
"U.S. Appl. No. 13/275,707, Notice of Allowance dated Jul. 27, 2015", 19 pgs.
"U.S. Appl. No. 13/275,707, Response filed Jan. 30, 2014 to Final Office Action dated Jul. 30, 2013", 14 pgs.
"U.S. Appl. No. 13/275,707, Response filed Apr. 9, 2013 to Non Final Office Action dated Dec. 12, 2012", 14 pgs.
"U.S. Appl. No. 13/275,707, Response filed Aug. 28, 2014 to Non Final Office Action dated Apr. 30, 2014", 11 pgs.
"U.S. Appl. No. 13/309,039, Advisory Action dated Apr. 16, 2013", 3 pgs.
"U.S. Appl. No. 13/309,039, Appeal Brief filed Jul. 5, 2013", 18 pgs.
"U.S. Appl. No. 13/309,039, Appeal Brief filed Sep. 3, 2014", 20 pgs.
"U.S. Appl. No. 13/309,039, Appeal Decision dated Sep. 23, 2016", 10 pgs.
"U.S. Appl. No. 13/309,039, Decision on Pre-Appeal Brief Request dated Jun. 7, 2013", 2 pgs.
"U.S. Appl. No. 13/309,039, Examiner Interview Summary dated Oct. 23, 2012", 3 pgs.
"U.S. Appl. No. 13/309,039, Examiner's Answer to Appeal Brief dated Nov. 14, 2014", 11 pgs.
"U.S. Appl. No. 13/309,039, Final Office Action dated Jan. 2, 2013", 11 pgs.
"U.S. Appl. No. 13/309,039, Non Final Office Action dated Sep. 11, 2012", 9 pgs.

(56) References Cited

OTHER PUBLICATIONS

"U.S. Appl. No. 13/309,039, Non Final Office Action dated Sep. 11, 2013", 13 pgs.
"U.S. Appl. No. 13/309,039, Pre-Appeal Brief Request filed May 6, 2013", 5 pgs.
"U.S. Appl. No. 13/309,039, Response filed Jan. 14, 2015 to Examiner's Answer to Appeal Brief dated Nov. 14, 2014", 8 pgs.
"U.S. Appl. No. 13/309,039, Response filed Apr. 1, 2013 to Final Office Action dated Jan. 2, 2013", 13 pgs.
"U.S. Appl. No. 13/309,039, Response filed Oct. 22, 2012 to Non Final Office Action dated Sep. 11, 2012", 13 pgs.
"U.S. Appl. No. 13/309,060, Advisory Action dated Apr. 18, 2014", 3 pgs.
"U.S. Appl. No. 13/309,060, Appeal Brief filed Apr. 21, 2015", 16 pgs.
"U.S. Appl. No. 13/309,060, Appeal Decision dated Aug. 25, 2017", 9 pgs.
"U.S. Appl. No. 13/309,060, Final Office Action dated Oct. 11, 2013", 13 pgs.
"U.S. Appl. No. 13/309,060, Final Office Action dated Nov. 28, 2014", 13 pgs.
"U.S. Appl. No. 13/309,060, Final Office Action dated Dec. 7, 2012", 10 pgs.
"U.S. Appl. No. 13/309,060, Non Final Office Action dated May 30, 2013", 11 pgs.
"U.S. Appl. No. 13/309,060, Non Final Office Action dated Jun. 17, 2014", 12 pgs.
"U.S. Appl. No. 13/309,060, Non Final Office Action dated Aug. 1, 2012", 8 pgs.
"U.S. Appl. No. 13/309,060, Notice of Allowance dated Nov. 27, 2017", 7 pgs.
"U.S. Appl. No. 13/309,060, Response filed Mar. 4, 2014 to Final Office Action dated Dec. 24, 2013", 11 pgs.
"U.S. Appl. No. 13/309,060, Response filed Apr. 8, 2013 to Final Office Action dated Dec. 7, 2012", 10 pgs.
"U.S. Appl. No. 13/309,060, Response filed Aug. 15, 2013 to Non Final Office Action dated May 30, 2013", 10 pgs.
"U.S. Appl. No. 13/309,060, Response filed Sep. 20, 2012 to Non Final Office Action dated Aug. 1, 2012", 8 pgs.
"U.S. Appl. No. 13/309,060, Response filed Nov. 17, 2014 to Non Final Office Action dated Jun. 17, 2014", 6 pgs.
"U.S. Appl. No. 13/309,080, Appeal Brief filed May 20, 2014", 12 pgs.
"U.S. Appl. No. 13/309,080, Appeal Decision dated May 27, 2016", 8 pgs.
"U.S. Appl. No. 13/309,080, Examiner Interview Summary dated Sep. 5, 2012", 3 pgs.
"U.S. Appl. No. 13/309,080, Examiner Interview Summary dated Dec. 17, 2012", 3 pgs.
"U.S. Appl. No. 13/309,080, Final Office Action dated Oct. 11, 2013", 11 pgs.
"U.S. Appl. No. 13/309,080, Final Office Action dated Nov. 5, 2012", 8 pgs.
"U.S. Appl. No. 13/309,080, Non Final Office Action dated Jun. 10, 2013", 12 pgs.
"U.S. Appl. No. 13/309,080, Non Final Office Action dated Jul. 30, 2012", 8 pgs.
"U.S. Appl. No. 13/309,080, Notice of Non-Compliant Appeal Brief dated Jun. 3, 2014", 2 pgs.
"U.S. Appl. No. 13/309,080, Notice of Panel Decision from Pre-Appeal Brief Review dated May 1, 2014", 2 pgs.
"U.S. Appl. No. 13/309,080, Pre-Appeal Brief Request for Review filed Mar. 4, 2014", 5 pgs.
"U.S. Appl. No. 13/309,080, Response filed Aug. 15, 2013 to Non Final Office Action dated Jun. 10, 2013", 14 pgs.
"U.S. Appl. No. 13/309,080, Response filed Aug. 29, 2012 to Non Final Office Action dated Jul. 30, 2012", 11 pgs.
"U.S. Appl. No. 13/309,080, Response filed Sep. 30, 2014 to Examiner's Answer to Appeal Brief dated Aug. 1, 2014", 5 pgs.
"U.S. Appl. No. 13/309,080, Examiner's Answer to Appeal Brief dated Aug. 1, 2014", 7 pgs.
"U.S. Appl. No. 13/309,102, Appeal Brief filed Jun. 5, 2014", 19 pgs.
"U.S. Appl. No. 13/309,102, Appeal Decision dated Jun. 1, 2016", 13 pgs.
"U.S. Appl. No. 13/309,102, Decision on Pre-Appeal Brief Request dated May 1, 2014", 2 pgs.
"U.S. Appl. No. 13/309,102, Examiner's Answer to Appeal Brief dated Jul. 31, 2014", 6 pgs.
"U.S. Appl. No. 13/309,102, Final Office Action dated Nov. 27, 2013", 12 pgs.
"U.S. Appl. No. 13/309,102, Final Office Action dated Dec. 10, 2012", 10 pgs.
"U.S. Appl. No. 13/309,102, Non Final Office Action dated May 30, 2013", 13 pgs.
"U.S. Appl. No. 13/309,102, Non Final Office Action dated Aug. 6, 2012", 7 pgs.
"U.S. Appl. No. 13/309,102, Pre-Appeal Brief Request filed Mar. 26, 2014", 5 pgs.
"U.S. Appl. No. 13/309,102, Response filed Apr. 9, 2013 to Final Office Action dated Dec. 10, 2012", 13 pgs.
"U.S. Appl. No. 13/309,102, Response filed Sep. 5, 2013 to Non Final Office Action dated May 30, 2013", 13 pgs.
"U.S. Appl. No. 13/309,102, Response filed Sep. 25, 2012 to Non Final Office Action dated Aug. 6, 2012", 10 pgs.
"U.S. Appl. No. 13/309,102, Response filed Sep. 30, 2014 to Examiner's Answer to Appeal Brief dated Jul. 31, 2014", 4 pgs.
"U.S. Appl. No. 13/309,127, Appeal Brief filed Apr. 30, 2014", 19 pgs.
"U.S. Appl. No. 13/309,127, Appeal Decision dated Jul. 26, 2017", 16 pgs.
"U.S. Appl. No. 13/309,127, Final Office Action dated Oct. 10, 2012", 18 pgs.
"U.S. Appl. No. 13/309,127, Final Office Action dated Oct. 22, 2013", 19 pgs.
"U.S. Appl. No. 13/309,127, Non Final Office Action dated Apr. 25, 2013", 19 pgs.
"U.S. Appl. No. 13/309,127, Non Final Office Action dated Jun. 25, 2012", 15 pgs.
"U.S. Appl. No. 13/309,127, Pre-Appeal Brief Request filed Feb. 28, 2014", 5 pgs.
"U.S. Appl. No. 13/309,127, Response filed Mar. 25, 2013 to Final Office Action dated Oct. 10, 2012", 13 pgs.
"U.S. Appl. No. 13/309,127, Response filed Jul. 24, 2013 to Non Final Office Action dated Apr. 25, 2013", 11 pgs.
"U.S. Appl. No. 13/309,127, Response filed Aug. 1, 2012 to Non Final Office Action dated Jun. 25, 2012", 15 pgs.
"U.S. Appl. No. 13/309,127, Response filed Sep. 30, 2014 to Examiner's Answer to Appeal Brief dated Jul. 31, 2014", 6 pgs.
"U.S. Appl. No. 13/309,127, Examiner's Answer to Appeal Brief dated Jul. 31, 2014", 9 pgs.
"U.S. Appl. No. 13/309,146, Advisory Action dated Feb. 12, 2015", 3 pgs.
"U.S. Appl. No. 13/309,146, Appeal Brief filed Jan. 12, 2015", 10 pgs.
"U.S. Appl. No. 13/309,146, Appeal Decision dated Jun. 1, 2016", 10 pgs.
"U.S. Appl. No. 13/309,146, Final Office Action dated Jun. 27, 2014", 14 pgs.
"U.S. Appl. No. 13/309,146, Non Final Office Action dated Dec. 19, 2013", 10 pgs.
"U.S. Appl. No. 13/309,146, Response filed Apr. 24, 2014 to Non Final Office Action dated Dec. 19, 2013", 10 pgs.
"U.S. Appl. No. 13/309,166, Advisory Action dated Dec. 1, 2017", 3 pgs.
"U.S. Appl. No. 13/309,166, Appeal Brief filed Sep. 1, 2016", 17 pgs.
"U.S. Appl. No. 13/309,166, Examiner Interview Summary dated May 20, 2015", 3 pgs.
"U.S. Appl. No. 13/309,166, Examiner Interview Summary dated Nov. 13, 2017", 5 pgs.

(56) References Cited

OTHER PUBLICATIONS

"U.S. Appl. No. 13/309,166, Final Office Action dated Aug. 10, 2017", 15 pgs.
"U.S. Appl. No. 13/309,166, Final Office Action dated Sep. 1, 2015", 11 pgs.
"U.S. Appl. No. 13/309,166, Final Office Action mdated Nov. 13, 2013", 9 pgs.
"U.S. Appl. No. 13/309,166, Non Final Office Action dated Feb. 13, 2015", 10 pgs.
"U.S. Appl. No. 13/309,166, Non Final Office Action dated Feb. 22, 2013", 9 pgs.
"U.S. Appl. No. 13/309,166, Non Final Office Action dated May 23, 2013", 9 pgs.
"U.S. Appl. No. 13/309,166, Non Final Office Action dated Dec. 29, 2016", 15 pgs.
"U.S. Appl. No. 13/309,166, Response filed Jan. 10, 2018 to Final Office Action dated Aug. 10, 2017", 9 pgs.
"U.S. Appl. No. 13/309,166, Response filed Apr. 11, 2014 to Final Office Action dated Nov. 13, 2013", 13 pgs.
"U.S. Appl. No. 13/309,166, Response filed May 1, 2017 to Non Final Office Action dated Dec. 29, 2016", 14 pgs.
"U.S. Appl. No. 13/309,166, Response filed May 13, 2015 to Non Final Office Action dated Feb. 13, 2015", 8 pgs.
"U.S. Appl. No. 13/309,166, Response filed May 14, 2013 to Non Final Office Action dated Feb. 22, 2013", 10 pgs.
"U.S. Appl. No. 13/309,166, Response filed Aug. 15, 2013 to Non Final Office Action dated May 23, 2013", 11 pgs.
"U.S. Appl. No. 13/309,166, Response filed Nov. 6, 2017 to Final Office Action dated Aug. 10, 2017", 11 pgs.
"U.S. Appl. No. 13/309,200, Appeal Brief Filed Jun. 8, 2015", 17 pgs.
"U.S. Appl. No. 13/309,200, Appeal Decision dated Aug. 28, 2017", 12 pgs.
"U.S. Appl. No. 13/309,200, Corrected Notice of Allowability dated Jan. 9, 2019", 2 pgs.
"U.S. Appl. No. 13/309,200, Final Office Action dated Jan. 8, 2015", 14 pgs.
"U.S. Appl. No. 13/309,200, Final Office Action dated Jan. 14, 2014", 15 pgs.
"U.S. Appl. No. 13/309,200, Final Office Action dated Jun. 18, 2018", 18 pgs.
"U.S. Appl. No. 13/309,200, Non Final Office Action dated Jul. 2, 2013", 14 pgs.
"U.S. Appl. No. 13/309,200, Non Final Office Action dated Sep. 10, 2012", 12 pgs.
"U.S. Appl. No. 13/309,200, Non Final Office Action dated Sep. 24, 2014", 14 pgs.
"U.S. Appl. No. 13/309,200, Non Final Office Action dated Dec. 4, 2017", 17 pgs.
"U.S. Appl. No. 13/309,200, Notice of Allowance dated Dec. 6, 2018", 9 pgs.
"U.S. Appl. No. 13/309,200, Preliminary Amendment filed Dec. 8, 2011", 8 pgs.
"U.S. Appl. No. 13/309,200, Response filed Jan. 2, 2014 to Non Final Office Action dated Jul. 2, 2013", 12 pgs.
"U.S. Appl. No. 13/309,200, Response filed Mar. 11, 2013 to Non Final Office Action dated Sep. 10, 2012", 13 pgs.
"U.S. Appl. No. 13/309,200, Response filed Apr. 4, 2018 to Non Final Office Action dated Dec. 4, 2017", 11 pgs.
"U.S. Appl. No. 13/309,200, Response filed Jul. 10, 2014 to Final Office Action dated Jan. 14, 2014", 13 pgs.
"U.S. Appl. No. 13/309,200, Response filed Jan. 17, 2018 to Final Office Action dated Jun. 18, 2018", 38 pgs.
"U.S. Appl. No. 13/309,200, Response filed Oct. 30, 2017 to Final Office Action dated Jan. 8, 2017", 12 pgs.
"U.S. Appl. No. 13/309,200, Response filed Dec. 23, 2014 to Non Final Office Action dated Sep. 24, 2014", 9 pgs.
"U.S. Appl. No. 13/310,279, Appeal Brief filed Nov. 3, 2014", 19 pgs.
"U.S. Appl. No. 13/310,279, Appeal Brief filed Sep. 11, 2019", 19 pgs.
"U.S. Appl. No. 13/310,279, Appeal Decision dated Aug. 30, 2017", 9 pgs.
"U.S. Appl. No. 13/310,279, Examiner Interview Summary dated Nov. 19, 2013", 3 pgs.
"U.S. Appl. No. 13/310,279, Final Office Action dated Jun. 24, 2021", 25 pgs.
"U.S. Appl. No. 13/310,279, Final Office Action dated Jul. 23, 2020", 23 pgs.
"U.S. Appl. No. 13/310,279, Final Office Action dated Sep. 10, 2018", 24 pgs.
"U.S. Appl. No. 13/310,279, Final Office Action dated Dec. 3, 2013", 14 pgs.
"U.S. Appl. No. 13/310,279, Non Final Office Action dated Jan. 31, 2020", 25 pgs.
"U.S. Appl. No. 13/310,279, Non Final Office Action dated Feb. 2, 2018", 21 pgs.
"U.S. Appl. No. 13/310,279, Non Final Office Action dated Jun. 17, 2013", 12 pgs.
"U.S. Appl. No. 13/310,279, Non Final Office Action dated Dec. 24, 2020", 24 pgs.
"U.S. Appl. No. 13/310,279, Notice of Allowance dated Nov. 30, 2021", 9 pgs.
"U.S. Appl. No. 13/310,279, Pre-Appeal Brief Request filed Apr. 3, 2014", 5 pgs.
"U.S. Appl. No. 13/310,279, Reply Brief dated Jan. 4, 2016 to Appeal Brief filed Nov. 3, 2014", 3 pgs.
"U.S. Appl. No. 13/310,279, Response filed Mar. 24, 2021 to Non Final Office Action dated Dec. 24, 2020", 11 pgs.
"U.S. Appl. No. 13/310,279, Response filed May 2, 2018 to Non Final Office Action dated Feb. 2, 2018", 10 pgs.
"U.S. Appl. No. 13/310,279, Response filed Jun. 1, 2020 to Non Final Office Action dated Jan. 31, 2020", 11 pgs.
"U.S. Appl. No. 13/310,279, Response filed Sep. 13, 2013 to Non Final Office Action dated Jun. 17, 2013", 15 pgs.
"U.S. Appl. No. 13/310,279, Response filed Oct. 25, 2021 to Final Office Action dated Jun. 24, 2021", 11 pgs.
"U.S. Appl. No. 13/310,279, Response filed Oct. 30, 2017 to Non Final Office Action dated Dec. 3, 2017", 8 pgs.
"U.S. Appl. No. 13/310,279, Response filed Nov. 23, 2020 to Final Office Action dated Jul. 23, 2020", 11 pgs.
"U.S. Appl. No. 13/310,322, Appeal Brief filed Jan. 15, 2015", 17 pgs.
"U.S. Appl. No. 13/310,322, Appeal Decision dated Sep. 20, 2017", 18 pgs.
"U.S. Appl. No. 13/310,322, Decision on Pre-Appeal Brief Request dated Sep. 15, 2015", 2 pgs.
"U.S. Appl. No. 13/310,322, Final Office Action dated Feb. 13, 2014", 15 pgs.
"U.S. Appl. No. 13/310,322, Final Office Action dated Mar. 31, 2015", 16 pgs.
"U.S. Appl. No. 13/310,322, Non Final Office Action dated Jul. 2, 2013", 16 pgs.
"U.S. Appl. No. 13/310,322, Non Final Office Action dated Oct. 3, 2014", 16 pgs.
"U.S. Appl. No. 13/310,322, Pre-Appeal Brief Request filed Jul. 31, 2015", 5 pgs.
"U.S. Appl. No. 13/310,322, Reply Brief filed Aug. 15, 2016", 4 pgs.
"U.S. Appl. No. 13/310,322, Response filed Jan. 5, 2015 to Non Final Office Action dated Oct. 3, 2014", 12 pgs.
"U.S. Appl. No. 13/310,322, Response filed Nov. 1, 2013 to Non Final Office Action dated Jul. 2, 2013", 12 pgs.
"U.S. Appl. No. 13/310,332, Response filed Jul. 14, 2014 to Final Office Action dated Feb. 13, 2014", 12 pgs.
"U.S. Appl. No. 13/310,368, Advisory Action dated Jun. 9, 2015", 3 pgs.
"U.S. Appl. No. 13/310,368, Advisory Action dated Jul. 8, 2015", 2 pgs.
"U.S. Appl. No. 13/310,368, Advisory Action dated Aug. 21, 2015", 2 pgs.

(56) References Cited

OTHER PUBLICATIONS

"U.S. Appl. No. 13/310,368, Appeal Brief filed Aug. 2, 2018", 17 pgs.
"U.S. Appl. No. 13/310,368, Appeal Brief filed Aug. 17, 2015", 27 pgs.
"U.S. Appl. No. 13/310,368, Appeal Decision dated Aug. 30, 2017", 11 pgs.
"U.S. Appl. No. 13/310,368, Final Office Action dated Jan. 7, 2014", 17 pgs.
"U.S. Appl. No. 13/310,368, Final Office Action dated Mar. 18, 2015", 15 pgs.
"U.S. Appl. No. 13/310,368, Final Office Action dated Jul. 18, 2019", 12 pgs.
"U.S. Appl. No. 13/310,368, Non Final Office Action dated Jun. 17, 2013", 17 pgs.
"U.S. Appl. No. 13/310,368, Non Final Office Action dated Sep. 12, 2014", 19 pgs.
"U.S. Appl. No. 13/310,368, Non Final Office Action dated Nov. 29, 2018", 16 pgs.
"U.S. Appl. No. 13/310,368, Non Final Office Action dated Dec. 1, 2017", 17 pgs.
"U.S. Appl. No. 13/310,368, Notice of Allowance dated Dec. 5, 2019", 11 pgs.
"U.S. Appl. No. 13/310,368, Response filed May 18, 2015 to Final Office Action dated Mar. 18, 2015", 11 pgs.
"U.S. Appl. No. 13/310,368, Response filed Jul. 7, 2014 to Final Office Action dated Jan. 7, 2014", 12 pgs.
"U.S. Appl. No. 13/310,368, Response filed Sep. 17, 2013 to Non Final Office Action dated Jun. 17, 2013", 15 pgs.
"U.S. Appl. No. 13/310,368, Response filed Oct. 18, 2019 to Final Office Action dated Jul. 18, 2019", 10 pgs.
"U.S. Appl. No. 13/310,368, Response filed Oct. 30, 2017 to Final Office Action dated Mar. 18, 2015", 8 pgs.
"U.S. Appl. No. 13/310,368, Response filed Dec. 12, 2014 to Non Final Office Action dated Sep. 12, 2014", 9 pgs.
"U.S. Appl. No. 13/310,368, Response filed Apr. 29, 2019 to Non Final Office Action dated Nov. 29, 2018", 12 pgs.
"U.S. Appl. No. 13/310,417, Appeal Brief filed Sep. 11, 2015", 19 pgs.
"U.S. Appl. No. 13/310,417, Final Office Action dated Jan. 9, 2014", 17 pgs.
"U.S. Appl. No. 13/310,417, Final Office Action dated Mar. 11, 2015", 17 pgs.
"U.S. Appl. No. 13/310,417, Non Final Office Action dated Feb. 11, 2016", 12 pgs.
"U.S. Appl. No. 13/310,417, Non Final Office Action dated Jun. 17, 2013", 13 pgs.
"U.S. Appl. No. 13/310,417, Non Final Office Action dated Sep. 8, 2014", 17 pgs.
"U.S. Appl. No. 13/310,417, Response filed Sep. 17, 2013 to Non Final Office Action dated Jun. 17, 2013", 14 pgs.
"U.S. Appl. No. 13/310,452, Advisory Action dated Jul. 17, 2014", 3 pgs.
"U.S. Appl. No. 13/310,452, Appeal Brief filed Oct. 17, 2016", 25 pgs.
"U.S. Appl. No. 13/310,452, Appeal Decision dated Sep. 29, 2017", 20 pgs.
"U.S. Appl. No. 13/310,452, Decision on Pre-Appeal Brief dated Apr. 17, 2015", 2 pgs.
"U.S. Appl. No. 13/310,452, Final Office Action dated May 1, 2014", 18 pgs.
"U.S. Appl. No. 13/310,452, Final Office Action dated Dec. 15, 2015", 21 pgs.
"U.S. Appl. No. 13/310,452, Non Final Office Action dated May 4, 2015", 17 pgs.
"U.S. Appl. No. 13/310,452, Non Final Office Action dated Jul. 10, 2013", 14 pgs.
"U.S. Appl. No. 13/310,452, Non Final Office Action dated Oct. 6, 2014", 18 pgs.
"U.S. Appl. No. 13/310,452, Pre-Appeal Brief Request filed Mar. 5, 2015", 5 pgs.
"U.S. Appl. No. 13/310,452, Response filed Jan. 10, 2014 to Non Final Office Action dated Jul. 10, 2013", 11 pgs.
"U.S. Appl. No. 13/310,452, Response filed Jul. 1, 2014 to Final Office Action dated May 1, 2014", 11 pgs.
"U.S. Appl. No. 13/310,452, Response filed Sep. 3, 2015 to Non Final Office Action dated May 4, 2015", 14 pgs.
"U.S. Appl. No. 13/312,507, Final Office Action dated Nov. 21, 2014", 12 pgs.
"U.S. Appl. No. 13/312,507, Non Final Office Action dated Mar. 26, 2015", 13 pgs.
"U.S. Appl. No. 13/312,507, Non Final Office Action dated May 27, 2014", 13 pgs.
"U.S. Appl. No. 13/312,507, Notice of Allowance dated Oct. 30, 2015", 19 pgs.
"U.S. Appl. No. 13/312,507, PTO Response to Rule 312 Communication dated Feb. 16, 2016", 2 pgs.
"U.S. Appl. No. 13/312,507, Response filed Feb. 19, 2015 to Final Office Action dated Nov. 21, 2014", 10 pgs.
"U.S. Appl. No. 13/312,507, Response filed Jul. 27, 2015 to Non Final Office Action dated Mar. 26, 2015", 11 pgs.
"U.S. Appl. No. 13/312,507, Response filed Oct. 27, 2014 to Non Final Office Action dated May 27, 2014", 10 pgs.
"U.S. Appl. No. 13/351,533, Final Office Action dated Jan. 23, 2013", 33 pgs.
"U.S. Appl. No. 13/351,533, Final Office Action dated Mar. 20, 2015", 28 pgs.
"U.S. Appl. No. 13/351,533, Non Final Office Action dated Feb. 4, 2014", 26 pgs.
"U.S. Appl. No. 13/351,533, Non Final Office Action dated May 25, 2012", 20 pgs.
"U.S. Appl. No. 13/351,533, Non Final Office Action dated Sep. 6, 2012", 26 pgs.
"U.S. Appl. No. 13/351,533, Non Final Office Action dated Oct. 14, 2014", 25 pgs.
"U.S. Appl. No. 13/351,533, Response filed Jan. 14, 2015 to Non Final Office Action dated Oct. 14, 2014", 18 pgs.
"U.S. Appl. No. 13/351,533, Response filed Apr. 10, 2013 to Final Office Action dated Jan. 23, 2013", 12 pgs.
"U.S. Appl. No. 13/351,533, Response Filed Jun. 3, 2014 to Non Final Office Action dated Feb. 4, 2014", 14 pgs.
"U.S. Appl. No. 13/351,533, Response filed Jun. 8, 2012 to Non Final Office Action dated May 25, 2012", 12 pgs.
"U.S. Appl. No. 13/351,533, Response filed Nov. 20, 2012 to Non Final Office Action dated Sep. 6, 2012", 14 pgs.
"U.S. Appl. No. 13/365,062, Non Final Office Action dated Mar. 19, 2015", 14 pgs.
"U.S. Appl. No. 13/365,062, Non Final Office Action dated Apr. 30, 2014", 13 pgs.
"U.S. Appl. No. 13/365,062, Non Final Office Action dated Aug. 19, 2013", 14 pgs.
"U.S. Appl. No. 13/365,062, Non Final Office Action dated Oct. 9, 2014", 13 pgs.
"U.S. Appl. No. 13/365,062, Non Final Office Action dated Nov. 30, 2012", 19 pgs.
"U.S. Appl. No. 13/365,062, Non-Final Office Action dated Jul. 3, 2012", 20 pgs.
"U.S. Appl. No. 13/365,062, Notice of Allowance dated Jul. 24, 2015", 11 pgs.
"U.S. Appl. No. 13/365,062, Response filed Feb. 9, 2015 to Non Final Office Action dated Oct. 9, 2014", 6 pgs.
"U.S. Appl. No. 13/365,062, Response filed May 29, 2013 to Non Final Office Action dated Nov. 30, 2012", 8 pgs.
"U.S. Appl. No. 13/365,062, Response filed Jun. 19, 2015 to Non Final Office Action dated Mar. 19, 2015", 9 pgs.
"U.S. Appl. No. 13/365,062, Response filed Sep. 2, 2014 to Non Final Office Action dated Jul. 30, 2014", 8 pgs.
"U.S. Appl. No. 13/365,062, Response filed Oct. 3, 2012 to Non Final Office Action dated Jul. 3, 2012", 8 pgs.
"U.S. Appl. No. 13/365,062, Response filed Dec. 19, 2013 to Non Final Office Action dated Aug. 19, 2013", 10 pgs.

(56) References Cited

OTHER PUBLICATIONS

"U.S. Appl. No. 13/408,877, Appeal Brief filed Nov. 10, 2015", 14 [gs/.
"U.S. Appl. No. 13/408,877, Appeal Decision dated Sep. 6, 2017", 23 pgs.
"U.S. Appl. No. 13/408,877, Final Office Action dated May 8, 2015", 24 pgs.
"U.S. Appl. No. 13/408,877, Final Office Action dated Sep. 3, 2013", 27 pgs.
"U.S. Appl. No. 13/408,877, Non Final Office Action dated Feb. 28, 2013", 22 pgs.
"U.S. Appl. No. 13/408,877, Non Final Office Action dated Oct. 8, 2014", 26 pgs.
"U.S. Appl. No. 13/408,877, Response filed Jan. 8, 2015 to Non Final Office Action dated Oct. 8, 2014", 15 pgs.
"U.S. Appl. No. 13/408,877, Response filed May 16, 2013 to Non Final Office Action dated Feb. 28, 2013", 17 pgs.
"U.S. Appl. No. 13/408,877, Response filed Dec. 3, 2013 to Final Office Action dated Sep. 3, 2013", 18 pgs.
"U.S. Appl. No. 13/408,917, Appeal Brief filed Jan. 19, 2016", 18 pgs.
"U.S. Appl. No. 13/408,917, Appeal Decision dated Sep. 12, 2017", 19 pgs.
"U.S. Appl. No. 13/408,917, Decision on Pre-Appeal Brief Request dated Sep. 17, 2015", 2 pgs.
"U.S. Appl. No. 13/408,917, Examiner Interview Summary dated Aug. 28, 2013", 3 pgs.
"U.S. Appl. No. 13/408,917, Final Office Action dated May 11, 2015", 23 pgs.
"U.S. Appl. No. 13/408,917, Final Office Action dated Aug. 28, 2013", 24 pgs.
"U.S. Appl. No. 13/408,917, Non Final Office Action dated Mar. 5, 2013", 18 pgs.
"U.S. Appl. No. 13/408,917, Non Final Office Action dated Oct. 9, 2014", 24 pgs.
"U.S. Appl. No. 13/408,917, Pre-Appeal Brief Request filed Aug. 12, 2015", 5 pgs.
"U.S. Appl. No. 13/408,917, Reply Brief filed Oct. 3, 2016", 4 pgs.
"U.S. Appl. No. 13/408,917, Response filed Jan. 9, 2015 to Non Final Office Action dated Oct. 9, 2014", 13 pgs.
"U.S. Appl. No. 13/408,917, Response filed Jun. 3, 2013 to Non Final Office Action dated Mar. 5, 2013", 16 pgs.
"U.S. Appl. No. 13/408,917, Response filed Nov. 27, 2013 to Final Office Action dated Aug. 28, 2013", 17 pgs.
"U.S. Appl. No. 13/409,189 Examiner's Answer dated Jan. 4, 2017", 12 pgs.
"U.S. Appl. No. 13/409,189, Appeal Brief filed Oct. 25, 2016", 30 pgs.
"U.S. Appl. No. 13/409,189, Appeal Decision dated Dec. 18, 2017", 14 pgs.
"U.S. Appl. No. 13/409,189, Examiner Interview Summary dated Aug. 30, 2013", 3 pgs.
"U.S. Appl. No. 13/409,189, Final Office Action dated May 8, 2015", 23 pgs.
"U.S. Appl. No. 13/409,189, Final Office Action dated Aug. 28, 2013", 22 pgs.
"U.S. Appl. No. 13/409,189, Non Final Office Action dated Feb. 28, 2013", 20 pgs.
"U.S. Appl. No. 13/409,189, Non Final Office Action dated Oct. 9, 2014", 23 pgs.
"U.S. Appl. No. 13/409,189, Non Final Office Action dated Dec. 23, 2015", 12 pgs.
"U.S. Appl. No. 13/409,189, Response filed Jan. 9, 2015 to Non Final Office Action dated Oct. 9, 2014", 13 pgs.
"U.S. Appl. No. 13/409,189, Response filed May 28, 2013 to Non Final Office Action dated Feb. 28, 2013", 16 pgs.
"U.S. Appl. No. 13/409,189, Response filed Sep. 8, 2005 to Final Office Action dated May 8, 2015", 16 pgs.
"U.S. Appl. No. 13/409,189, Response filed Nov. 27, 2013 to Final Office Action dated Aug. 28, 2013", 15 pgs.
"U.S. Appl. No. 13/422,750, Final Office Action dated Jun. 15, 2016", 37 pgs.
"U.S. Appl. No. 13/422,750, Final Office Action dated Aug. 7, 2013", 29 pgs.
"U.S. Appl. No. 13/422,750, Non Final Office Action dated Apr. 1, 2014", 32 pgs.
"U.S. Appl. No. 13/422,750, Non Final Office Action dated Apr. 12, 2013", 19 pgs.
"U.S. Appl. No. 13/422,750, Non Final Office Action dated Oct. 31, 2014", 32 pgs.
"U.S. Appl. No. 13/422,750, Response filed Jan. 30, 2014 to Final Office Action dated Aug. 7, 2013", 13 pgs.
"U.S. Appl. No. 13/422,750, Response filed Feb. 2, 2015 to Non Final Office Action dated Oct. 31, 2014", 11 pgs.
"U.S. Appl. No. 13/422,750, Response filed Jul. 12, 2013 to Non Final Office Action dated Apr. 12, 2013", 14 pgs.
"U.S. Appl. No. 13/422,750, Response filed Sep. 2, 2014 to Non Final Office Action dated Apr. 1, 2014", 10 pgs.
"U.S. Appl. No. 13/424,682, Non Final Office Action dated Apr. 11, 2013", 6 pgs.
"U.S. Appl. No. 13/424,682, Notice of Allowance dated Jul. 30, 2013", 13 pgs.
"U.S. Appl. No. 13/424,682, Response filed Jul. 5, 2013 to Non Final Office Action dated Apr. 11, 2013", 10 pgs.
"U.S. Appl. No. 13/424,705, Advisory Action dated Nov. 29, 2013", 3 pgs.
"U.S. Appl. No. 13/424,705, Final Office Action dated Sep. 11, 2015", 28 pgs.
"U.S. Appl. No. 13/424,705, Final Office Action dated Sep. 19, 2013", 11 pgs.
"U.S. Appl. No. 13/424,705, Non Final Office Action dated Apr. 12, 2013", 14 pgs.
"U.S. Appl. No. 13/424,705, Non Final Office Action dated Jun. 16, 2014", 21 pgs.
"U.S. Appl. No. 13/424,705, Non Final Office Action dated Jul. 23, 2014", 21 pgs.
"U.S. Appl. No. 13/424,705, Response filed Jul. 12, 2013 to Non Final Office Action dated Apr. 12, 2013", 11 pgs.
"U.S. Appl. No. 13/424,705, Response filed Nov. 19, 2013 to Final Office Action dated Sep. 19, 2013", 11 pgs.
"U.S. Appl. No. 13/424,705, Response filed Nov. 24, 2014 to Non Final Office Action dated Jul. 23, 2014", 14 pgs.
"U.S. Appl. No. 13/452,400, Examiner Interview Summary dated Sep. 11, 2013", 3 pgs.
"U.S. Appl. No. 13/452,400, Final Office Action dated Jul. 5, 2013", 25 pgs.
"U.S. Appl. No. 13/452,400, Final Office Action dated Jul. 30, 2015", 32 pgs.
"U.S. Appl. No. 13/452,400, Non Final Office Action dated Jan. 15, 2015", 24 pgs.
"U.S. Appl. No. 13/452,400, Non Final Office Action dated Oct. 5, 2012", 23 pgs.
"U.S. Appl. No. 13/452,400, Preliminary Amendment filed May 16, 2012", 3 pgs.
"U.S. Appl. No. 13/452,400, Response filed Jan. 7, 2013 to Non Final Office Action dated Oct. 5, 2012", 12 pgs.
"U.S. Appl. No. 13/452,400, Response filed Apr. 15, 2015 to Non Final Office Action dated Jan. 15, 2015", 31 pgs.
"U.S. Appl. No. 13/452,400, Response filed Sep. 26, 2013 to Final Office Action", 12 pgs.
"U.S. Appl. No. 13/464,598, Appeal Brief filed Jan. 28, 2016", 19 pgs.
"U.S. Appl. No. 13/464,598, Appeal Decision dated Jul. 31, 2017", 18 pgs.
"U.S. Appl. No. 13/464,598, Examiner Interview Summary dated May 1, 2014", 3 pgs.
"U.S. Appl. No. 13/464,598, Final Office Action dated Jul. 28, 2015", 38 pgs.
"U.S. Appl. No. 13/464,598, Non Final Office Action dated Mar. 16, 2015", 51 pgs.
"U.S. Appl. No. 13/464,598, Non Final Office Action dated Dec. 4, 2013", 26 pgs.

(56) References Cited

OTHER PUBLICATIONS

"U.S. Appl. No. 13/464,598, Notice of Allowance dated Oct. 12, 2017", 5 pgs.
"U.S. Appl. No. 13/464,598, Response filed Apr. 5, 2014 to Non Final Office Action dated Dec. 4, 2013", 44 pgs.
"U.S. Appl. No. 13/464,598, Response filed Jul. 16, 2015 to Non Final Office Action dated Mar. 16, 2015", 24 pgs.
"U.S. Appl. No. 13/464,598, Response filed Oct. 2, 2017 to Final Office Action dated Jul. 28, 2017", 17 pgs.
"U.S. Appl. No. 13/553,572 Response filed Jun. 3, 2013 to Non-Final Office Action dated Mar. 7, 2013", 17 pgs.
"U.S. Appl. No. 13/553,572, Final Office Action dated Jul. 2, 2013", 12 pgs.
"U.S. Appl. No. 13/553,572, Non Final Office Action dated Mar. 7, 2013", 14 pgs.
"U.S. Appl. No. 13/553,572, Non Final Office Action dated Nov. 4, 2014", 13 pgs.
"U.S. Appl. No. 13/553,572, Preliminary Amendment filed Sep. 17, 2012", 7 pgs.
"U.S. Appl. No. 13/553,572, Response filed Jan. 2, 2014 to Final Office Action dated Jul. 2, 2013", 15 pgs.
"U.S. Appl. No. 13/553,596, Advisory Action dated Apr. 29, 2015", 3 pgs.
"U.S. Appl. No. 13/553,596, Final Office Action dated Feb. 4, 2015", 16 pgs.
"U.S. Appl. No. 13/553,596, Non Final Office Action dated Jul. 28, 2014", 14 pgs.
"U.S. Appl. No. 13/553,596, Non Final Office Action dated Aug. 31, 2015", 17 pgs.
"U.S. Appl. No. 13/553,596, Response filed Apr. 6, 2015 to Final Office Action dated Feb. 4, 2015", 10 pgs.
"U.S. Appl. No. 13/553,596, Response filed Nov. 26, 2014 to Non Final Office Action dated Jul. 28, 2014", 8 pgs.
"U.S. Appl. No. 13/573,803, Appeal Brief filed Dec. 29, 2015", 20 pgs.
"U.S. Appl. No. 13/573,803, Appeal Decision dated Jul. 28, 2017", 24 pgs.
"U.S. Appl. No. 13/573,803, Final Office Action dated Apr. 7, 2015", 16 pgs.
"U.S. Appl. No. 13/573,803, Non Final Office Action dated Sep. 15, 2014", 15 pgs.
"U.S. Appl. No. 13/573,803, Non Final Office Action dated Dec. 5, 2013", 16 pgs.
"U.S. Appl. No. 13/573,803, Reply Brief filed Jul. 13, 2016", 6 pgs.
"U.S. Appl. No. 13/573,803, Response filed Jun. 5, 2014 to Non Final Office Action dated Dec. 5, 2013", 12 pgs.
"U.S. Appl. No. 13/573,803, Response filed Dec. 15, 2014 to Non Final Office Action dated Sep. 15, 2014", 12 pgs.
"U.S. Appl. No. 13/573,804, Final Office Action dated Mar. 23, 2015", 16 pgs.
"U.S. Appl. No. 13/573,804, Non Final Office Action dated Oct. 20, 2014", 15 pgs.
"U.S. Appl. No. 13/573,804, Response filed Jan. 20, 2015 to Non Final Office Action dated Oct. 20, 2014", 15 pgs.
"U.S. Appl. No. 13/573,804, Response filed Aug. 29, 2014 to Restriction Requirement dated Jun. 30, 2014", 8 pgs.
"U.S. Appl. No. 13/573,804, Restriction Requirement dated Jun. 30, 2014", 5 pgs.
"U.S. Appl. No. 13/594,002, Final Office Action dated Mar. 19, 2015", 36 pgs.
"U.S. Appl. No. 13/594,002, Final Office Action dated Jul. 31, 2013", 24 pgs.
"U.S. Appl. No. 13/594,002, Final Office Action dated Sep. 6, 2016", 55 pgs.
"U.S. Appl. No. 13/594,002, Non Final Office Action dated Feb. 27, 2013", 21 pgs.
"U.S. Appl. No. 13/594,002, Non Final Office Action dated Nov. 30, 2015", 41 pgs.
"U.S. Appl. No. 13/594,002, Non Final Office Action dated Dec. 4, 2014", 29 pgs.

"U.S. Appl. No. 13/594,002, Response filed Mar. 3, 2015 to Non Final Office Action dated Dec. 4, 2014", 23 pgs.
"U.S. Appl. No. 13/594,002, Response filed May 14, 2013 to Non Final Office Action dated Feb. 27, 2013", 11 pgs.
"U.S. Appl. No. 13/594,002, Response filed May 31, 2016 to Non Final Office Action dated Nov. 30, 2015", 12 pgs.
"U.S. Appl. No. 13/594,002, Response filed Aug. 19, 2015 to Final Office Action dated Mar. 19, 2015", 14 pgs.
"U.S. Appl. No. 13/594,002, Response filed Oct. 28, 2013 to Final Office Action dated Jul. 31, 2013", 11 pgs.
"U.S. Appl. No. 13/679,830, Examiner Interview Summary dated Sep. 28, 2017", 3 pgs.
"U.S. Appl. No. 13/679,830, Final Office Action dated Jan. 31, 2014", 27 pgs.
"U.S. Appl. No. 13/679,830, Final Office Action dated Apr. 23, 2015", 36 pgs.
"U.S. Appl. No. 13/679,830, Final Office Action dated Sep. 9, 2016", 59 pgs.
"U.S. Appl. No. 13/679,830, Final Office Action dated Nov. 15, 2017", 98 pgs.
"U.S. Appl. No. 13/679,830, Non Final Office Action dated Jan. 4, 2016", 61 pgs.
"U.S. Appl. No. 13/679,830, Non Final Office Action dated Jun. 14, 2013", 21 pgs.
"U.S. Appl. No. 13/679,830, Non Final Office Action dated Jun. 15, 2017", 82 pgs.
"U.S. Appl. No. 13/679,830, Non Final Office Action dated Nov. 6, 2014", 36 pgs.
"U.S. Appl. No. 13/679,830, Response filed Feb. 6, 2015 to Non Final Office Action dated Nov. 6, 2014", 12 pgs.
"U.S. Appl. No. 13/679,830, Response filed Feb. 9, 2017 to Final Office Action dated Sep. 9, 2016", 19 pgs.
"U.S. Appl. No. 13/679,830, Response filed Jun. 12, 2014 to Final Office Action dated Jan. 31, 2014", 16 pgs.
"U.S. Appl. No. 13/679,830, Response filed Jul. 5, 2016 to Non Final Office Action dated Jan. 4, 2016", 11 pgs.
"U.S. Appl. No. 13/679,830, Response filed Sep. 23, 2015 to Final Office Action dated Apr. 23, 2015", 14 pgs.
"U.S. Appl. No. 13/679,830, Response Filed Oct. 16, 2017 to Non Final Office Action dated Jun. 15, 2017", 13 pgs.
"U.S. Appl. No. 13/679,830, Response filed Nov. 14, 2013 to Non Final Office Action dated Jun. 14, 2013", 14 pgs.
"U.S. Appl. No. 14/010,376, Appeal Brief filed Apr. 19, 2016", 19 pgs.
"U.S. Appl. No. 14/010,376, Appeal Decision dated Sep. 8, 2017", 17 pgs.
"U.S. Appl. No. 14/010,376, Final Office Action dated Aug. 19, 2015", 13 pgs.
"U.S. Appl. No. 14/010,376, Non Final Office Action dated Mar. 24, 2015", 10 pgs.
"U.S. Appl. No. 14/010,376, Reply Brief filed Nov. 22, 2016", 5 pgs.
"U.S. Appl. No. 14/010,376, Response filed Jun. 24, 2015 to Non Final Office Action dated Mar. 24, 2015", 10 pgs.
"U.S. Appl. No. 14/010,380, Appeal Decision dated Sep. 27, 2017", 18 pgs.
"U.S. Appl. No. 14/010,380, Examiners Answer dated Nov. 9, 2016", 8 pgs.
"U.S. Appl. No. 14/010,380, Final Office Action dated Oct. 6, 2015", 11 pgs.
"U.S. Appl. No. 14/010,380, Non Final Office Action dated Apr. 15, 2015", 11 pgs.
"U.S. Appl. No. 14/010,380, Reply Brief filed Jan. 9, 2017", 6 pgs.
"U.S. Appl. No. 14/010,380, Response filed Aug. 17, 2015 to Non Final Office Action dated Apr. 15, 2015", 11 pgs.
"U.S. Appl. No. 14/010,391, Appeal Brief filed Aug. 15, 2016", 23 pgs.
"U.S. Appl. No. 14/010,391, Appeal Decision dated Oct. 25, 2017", 19 pgs.
"U.S. Appl. No. 14/010,391, Examiners Answer dated Nov. 9, 2016", 10 pgs.
"U.S. Appl. No. 14/010,391, Final Office Action dated Sep. 15, 2015", 11 pgs.

(56) References Cited

OTHER PUBLICATIONS

"U.S. Appl. No. 14/010,391, Non Final Office Action dated Mar. 23, 2015", 11 pgs.
"U.S. Appl. No. 14/010,391, Reply Brief filed Jan. 9, 2017", 6 pgs.
"U.S. Appl. No. 14/010,391, Response filed Jul. 22, 2015 to Non Final Office Action dated Mar. 23, 2015", 10 pgs.
"U.S. Appl. No. 14/010,400, Appeal Brief filed Aug. 8, 2016", 17 pgs.
"U.S. Appl. No. 14/010,400, Appeal Decision dated Nov. 3, 2017", 16 pgs.
"U.S. Appl. No. 14/010,400, Examiners Answer dated Nov. 9, 2016", 9 pgs.
"U.S. Appl. No. 14/010,400, Final Office Action dated Sep. 10, 2015", 9 pgs.
"U.S. Appl. No. 14/010,400, Non Final Office Action dated Apr. 22, 2015", 11 pgs.
"U.S. Appl. No. 14/010,400, Response filed Jul. 22, 2015 to Non Final Office Action dated Apr. 22, 2015", 10 pgs.
"U.S. Appl. No. 14/010,903, Examiners Answer dated Nov. 9, 2016", 9 pgs.
"U.S. Appl. No. 14/094,542, Final Office Action dated Feb. 9, 2015", 6 pgs.
"U.S. Appl. No. 14/094,542, Final Office Action dated Sep. 2, 2015", 6 pgs.
"U.S. Appl. No. 14/094,542, Non Final Office Action dated Feb. 12, 2014", 7 pgs.
"U.S. Appl. No. 14/094,542, Non Final Office Action dated May 19, 2015", 5 pgs.
"U.S. Appl. No. 14/094,542, Non Final Office Action dated Aug. 15, 2014", 7 pgs.
"U.S. Appl. No. 14/094,542, Response filed Jan. 15, 2015 to Non Final Office Action dated Aug. 15, 2014", 10 pgs.
"U.S. Appl. No. 14/094,542, Response filed May 11, 2015 to Final Office Action dated Feb. 9, 2015", 12 pgs.
"U.S. Appl. No. 14/094,542, Response filed Jul. 14, 2014 to Non Final Office Action dated Feb. 12, 2014", 12 pgs.
"U.S. Appl. No. 14/094,542, Response filed Aug. 19, 2015 to Non Final Office Action dated May 19, 2015", 12 pgs.
"U.S. Appl. No. 14/483,903, Appeal Brief filed Oct. 11, 2016", 21 pgs.
"U.S. Appl. No. 14/483,903, Appeal Decision dated Sep. 25, 2017", 18 pgs.
"U.S. Appl. No. 14/483,903, Final Office Action dated Feb. 10, 2016", 11 pgs.
"U.S. Appl. No. 14/483,903, Non Final Office Action dated Sep. 1, 2015", 10 pgs.
"U.S. Appl. No. 14/483,903, Reply Brief filed Jan. 9, 2017", 6 pgs.
"U.S. Appl. No. 14/483,903, Response filed Jan. 4, 2016 to Non Final Office Action dated Sep. 1, 2015", 11 pgs.
"U.S. Appl. No. 14/536,320, Non Final Office Action dated Mar. 25, 2015", 9 pgs.
"U.S. Appl. No. 14/540,346, Non Final Office Action dated Aug. 24, 2015", 16 pgs.
"U.S. Appl. No. 14/540,346, Notice of Allowance dated Mar. 18, 2016", 7 pgs.
"U.S. Appl. No. 14/540,346, Preliminary Amendment filed Dec. 11, 2014", 8 pgs.
"U.S. Appl. No. 14/540,346, Response filed Dec. 23, 2015 to Non Final Office Action dated Aug. 24, 2015", 7 pgs.
"U.S. Appl. No. 14/608,520, Appeal Brief filed May 12, 2017", 25 pgs.
"U.S. Appl. No. 14/608,520, Appeal Decision dated Nov. 27, 2017", 14 pgs.
"U.S. Appl. No. 14/608,520, Final Office Action dated Oct. 12, 2016", 44 pgs.
"U.S. Appl. No. 14/608,520, Non Final Office Action dated Mar. 18, 2016", 39 pgs.
"U.S. Appl. No. 14/608,520, Non Final Office Action dated Oct. 15, 2015", 19 pgs.
"U.S. Appl. No. 14/608,520, Preliminary Amendment filed Feb. 26, 2015", 10 pgs.
"U.S. Appl. No. 14/608,520, Response filed Jan. 15, 2016 to Non Final Office Action dated Oct. 15, 2015", 9 pgs.
"U.S. Appl. No. 14/608,520, Response filed Sep. 19, 2016 to Non Final Office Action dated Mar. 18, 2016", 12 pgs.
"U.S. Appl. No. 14/628,941, Appeal Brief filed May 12, 2017".
"U.S. Appl. No. 14/628,941, Appeal Decision dated Dec. 6, 2017", 14 pgs.
"U.S. Appl. No. 14/628,941, Final Office Action dated Oct. 13, 2016", 43 pgs.
"U.S. Appl. No. 14/628,941, Non Final Office Action dated Mar. 18, 2016", 38 pgs.
"U.S. Appl. No. 14/628,941, Non Final Office Action dated Sep. 24, 2015", 21 pgs.
"U.S. Appl. No. 14/628,941, Preliminary Amendment filed Feb. 26, 2015", 9 pgs.
"U.S. Appl. No. 14/628,941, Response filed Sep. 19, 2016 to Non Final Office Action dated Mar. 18, 2016", 12 pgs.
"U.S. Appl. No. 14/628,941, Response filed Dec. 23, 2015 to Non Final Office Action dated Sep. 24, 2015", 9 pgs.
"U.S. Appl. No. 14/750,559, Final Office Action dated Nov. 29, 2018", 22 pgs.
"U.S. Appl. No. 14/750,559, Non Final Office Action dated Feb. 27, 2018", 15 pgs.
"U.S. Appl. No. 14/750,559, Non Final Office Action dated Jun. 13, 2019", 11 pgs.
"U.S. Appl. No. 14/750,559, Preliminary Amendment filed Jun. 26, 2015 t", 9 pgs.
"U.S. Appl. No. 14/750,559, Response filed Jul. 27, 2018 to Non Final Office Action dated Feb. 27, 2018", 12 pgs.
"U.S. Appl. No. 14/750,559, Response filed Mar. 29, 2019 to Final Office Action dated Nov. 29, 2018", 13 pgs.
"U.S. Appl. No. 14/750,559, Response filed Sep. 13, 2019 to Non-Final Office Action dated Jun. 13, 2019", 12 pgs.
"U.S. Appl. No. 14/826,006, Advisory Action dated May 10, 2017", 3 pgs.
"U.S. Appl. No. 14/826,006, Final Office Action dated Jan. 17, 2017", 13 pgs.
"U.S. Appl. No. 14/826,006, Final Office Action dated Jan. 19, 2018", 17 pgs.
"U.S. Appl. No. 14/826,006, Non Final Office Action dated Jun. 2, 2016", 11 pgs.
"U.S. Appl. No. 14/826,006, Non Final Office Action dated Aug. 18, 2017", 16 pgs.
"U.S. Appl. No. 14/826,006, Preliminary Amendment filed Aug. 28, 2015", 6 pgs.
"U.S. Appl. No. 14/826,006, Response filed Apr. 18, 2017 to Final Office Action dated Jan. 17, 2017", 13 pgs.
"U.S. Appl. No. 14/826,006, Response filed Nov. 1, 2016 to Non Final Office Action dated Jun. 2, 2016", 7 pgs.
"U.S. Appl. No. 14/826,006, Response filed Nov. 17, 2017 to Non Final Office Action dated Aug. 18, 2017", 11 pgs.
"U.S. Appl. No. 14/826,018, Non Final Office Action dated Jan. 11, 2017", 19 pgs.
"U.S. Appl. No. 14/826,018, Notice of Allowance dated Aug. 28, 2017", 13 pgs.
"U.S. Appl. No. 14/826,018, Preliminary Amendment filed Aug. 28, 2015", 8 pgs.
"U.S. Appl. No. 14/826,018, Response Filed May 11, 2017 to Non Final Office Action dated Jan. 11, 2017", 14 pgs.
"U.S. Appl. No. 14/826,025, Final Office Action dated May 15, 2017", 13 pgs.
"U.S. Appl. No. 14/826,025, Non Final Office Action dated Aug. 25, 2016", 14 pgs.
"U.S. Appl. No. 14/826,025, Preliminary Amendment filed Aug. 28, 2015", 6 pgs.
"U.S. Appl. No. 14/826,025, Response filed Jan. 25, 2017 to Non Final Office Action dated Aug. 25, 2016", 13 pgs.
"U.S. Appl. No. 14/949,549, Notice of Allowance dated Jan. 18, 2017", 11 pgs.
"U.S. Appl. No. 14/949,549, Response filed Jul. 20, 2016 to Non Final Office Action dated Apr. 20, 2016", 8 pgs.

(56) References Cited

OTHER PUBLICATIONS

"U.S. Appl. No. 14/949,549, Response filed Aug. 26, 2016 to Non Final Office Action dated Apr. 20, 2016", 8 pgs.
"U.S. Appl. No. 14/949,549, Response filed Dec. 27, 2016 to Final Office Action dated Oct. 27, 2016", 7 pgs.
"U.S. Appl. No. 14/952,699, Non Final Office Action dated Jun. 8, 2016", 9 pgs.
"U.S. Appl. No. 14/952,699, Notice of Allowability dated Oct. 7, 2016", 5 pgs.
"U.S. Appl. No. 14/952,699, Notice of Allowance dated Jan. 9, 2017", 9 pgs.
"U.S. Appl. No. 14/952,699, Notice of Allowance dated Sep. 19, 2016", 8 pgs.
"U.S. Appl. No. 14/952,699, Preliminary Amendment filed May 27, 2016", 8 pgs.
"U.S. Appl. No. 14/952,699, Response filed Sep. 8, 2016 to Non Final Office Action dated Jun. 8, 2016", 8 pgs.
"U.S. Appl. No. 15/057,047, Non Final Office Action dated Sep. 29, 2016", 19 pgs.
"U.S. Appl. No. 15/057,047, Notice of Allowance dated Feb. 10, 2017", 11 pgs.
"U.S. Appl. No. 15/057,047, Preliminary Amendment filed Sep. 15, 2016", 5 pgs.
"U.S. Appl. No. 15/057,047, Response Filed Dec. 29, 2016 to Non Final Office Action dated Sep. 29, 2016", 11 pgs.
"U.S. Appl. No. 15/211,917, Non Final Office Action dated Nov. 15, 2017", 13 pgs.
"U.S. Appl. No. 15/211,917, Preliminary Amendment filed Dec. 2, 2016", 8 pgs.
"U.S. Appl. No. 15/595,629, Preliminary Amendment filed Jul. 24, 2017", 8 pgs.
"U.S. Appl. No. 15/619,150, Preliminary Amendment filed Aug. 28, 2017", 8 pgs.
"U.S. Appl. No. 15/722,868, Advisory Action dated Apr. 8, 2020", 3 pgs.
"U.S. Appl. No. 15/722,868, Examiner Interview Summary dated Aug. 27, 2020", 3 pgs.
"U.S. Appl. No. 15/722,868, Final Office Action dated Jan. 28, 2020", 23 pgs.
"U.S. Appl. No. 15/722,868, Non Final Office Action dated May 18, 2020", 26 pgs.
"U.S. Appl. No. 15/722,868, Non Final Office Action dated Oct. 4, 2019", 19 pgs.
"U.S. Appl. No. 15/722,868, Notice of Allowance dated Sep. 3, 2020", 22 pgs.
"U.S. Appl. No. 15/722,868, Preliminary Amendment filed Jan. 19, 2018", 8 pgs.
"U.S. Appl. No. 15/722,868, Response filed Jan. 6, 2020 to Non Final Office Action dated Oct. 4, 2019", 12 pgs.
"U.S. Appl. No. 15/722,868, Response filed Mar. 30, 2020 to Final Office Action dated Jan. 28, 2020", 11 pgs.
"U.S. Appl. No. 15/722,868, Response filed Aug. 18, 2020 to Non Final Office Action dated May 18, 2020", 12 pgs.
"U.S. Appl. No. 15/801,056, Corrected Notice of Allowability dated Nov. 7, 2019", 2 pgs.
"U.S. Appl. No. 15/801,056, Corrected Notice of Allowability dated Dec. 17, 2019", 2 pgs.
"U.S. Appl. No. 15/801,056, Final Office Action dated Jan. 25, 2019", 12 pgs.
"U.S. Appl. No. 15/801,056, Non Final Office Action dated Jul. 11, 2018", 13 pgs.
"U.S. Appl. No. 15/801,056, Notice of Allowance dated Sep. 13, 2019", 11 pgs.
"U.S. Appl. No. 15/801,056, Preliminary Amendment filed Apr. 30, 2018", 9 pgs.
"U.S. Appl. No. 15/801,056, Response filed Jul. 25, 2019 to Final Office Action dated Jan. 25, 2019", 10 pgs.
"U.S. Appl. No. 15/849,362, Final Office Action dated May 2, 2019", 8 pgs.

"U.S. Appl. No. 15/849,362, Non Final Office Action dated Oct. 5, 2018", 9 pgs.
"U.S. Appl. No. 15/849,362, Notice of Allowance dated Jul. 18, 2019", 10 pgs.
"U.S. Appl. No. 15/849,362, Notice of Allowance dated Nov. 20, 2019", 11 pgs.
"U.S. Appl. No. 15/849,362, Preliminary Amendment filed Feb. 22, 2018", 7 pgs.
"U.S. Appl. No. 15/849,362, Response filed Jan. 7, 2019 to Non Final Office Action dated Oct. 5, 2018", 14 pgs.
"U.S. Appl. No. 15/849,362, Response filed Jul. 2, 2019 to Final Office Action dated May 2, 2019", 10 pgs.
"U.S. Appl. No. 16/352,364, Corrected Notice of Allowability dated Feb. 26, 2021", 7 pgs.
"U.S. Appl. No. 16/352,364, Non Final Office Action dated Aug. 27, 2020", 10 pgs.
"U.S. Appl. No. 16/352,364, Notice of Allowance dated Feb. 8, 2021", 10 pgs.
"U.S. Appl. No. 16/352,364, Preliminary Amendment filed Dec. 27, 2019", 8 pgs.
"U.S. Appl. No. 16/352,364, Response filed Jan. 27, 2021 to Non Final Office Action dated Aug. 27, 2020", 9 pgs.
"U.S. Appl. No. 16/730,678, Corrected Notice of Allowability dated Nov. 8, 2021", 2 pgs.
"U.S. Appl. No. 16/730,678, Non Final Office Action dated May 7, 2021", 10 pgs.
"U.S. Appl. No. 16/730,678, Notice of Allowability dated Mar. 16, 2022", 2 pgs.
"U.S. Appl. No. 16/730,678, Notice of Allowance dated Oct. 29, 2021", 9 pgs.
"U.S. Appl. No. 16/730,678, Preliminary Amendment filed May 26, 2020", 8 pgs.
"U.S. Appl. No. 16/730,678, Response filed Oct. 7, 2021 to Non Final Office Action dated May 7, 2021", 8 pgs.
"U.S. Appl. No. 16/814,911, Non Final Office Action dated Oct. 15, 2021", 14 pgs.
"U.S. Appl. No. 16/814,911, Notice of Allowance dated Feb. 11, 2022", 10 pgs.
"U.S. Appl. No. 17/103,870, Non Final Office Action dated Nov. 9, 2021", 16 pgs.
"U.S. Appl. No. 17/103,870, Preliminary Amendment filed Feb. 9, 2021", 8 pgs.
"U.S. Appl. No. 17/125,979, Preliminary Amendment filed Apr. 7, 2021", 9 pgs.
"U.S. Appl. No. 17/320,202, Preliminary Amendment filed Nov. 24, 2021", 7 pgs.
"U.S. Appl. No. 13/310,417, Response filed Dec. 8, 2014 to Non Final Office Action dated Sep. 8, 2014", 11 pgs.
"U.S. Appl. No. 13/408,877, Reply Brief dated Aug. 8, 2016", 5 pgs.
"U.S. Appl. No. 14/949,549, Final Office Action dated Oct. 27, 2016", 14 pgs.
"U.S. Appl. No. 14/949,549, Non Final Office Action dated Apr. 20, 2016", 14 pgs.
"Australian Application Serial No. 2006272510, Office Action dated Oct. 22, 2010", 3 pgs.
"Australian Application Serial No. 2006272510, Response filed Oct. 6, 2011 to Office Action dated Oct. 22, 2011", 15 pgs.
"Australian Application Serial No. 2012200701, Office Action dated Aug. 21, 2013", 2 pgs.
"Australian Application Serial No. 2012200701, Response filed Dec. 12, 2013 to Office Action dated Aug. 21, 2013", 33 pgs.
"Australian Application Serial No. 2013270518, Response filed May 25, 2016 to Subsequent Examiners Report dated Feb. 1, 2016", 13 pgs.
"Australian Application Serial No. 2013270518, Subsequent Examiners Report dated Feb. 1, 2016", 2 pgs.
"Australian Application Serial No. 2013270518, Subsequent Examiners Report dated Jun. 7, 2016", 2 pgs.
"Casefinder Manual, Ch. 1: Overview; Ch. 8: Hyperlinking", [Online]. Retrieved from the Internet: <URL: http://web.archive.org/web/20040419155315/http://www.casefinder.com/downloads/manual-5.00.pdf>, (Archived Apr. 19, 2004), 13 pgs.

(56) References Cited

OTHER PUBLICATIONS

"ClaimMaster Software User Guide", ClaimMaster Software LLP, (2009), 36 pgs.

"Definition of Timeline", [Online] Retrieved from the Internet: <URL: https://www.yourdictionary.com/>, (Mar. 17, 2015), 1 pg.

"East Text Search Training", (Jan. 2000), 155 pgs.

"European Application Serial No. 05775617.3, Extended European Search Report dated Mar. 24, 2009", 8 pgs.

"European Application Serial No. 06800464.7, Amendment filed Mar. 21, 2011", 7 pgs.

"European Application Serial No. 06800464.7, Examination Notification Art. 94(3) dated May 2, 2014", 8 pgs.

"European Application Serial No. 06800464.7, Extended European Search Report dated Aug. 24, 2010", 8 pgs.

"European Application Serial No. 06800464.7, Response filed Sep. 11, 2014 to Office Action dated May 2, 2014", 16 pgs.

"European Application Serial No. 06800464.7, Summons to Attend Oral Proceedings dated Oct. 10, 2017", 10 pgs.

"Google Definition: System", [Online] Retrieved from the Internet: <URL: http://www.google.com>, (Retrieved Aug. 13, 2012), 3 pgs.

"International Application Serial No. PCT/US2005/026768, Demand mailed Mar. 7, 2007", 9 pgs.

"International Application Serial No. PCT/US2005/026768, International Preliminary Report on Patentability dated Mar. 29, 2007", 8 pgs.

"International Application Serial No. PCT/US2005/026768, International Search Report dated Mar. 7, 2007", 5 pgs.

"International Application Serial No. PCT/US2005/026768, Written Opinion dated Mar. 7, 2007", 5 pgs.

"International Application Serial No. PCT/US2006/020950, International Preliminary Report on Patentability dated Dec. 13, 2007", 6 pgs.

"International Application Serial No. PCT/US2006/020950, International Search Report dated Feb. 5, 2007", 2 pgs.

"International Application Serial No. PCT/US2006/020950, Written Opinion dated Feb. 5, 2007", 4 pgs.

"International Application Serial No. PCT/US2006/029456, International Preliminary Report on Patentability dated Feb. 7, 2008", 9 pgs.

"International Application Serial No. PCT/US2006/029456, International Search Report dated Oct. 1, 2007", 5 pgs.

"International Application Serial No. PCT/US2006/029456, Written Opinion dated Oct. 1, 2007", 7 pgs.

"International Search Report and Written Opinion in PCT/US05/26768, dated Mar. 7, 2007", 15 pgs.

"Module", Dictionary.com, [Online] Retrieved from Internet: <URL: http://dictionary.reference.com/browse/module>, (Retrieved Aug. 13, 2012), 5 pgs.

"Notice from the European Patent Office dated Oct. 1, 2007 concerning business methods", Official Journal of the European Patent Office, 30(11), (dated Nov. 1, 2007), 592-593.

"Patent Rank: A Network-Dominant Logic for Innovation", Submitted to Marketing Science, manuscript MKSC-Oct 10-0356, (Oct. 2010), 36 pgs.

"PatentOptimizer", LexisNexis, (2009), 2 pgs.

"PatentPleeze Overview", [Online]. Retrieved from the Internet: <URL: http://web.archive.org/web/20060824063540/web.ncf.ca/ex133/patnow.pdf>, (Archived Aug. 24, 2006), 33 pgs.

"Using Citation Link", Delphion, [Online]. Retrieved from the Internet: <URL: http://web.archive.org/web/20041204224023/www.delphion.com/help/citelink_help>, (Archived Dec. 4, 2004), 10 pgs.

"What is PAIR?", USPTO, [Online]. Retrieved from the Internet: <URL: http://web.archive.org/web/20040606224528/pair.uspto.gov/cgi-bin/final/help.pl>, (Archived Jun. 6, 2004), 9 pgs.

Brinn, Michael W, et al., "Investigation of forward citation count as a patent analysis method", Proceedings of the 2003 Systems and Information Engineering Design Symposium, (2003), 6 pgs.

Broekstra, Joen, et al., "Sesame: A Generic Architecture for Storing and Querying RDF and RDF Schema", Int'l Semantic Web Conference (ISWC). Lecture Notes in Computer Science, vol. 2342. Springer, Berlin, Heidelberg, (2002), 16 pgs.

Chang, Muchiu, "Sun Tzu and sustainable competitive advantage", IEEE Int'l Engineering Management Conference, vol. 1, (Oct. 18-21, 2004), 153-157.

Davis, Lee, "The Strategic Use of Patents in International Business", The 28th Annual EIBA Conference, Athens, Greece, (Dec. 2002), 27 pgs.

East, T. W, "Patent Claims—How to Keep Track of Them", IEEE Aerospace and Electronic Systems Magazine, 10(8), (Aug. 1995), 32-33.

Fall, C.J., et al., "Literature Survey: Issue to be considered in the automatic classifications of patents", World Intellectual Property Organization, (Oct. 2002), 64 pgs.

Fenton, Gillian M., et al., "Freedom to Operate: The Law Firms Approach and Role", In: Intellectual Property Management in Health and Agricultural Innovation: A Handbook of Best Practices, [online]. [retrieved on Mar. 17, 2015]. Retrieved from the Internet: <URL: www.iphandbook.org/handbook/ch14/p04/index_print.html>, (2007), 11 pgs.

Gipp, Bela, et al., "Comparative Evaluation of Text- and Citation based Plagiarism Detection Approaches using GuttenPlag", [Online] Retrieved from the Internet: <URL: http://gipp.com/wp-content/papercite-data/pdf/gipp11b.pdf>, (2011), 4 pgs.

Gruber, T R, et al., "A Translation Approach to Portable Ontology Specifications", KSL Report KSL-92-71, Knowledge Systems Laboratory, Stanford University, (1993), 24 pgs.

Hall, et al., "Market Value and Patent Citations", The RAND Journal of Economics, vol. 36, No. 1, (2005), 16-38.

Hoover, A. E, "Electronic Filing Top 10 Wish List", IP Today, (Jul. 2006), 2 pgs.

Hutzell, Paula, "Processing", USPTO PPT Presentation, (May 8, 2003), 25 pgs.

Indukuri, Kishore Varma, et al., "Similarity Analysis of Patent Claims Using Natural Language Processing Techniques", International Conference on Computational Intelligence and Multimedia Applications, (2007), 169-175.

Jagalla, Christopher, "Searching USPTO Assignments on the Web", (Nov. 20, 2010), 4 pgs.

Langan-Fox, Janice, "Team Mental Models: Techniques, Methods, and Analytic Approaches", The Journal of the Human Factors and Ergonomics Society, vol. 42, No. 2, (2000), 30 pgs.

Larkey, L. S, "A Patent Search and Classification System", Proc. of the 4th ACM Conference of Digital Libraries, (1999), 179-187.

Larkey, Leah S, et al., "Collection Selection and Results Merging with Topically Organized U.S. Patents and TREC Data", Proc. of the 9th Int'l Conference on Information and Knowledge Management, (2000), 8 pgs.

Luo, SI, et al., "A Semisupervised Learning Method to Merge Search Engine results", ACM Transactions on Information Systems, vol. 21, No. 4, (Oct. 2002), 35 pgs.

Madrid, Juan M, et al., "Incorporating Conceptual Matching in Search", Proc. of the 11th Conference on Information and Knowledge Management, (2002), 17 pgs.

Mahesh, K., "Ontology Development for Machine Translation: Ideology and Methodology", Technical Report MCCS-96-292, Computing Research Laboratory, New Mexico State University, (1996), 87 pgs.

Mary, Ellen Mogee, et al., "Patent co-citation analysis of Eli Lilly & Co. patents", Expert Opinion on Therapeutic Patents, (Feb. 25, 2005).

Mase, H., et al., "Proposal of Two-Stage Patent Retrieval Method Considering the Claim Structure", ACM Transactions on Asian Language Information Processing (TALIP), 4(2), (Jun. 2005), 190-206.

Paul, Stockwell, et al., "Use of an automatic content analysis tool: A technique for seeing both local and global scope", Int. J. Human-Computer Studies 67, (2009), 424-436.

Quinn, B., "Internet Access to Patent Application Files Now Available", Press Release, [Online]. Retrieved from the Internet: <URL: http://web.archive.org/web/20040813210925/http://www.uspto.gov/web/offices/com/speeches/04-13.htm>, (Aug. 2, 2004), 1 pg.

(56) References Cited

OTHER PUBLICATIONS

Sheremetyeva, S., et al., "Generating Patent Claims from Interactive Input", Proc. of the 8th International Workshop on Natural Language Generation (INLG), (Jun. 1996), 61-70.

Sheremetyeva, S., et al., "Knowledge Elicitation for Authoring Patent Claims", IEEE Computer, 29(7), (Jul. 1996), 57-63.

Sheremetyeva, S., "Natural Language Analysis of Patent Claims", Proc. of the ACL-2003 Workshop on Patent Corpus Processing, (2003), 66-73.

Sheremetyeva, S., et al., "On Creating Metadata with Authoring Tools", Proc. of the ECAI Workshop on Semantic Authoring, Annotation and Knowledge Markup (SAAKM), (Jul. 2002), 22-26.

Sheremetyeva, Svetlana, "Natural Language Analysis of Patent Claims", Department of Computational Linguistics Copenhagen Business School, Bernhard Bangs Alle 17 B, DK-year 2000, Denmark, (2000), 66-73.

Von-Wun, Soo, et al., "A Cooperative Multi-Agent Platform for Invention based on Ontology and Patent Document Analysis", The 9th International Conference on Computer Supported Cooperative Work in Design Proceedings, (2005), 411-416.

Woods, W. A, "Conceptual Indexing: A Better Way to Organize Knowledge", Sun Microsystems, Inc., (1997), 99 pgs.

U.S. Appl. No. 17/103,870, Non Final Office Action dated Oct. 26, 2022, 14 pgs.

U.S. Appl. No. 17/103,870, Response filed Sep. 6, 2022 to Final Office Action dated May 6, 2022, 10 pgs.

U.S. Appl. No. 17/125,979, Non Final Office Action dated Sep. 30, 2022, 21 pgs.

U.S. Appl. No. 17/320,202, Non Final Office Action dated Dec. 29, 2022, 24 pgs.

U.S. Appl. No. 17/683,044, Non Final Office Action dated Feb. 13, 2023, 7 pgs.

U.S. Appl. No. 17/683,044, Preliminary Amendment filed Aug. 18, 2022, 7 pgs.

U.S. Appl. No. 17/745,863, Non Final Office Action dated Nov. 25, 2022, 14 pgs.

U.S. Appl. No. 17/745,863, Preliminary Amendment filed Aug. 29, 2022, 8 pgs.

Schonhofen, Peter, "Annotating Documents by Wikipedia Concepts", 2008 IEEE/WIC/ACM International Conference on Web Intelligence and Intelligent Agent Technology,, (Dec. 2008), 461-467.

Wu, Jia-Long, et al., "Automating keyphrase extraction with multi-objective genetic algorithms", Proceedings of the 37th Annual Hawaii International Conference on System Sciences, (Jan. 2004), 8 pgs.

U.S. Appl. No. 17/320,202, Corrected Notice of Allowability mailed Jul. 12, 2023, 14 pgs.

U.S. Appl. No. 17/320,202, Notice of Allowance mailed Jun. 22, 2023, 21 pgs.

U.S. Appl. No. 17/683,044, Notice of Allowance mailed Jul. 3, 2023, 9 pgs.

U.S. Appl. No. 17/683,044, Response filed Jun. 13, 23 to Non Final Office Action mailed Feb. 13, 2023, 8 pgs.

U.S. Appl. No. 18/208,228, filed Jun. 9, 2023.

U.S. Appl. No. 18/215,042, filed Jun. 27, 2023.

"U.S. Appl. No. 17/103,870, Response filed Feb. 27, 2023 to Non Final Office Action mailed Oct. 26, 2022", 11 pgs.

"U.S. Appl. No. 17/745,863, Response filed Feb. 27, 2023 to Non Final Office Action mailed Nov. 25, 2022", 8 pgs.

"U.S. Appl. No. 17/125,979, Response filed Feb. 28, 2023 to Non Final Office Action mailed Sep. 30, 2022", 9 pgs.

"U.S. Appl. No. 17/125,979, Notice of Allowance mailed Mar. 10, 2023", 6 pgs.

"U.S. Appl. No. 17/745,863, Notice of Allowance mailed Mar. 15, 2023", 12 pgs.

"U.S. Appl. No. 17/125,979, Corrected Notice of Allowability mailed Mar. 20, 2023", 2 pgs.

"U.S. Appl. No. 17/320,202, Response filed Mar. 29, 2023 to Non Final Office Action mailed Dec. 29, 2022", 9 pgs.

"U.S. Appl. No. 17/103,870, Response filed Sep. 1, 2023 to Final Action mailed May 1, 2023", 10 pgs.

"U.S. Appl. No. 18/215,042, Preliminary Amendment Filed Jun. 27, 2023", 8 pgs.

"U.S. Appl. No. 17/103,870, Non Final Office Action mailed Nov. 21, 2023", 12 pgs.

"U.S. Appl. No. 18/372,031, Preliminary Amendment filed Jan. 8, 2024", 10 pgs.

"U.S. Appl. No. 18/372,030, Preliminary Amendment filed Jan. 22, 2024", 7 pgs.

"U.S. Appl. No. 18/208,228, Non Final Office Action mailed Feb. 14, 2024", 34 pgs.

"U.S. Appl. No. 18/215,042, Non Final Office Action mailed Feb. 15, 2024", 23 pgs.

Ostler, T, "Information highlighting", IEEE International Conference on Information Visualization (Cat. No. PR00210), (1999), 528-534.

U.S. Appl. No. 17/103,870, Response filed Nov. 18, 2024 to Non Final Office Action mailed Aug. 16, 2024, 11 pgs.

U.S. Appl. No. 18/208,228, Response filed Nov. 20, 2024 to Final Office Action mailed Aug. 20, 2024, 15 pgs.

"U.S. Appl. No. 17/103,870, Response filed Mar. 21, 2024 to Non Final Office Action mailed Nov. 21, 2023", 11 pgs.

"U.S. Appl. No. 18/372,031, Non Final Office Action mailed May 6, 2024", 15 pgs.

"U.S. Appl. No. 17/103,870, Final Office Action mailed May 13, 2024", 12 pgs.

"U.S. Appl. No. 18/208,228, Response filed Jun. 14, 2024 to Non Final Office Action mailed Feb. 14, 2024", 16 pgs.

"U.S. Appl. No. 18/215,042, Response filed Jun. 17, 2024 to Non Final Office Action mailed Feb. 15, 2024", 10 pgs.

"U.S. Appl. No. 18/215,042, Notice of Allowance mailed Jul. 15, 2024", 12 pgs.

"U.S. Appl. No. 17/103,870, Response filed Jul. 15, 2024 to Final Office Action mailed May 13, 2024", 12 pgs.

"U.S. Appl. No. 18/372,031, Response filed Aug. 6, 2024 to Non Final Office Action mailed May 6, 2024", 10 pgs.

"U.S. Appl. No. 17/103,870, Non Final Office Action mailed Aug. 16, 2024", 13 pgs.

"U.S. Appl. No. 18/208,228, Final Office Action mailed Aug. 20, 2024", 35 pgs.

"U.S. Appl. No. 18/372,031, Notice of Allowance mailed Aug. 26, 2024", 8 pgs.

Anna, Stavrianou, "Overview and semantic issues of text mining", ACM SIGMOD Record, vol. 36, Issue 3, (2007), 23-34.

U.S. Appl. No. 17/103,870, Notice of Allowance mailed Mar. 26, 2025, 13 pgs.

U.S. Appl. No. 17/103,870, Response filed Feb. 20, 2025 to Final Office Action mailed Dec. 20, 2024, 14 pgs.

U.S. Appl. No. 18/208,228, Notice of Allowance mailed Feb. 13, 2025, 26 pgs.

U.S. Appl. No. 18/372,030, Non Final Office Action mailed Apr. 9, 2025, 15 pgs.

U.S. Appl. No. 18/961,420, Preliminary Amendment filed Feb. 26, 2025, 9 pgs.

Voss, A, et al., Concepts as knowledge handles in collaborative document management, Proceedings. IEEE 8th International Workshops on Enabling Technologies: Infrastructure for Collaborative Enterprises (WET ICE'99), (Jun. 1999), 245-252.

\* cited by examiner

FIG. 9

Ontology Concept(s)

Search Criteria

Where  Text  `*`  ☐ Show Inherited

New Portfolio Ontology openty responses
Perpetual Motion

[Go]  Back to Ontology Page
Clear Filters
[    ] Search

○ Technology Category  ○ Keyword  ● Scope Concept  [Go]

Show [100] root concept per page.  Go to Page [    ] [Go]

[First] [Previous] Concept 1 to 2 of 2 [Next] [Last]

ScopeConcept  Bulk Add  Add new

| Concept | Claim(s) Count | Indirect Claims Count | Hier. Claim(s) Count | Ontology | Actions |
|---|---|---|---|---|---|
| ○ fluid with randomly moving particles | 3 | 0 | 3 | Perpetual Motion | 📋 ✏️ 🗑️ |
| ○ flux modulation controller generating an electromagnetic field or a gravidomagnetic field | 3 | 0 | 3 | Perpetual Motion | 📋 ✏️ 🗑️ |

| Clipboard Concept | Claim(s) Count | Ontology |
|---|---|---|

| Scope Concept(s) | Scope Concept Name | Filter |
|---|---|---|
| | Multiple Blades | ○ Direct Mapped Claims<br>⦿ Do not include Direct Mapped and 'Does Not Map'<br>○ Direct Mapped or 'Does Not Map'<br>○ Direct Mapped or 'Unresolved' |

| Title | | | | | | | Title #1 | | | | | Title #2 |
|---|---|---|---|---|---|---|---|---|---|---|---|---|
| Patent# | | | | | | | 6,697,xxx | | | | | 7,272,xxx |
| Filing Date | | | | | | | Oct 01, 1999 | | | | | Jan 14, 20 |
| Total Claims | | | | | | | 58 | | | | | 28 |
| Claim# (Independent) | | | | | | | 1 | 11 | 30 | 44 | 52 | 1 | 14 | 22 |
| Owner | | | | | | | Acme Co. | | | | | Dynamite, |
| Scope Concept (Frequency, Desc.) | Scope Concept introduced first by: | Date SC first introduced | Total | | | | | | | | | |
| SC #1 | Acme | 1999 | 5 | 10% | 1 | 1 | 1 | 1 | 1 | | 1 | 1 |
| SC #2 | Dynamite | 2004 | 4 | 8% | | | | | | 1 | 1 | 1 |

FIG. 16

| Title | | | | | | Title 1 | | | Title 2 | | | Title 3 | | |
|---|---|---|---|---|---|---|---|---|---|---|---|---|---|---|
| Patent# | | | | | | 6,697,xxx | | | 7,272,xxx | | | 7,327,xxx | | |
| Filing Date | | | | | | Oct 01, 1999 | | | Jan 14, 2004 | | | Mar 02, 2004 | | |
| Total Claims | | | | | | 58 | | | 28 | | | 24 | | |
| Claim# (Independent) | | | | | | 1 | 11 | 30 | 44 | 52 | 1 | 14 | 22 | 27 | 1 | 11 | 18 | 24 |
| Claim Coverage | | | | | | 3 | 3 | 3 | 3 | 1 | 1 | 1 | 2 | 2 | 2 | 2 |
| Product Coverage | | | Has Feature? | | | Potentially Applies | | | Doesn't Apply | | | Not sure | | |
| Scope Concept (Frequency, Desc.) | Rating (1-3) | Total | | | | | | | | | | | | |
| SC 1 | 3 | 20 | 38% | | | 2 | 2 | 2 | 2 | 2 | 2 | 2 | 1 | 1 | 1 |
| SC 2 | 2 | 7 | 13% | | | 2 | | | | | | | | | |
| SC 3 | 3 | 7 | 13% | | | | | | | 2 | 2 | 2 | | | |
| SC 4 | 1 | 6 | 12% | | | 2 | 2 | 2 | 2 | | | | | | |
| SC 5 | 3 | 5 | 10% | | | | | | | | | | 1 | 1 | 1 |
| SC 6 | 1 | 4 | 8% | | | | | | | 2 | 2 | 2 | | | |

FIG. 17

| | | | Title 1 | | | | | Title 2 | | | | Title 3 | | | |
|---|---|---|---|---|---|---|---|---|---|---|---|---|---|---|---|---|
| Title | | | Title 1 | | | | | Title 2 | | | | Title 3 | | | |
| Patent# | | | 6,697,xxx | | | | | 7,272,xxx | | | | 7,327,xxx | | | |
| Filing Date | | | Oct 01, 1999 | | | | | Jan 14, 2004 | | | | Mar 02, 2004 | | | |
| Total Claims | | | 58 | | | | | 28 | | | | 24 | | | |
| Claim# (Independent) | | | 1 | 11 | 30 | 44 | 52 | 1 | 14 | 22 | 27 | 1 | 11 | 18 | 24 |
| Claim Status | | | 1 | 1 | 1 | 1 | 1 | 3 | 3 | 3 | 3 | 2 | 2 | 2 | 2 |
| | | | Don't Need | | | | | Possibly Need | | | | Want | | | |
| Scope Concept (Frequency, Desc.) | Need Feature? Rating (1-3) | Total | | | | | | | | | | | | | |
| SC 1 | 3 | 20 | 38% | 2 | 2 | 2 | 2 | 2 | 2 | 2 | 2 | 2 | 1 | 1 | 1 | 1 |
| SC 2 | 2 | 7 | 13% | | | | | | | | | | | | | |
| SC 3 | 3 | 7 | 13% | | | | | | 3 | 3 | 3 | 3 | | | | |
| SC 4 | 1 | 6 | 12% | | | | | | | | | | | | | |
| SC 5 | 1 | 5 | 10% | | | | | | | | | | | | | |
| SC 6 | 3 | 4 | 8% | | | | | | | | | 3 | | | | |

FIG. 18

| Title | | | | | Title 1 | | | | | Title 2 | | | | Title 3 | | | |
|---|---|---|---|---|---|---|---|---|---|---|---|---|---|---|---|---|---|
| Patent# | | | | | 6,697,xxx | | | | | 7,272,xxx | | | | 7,327,xxx | | | |
| Filing Date | | | | | Oct 01, 1999 | | | | | Jan 14, 2004 | | | | Mar 02, 2004 | | | |
| Total Claims | | | | | 58 | | | | | 28 | | | | 24 | | | |
| Claim# (Independent) | | | | | 1 | 11 | 30 | 44 | 52 | 1 | 14 | 22 | 27 | 1 | 11 | 18 | 24 |
| Claim Value | | | | | 1 | 1 | 1 | 1 | 1 | 3 | 3 | 3 | 3 | 2 | 2 | 2 | 2 |
| Potential Patent Value | | | | | Not Important | | | | | Essential | | | | Important | | | |
| Scope Concept (Frequency, Desc.) | Need Feature? | | | | | | | | | | | | | | | | |
| | Rating (1-3) | Total | | | | | | | | | | | | | | | |
| SC 1 | 3 | 20 | 38% | | 2 | 2 | 2 | 2 | 2 | 2 | 2 | 2 | 2 | 1 | 1 | 1 | 1 |
| SC 2 | 2 | 7 | 13% | | | | | | | | | | | | | | |
| SC 3 | 3 | 7 | 13% | | | | | | | 2 | 2 | 2 | 2 | | | | |
| SC 4 | 1 | 6 | 12% | | | | | | | | | | | | | | |
| SC 5 | 1 | 5 | 10% | | | | | | | | | | | | | | |
| SC 6 | 3 | 4 | 8% | | | | | | | 2 | 2 | 2 | 2 | | | | |

| | Feature Shown? | | | Title 1 | | | | | Title 2 | | | | Title 3 | | | |
|---|---|---|---|---|---|---|---|---|---|---|---|---|---|---|---|---|
| Title | | | | Title 1 | | | | | Title 2 | | | | Title 3 | | | |
| Patent# | | | | 6,697,xxx | | | | | 7,272,xxx | | | | 7,327,xxx | | | |
| Filing Date | | | | Oct 01, 1999 | | | | | Jan 14, 2004 | | | | Mar 02, 2004 | | | |
| Total Claims | | | | 58 | | | | | 28 | | | | 24 | | | |
| Claim# (Independent) | | | | 1 | 11 | 30 | 44 | 52 | 1 | 14 | 22 | 27 | 1 | 11 | 18 | 24 |
| Claim Status | | | | Some Overlap | | | | | Complete Overlap | | | | No Overlap | | | |
| Feature rating | | | | 2 | 2 | 2 | 2 | 2 | 3 | 3 | 3 | 3 | 1 | 1 | 1 | 1 |
| Scope Concept (Frequency, Desc.) | Rating (1-3) | Total | | | | | | | | | | | | | | |
| SC 1 | 3 | 20 | 38% | 2 | 2 | 2 | 2 | 2 | 2 | 2 | 2 | 2 | 1 | 1 | 1 | 1 |
| SC 2 | 1 | 7 | 13% | | | | | | | | | | | | | |
| SC 3 | 3 | 7 | 13% | | | | | | | | | | | | | |
| SC 4 | 1 | 6 | 12% | | | | | | | | | | | | | |
| SC 5 | 1 | 5 | 10% | | | | | | | | | | | | | |
| SC 6 | 3 | 4 | 8% | | | | | | | | | | | | | |

| Claim Concept White Space Analysis | | |
|---|---|---|
| Used Scope Concepts in Red | | |
| Unused/Unclaimed Scope Concepts in Blue | | |
| Scope Concept (Frequency, Desc.) | Number of Uses | Percent |
| SC 1 | 20 | 38% |
| SC 2 | 7 | 13% |
| SC 3 | 7 | 13% |
| SC 4 | 6 | 12% |
| SC 5 | 5 | 10% |
| SC 6 | not found | 0% |
| SC 7 | not found | 0% |

PATENT MAPPING

RELATED APPLICATIONS

This application is a continuation of and claims the benefit of priority under 35 U.S.C. § 120 to U.S. patent application Ser. No. 16/730,678, filed on Dec. 30, 2019, which is a continuation of and claims the benefit of priority under 35 U.S.C. § 120 to U.S. patent application Ser. No. 15/801,056, filed on Nov. 1, 2017, now U.S. Pat. No. 10,546,273, issued on Jan. 28, 2020, which is a continuation of and claims the benefit of priority under 35 U.S.C. § 120 to U.S. patent application Ser. No. 12/605,030, filed on Oct. 23, 2009, which claims the benefit under 35 U.S.C. 119(e) of U.S. Provisional Patent Application Ser. No. 61/107,930 filed Oct. 23, 2008, each of which is incorporated herein by reference in its entirety and made a part hereof.

This application is related to U.S. patent application Ser. No. 11/494,278, entitled "Patent Mapping," by Steven W. Lundberg, Janal M. Kalis, and Pradeep Sinha, filed Jul. 27, 2006, which is incorporated herein by reference; and is further related to U.S. patent application Ser. No. 11/888,632, entitled "Patent Tracking," by Steven W. Lundberg and Janal M. Kalis, filed Aug. 1, 2007 which is incorporated herein by reference; and is further related to U.S. patent application Ser. No. 10/710,656, entitled "Patent Mapping," by Steven W. Lundberg, Janal M. Kalis, and Pradeep Sinha, filed Jul. 27, 2004 which is incorporated herein by reference and corresponding PCT application PCT/US2005/026768 filed Jul. 27, 2005.

BACKGROUND

Tools for identifying patents for a particular purpose such as a prior art search, validity analysis, or a freedom to operate investigation, operate by performing Boolean queries using various search operators. These operators allow for searching by date, terms, document number, and patent classification, among others. These tools further allow for searching individual document portions such as a document title, abstract, or claim set.

Other searching tools accept freeform text. Such tools accept a freeform text block and extract information from the text block deemed most likely to return acceptable results. However, such tools are still limited to only performing Boolean queries and displaying a list of results.

These search tools often provide large numbers of results, most of which are irrelevant. These tools fail to present results in a manner allowing for quick relevancy determinations. The presentation also fails to provide enough detail suggesting how to adjust a search for obtaining only relevant results. Further, the search tools provide the documents of the result set in a manner very similar to the traditional paper format of the documents.

BRIEF DESCRIPTION OF THE DRAWINGS

Some example embodiments are illustrated by way of example and not limitation in the figures of the accompanying drawings in which:

FIGS. 9-15 are user interfaces, according to example embodiments.

FIGS. 16-22 are example generated charts, according to example embodiments.

DETAILED DESCRIPTION

Figure 1:
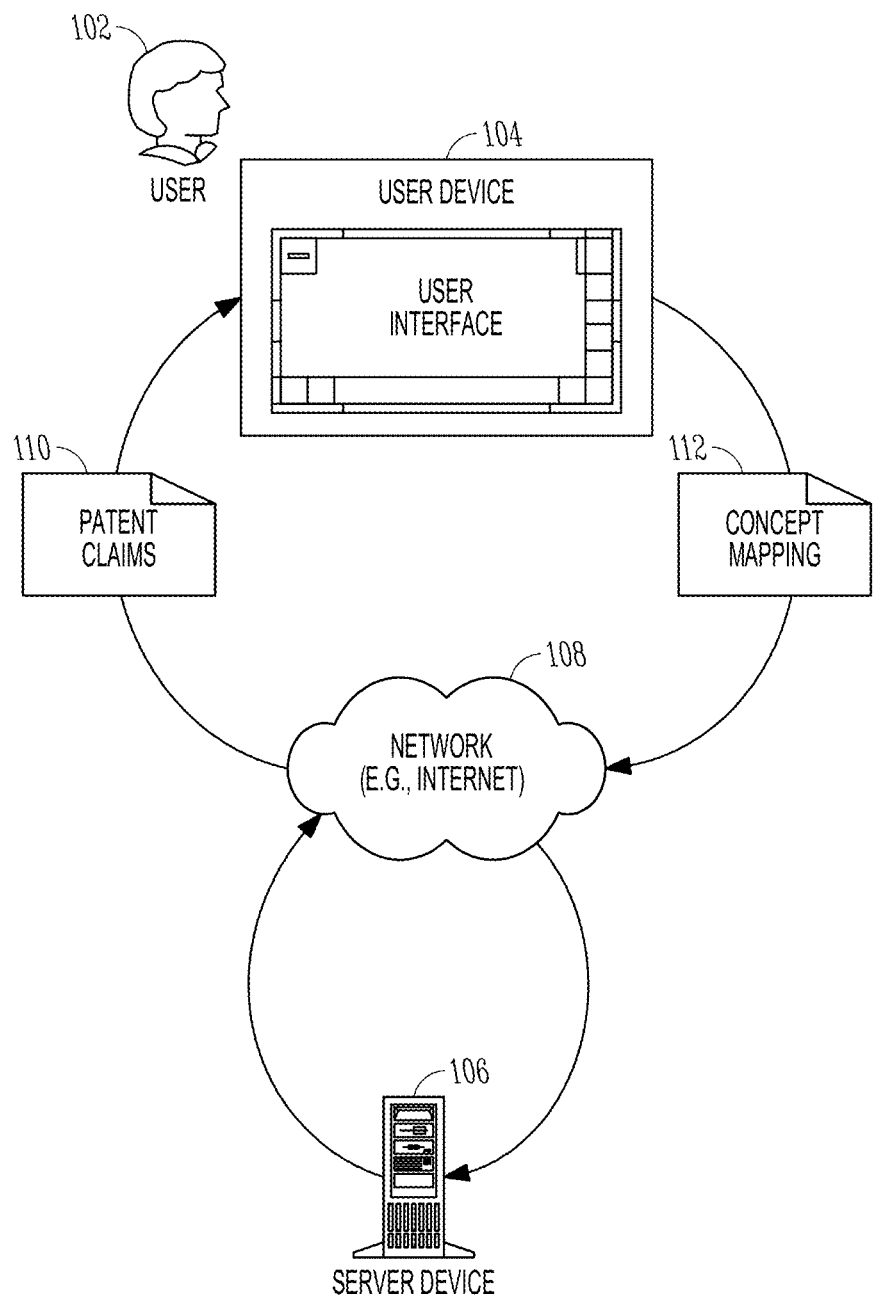
FIG. 1 is a diagram of a system, according to an example embodiment.

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

The subject matter herein provides systems, software, methods, and data structures for patent mapping, ranking and rating of patents, searching, and generating visual representations of the patents and patent portfolios to quickly analyze the patents for many reasons including, but not limited to, claim coverage and value. In an example embodiment, a patent portfolio may comprise one or more patents that may or may not be commonly owned or related. The collection of patent portfolios and patents may be stored in one or more databases. A patent may belong to more than one portfolio at the same time. In an example embodiment, the underlying patents and patent claims included in each patent portfolio may be categorized by patent concepts (sometimes referred herein as concepts) such as scope concepts (SC) and technology categories (TC).

In an example embodiment, technology categories are categories that claims relate to, but are not necessarily limited to. For example, a claim to a pulse generator may be put in the technology category "pacemaker", but not be limited to a pacemaker per se—perhaps the claim merely says that the pulse generator generates a pulse of certain type that is useful for pacing, but pacing does not appear in the claim. Hence, the claim relates to the technology category "pacemaker," but it is not limited to being a pacemaker.

In an example embodiment, scope concepts are concepts that a claim is limited to. This is contrast to technology categories, where the claim may be mapped to a TC but it not necessarily limited to it. A scope concept may defined in a way to give the concept a context that a user can understand without necessarily having to look at the corresponding claim language. For example, if the scope concept is "method or apparatus for cardiac rhythm management", and it is mapped to claim A, then claim A by definition is limited to this application, such that if a target device does not perform cardiac rhythm management, then it would not infringe claim A.

In an example embodiment, there are two types of scope concepts: 1) high level scope concepts that are like technical categories in the sense they are broad and general and apply to many claims in a portfolio; and 2) scope concepts that are specific to a limited number of claims—for example all claims in a patent may be limited to a very specific distinguishing feature, and this feature could be the basis for a scope concept.

In some example embodiments, high level scope concepts may be defined prior to mapping, and then assigned as applicable. For example, several scope concepts like: atrial pacing, ventricular pacing, defibrillation method or device, etc., may be defined. Then a mapping team may go through all claims in a portfolio and map these scope concepts to claims that are limited to these concepts. After the mapping is complete, an analysis may be done showing how many claims in the portfolio are limited to each of these scope concepts, and the claims may be presented for each SC. This may be useful is disqualify claims that are not of interest to a particular target (e.g., if an analysis is being done to find a claim that covers an alleged infringer). In some example embodiments, specific scope concepts are mapped patent by patent or by patent family. These may enable a person to create one or two scope concepts that can be mapped across all claims in given patent, a family of patents, or across a portion of a patent portfolio. In order to effectively formulate a scope concept that may be globally useful across a patent portfolio, it may be useful to be able to examine multiple patent claims at the same time even if they are not all in the same patent or patent family.

FIG. 1 illustrates an example system to implement the methods described herein. Shown is a user 102 and a user device 104. The user device 104 may be, for example, a personal computer, mobile phone, or personal digital assistant. The user device 104 may be a computer system as described in FIG. 17. Users of the system may include specialized personnel trained to map patent claims as well as personnel trained to analyze the resulting claim map. The user device 102 may communicate with a server device 106 over a network 108 (e.g., the Internet) using a variety of communication means including, but not limited to, wired and wireless communication. The server device 106 may be a computer system as described in FIG. 17. In an example embodiment, the user 102 requests patent claims 110 from the server device 106 and transmits concept mappings 112 back to the server device 106 through the user device 104 via the network 108. In various embodiments, one or more software applications are executed on the user device which facilitate the interactions and data transmissions between user 102, user device 104, and server device 106. Other information needed to complete the methods described herein may be transmitted between the user device 102 and server device 106 according to example embodiments.

Figure 2:
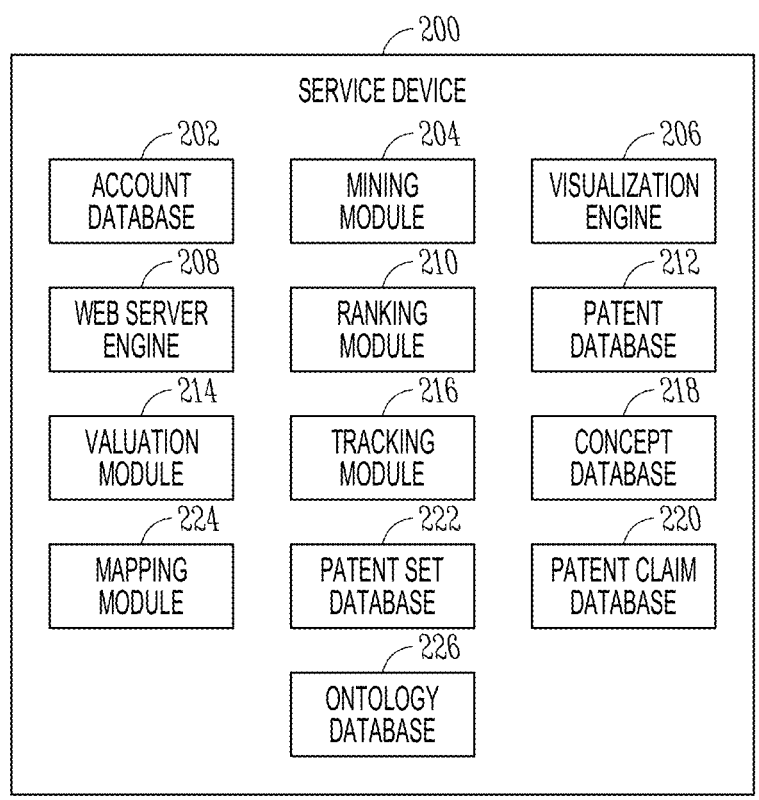
FIG. 2 is a block diagram of a server device, according to an example embodiment.

FIG. 2 illustrates an example server device 200. In an example embodiment, the server device includes one or more modules, databases, and engines. The various modules, databases, and engines may interact with each other and may take on the functionality of other modules, databases, and engines. Databases, according to an example embodiment, generally refer to sets of data stored in tables and may be implemented using a variety of database solutions including Oracle and MySQL. Engines, according to an example embodiment, generally refer to the generation of a product/image that is presented to a user (e.g., a webpage). Modules, according to an example embodiment, generally refer to functionality or features of the system that a user may invoke. For example, the mapping module may provide the necessary logic to create a mapping between a concept and a patent claim. According to an example embodiment, server device 200 includes an account database 202, a mining module 204, visualization engine 206, a web server engine 208, a ranking module 210, a patent database 212, a valuation module 214, a tracking module 216, a concept database 218, a patent claim database 220, a patent set database 222, a mapping module 224, and an ontology database 226.

In various embodiments, the modules, engines, and databases are implemented in a combination of software and hardware. For example, a mapping module can be stored as set of instructions stored on a machine-readable medium. The instructions can be executed on a processor and cause a machine to perform operations related to mapping. Additionally, the visual presentation of data in not limited to engines and may be done by modules as well. Similarly, engines may contain underlying logic dictating on how each engine functions and interacts with the user, software, and hardware of the system. In various embodiments, the modules, engines, and databases are combined.

In an example embodiment, the account database 202 includes data pertaining to the different users of the system. In some embodiments, different levels of user are defined. For example, an administrator level allows the creation of an ontology (e.g., a collection of patent concepts and keywords) and mapping of patent claims while an analysis level user may only mine the map for patent claims. The web server engine 208 may present webpages to the user via the user device. The webpages may include forms and user interfaces for the user to interact with such that the user may manipulate the underlying data stored on the server device on one or more databases.

In an example embodiment, databases 212, 218, 220, 222, and 226 store the underlying data that the server device interacts with and modifies according to user input. The patent database 212 may include information related to all the patents stored in the system such as title, filing data, assignee, etc. The concept database 218 may store all the concepts that have been defined either by the user or automatically by the system. The patent claim database 220 may include information related to patent claims including which patent they belong to as well as concepts that have been mapped to the patent claims. The patent set database 222 may store information on sets of patents that have been defined by the user. In an example embodiment, a patent set may be defined by exclusion mining (e.g., the set of patents that have NOT been mapped to a certain concept). The ontology database 226 may store information on a user defined set of concepts.

The mapping module 224, in an example embodiment, enables a user to map a concept to a patent claim. For example, the user may create and define a patent concept which is then stored in the concept database. The user may then send an indication, through the user device, that a patent claim in the patent claim database 220 should be mapped to the new concept. The indication may take the form of a type of user input such as clicking on an interface using an input device. The server device may then store this mapping in the patent claim database. For example, a relationship between the patent claim and concept may be stored in one or more of the databases.

The mining module 204, in an example embodiment, allows a user to search through the data stored in the databases to find patent claims of interest. For example, a user may wish to find all the patent claims related to a gear used in a bicycle. Rather than having the user define what the gear is, the user may indicate to the mining module what the gear is not, by indicating what concepts do not apply (exclusion mining). The mining module may search the entire universe of claims in the patent claim database, or a portion of the patent claim database, and retrieve the remaining patent claims (those claims that not have the concept) and present them to the user.

The visualization engine, in an example embodiment, generates reports and visual depictions of the data contained in a set of claims. For example, the visualization engine may generate a spreadsheet with the concepts in the concept database as rows and the patent claims as the columns. Color coding may be used to signify where a patent claim has been mapped to a concept. In some example embodiments, a user of the system may add additional data that influences the spreadsheet created. Some example embodiments include the generation of competitor landscape, freedom to operate, product coverage, validity, valuation, white space analysis, and white space claim generation spreadsheets. In various embodiments, other forms of coding are used such as shading and patterning.

The tracking module 216, according to an example embodiment, maintains information related to a specific patent, group of patents, or concept. For example, the tracking module may store information related to a patent's prosecution and litigation history such as office actions or claim amendments. Alerts (e.g., electronic mail) may be sent to a user indicating a change in a patent or patent application.

The ranking module 210 and valuation module 214, according to example embodiments, enable the user to provide additional information related to patents, patent claims, and concepts that may be used to determine a course of action such as abandoning a patent or pursing research in a specific field. For example, a user may indicate a specific concept as being key to her business. Further, a lawyer or other trained patent professional may provide a ranking for each patent included in her portfolio related to scope, design around protection, and detectability effort. The system may take this knowledge and through the visualization engine generate a chart that shows the highest ranked patents that also include her important concept.

Data Models

In an example embodiment, data models are defined to store the information related to the patents being analyzed. FIGS. 3-8 illustrate example data models that may be utilized. These may be defined in any suitable programming language such as C, C++, Java, Ruby, etc., that allows the manipulation of data models. In some embodiments, data models are referred to as classes and both terms will be used in the following descriptions. Further, an object may refer to a specific instance of a class or data model. As one skilled in the art will recognize, there may be more than one way to define the models and the relationships between the models. The illustrated models are to be taken only as one way of implementing the systems and methods described in this application. FIGS. 3-8, in some example embodiments, provide the lower level details of the information stored in databases 212, 218, 220, 222 and 226.

Figure 3:
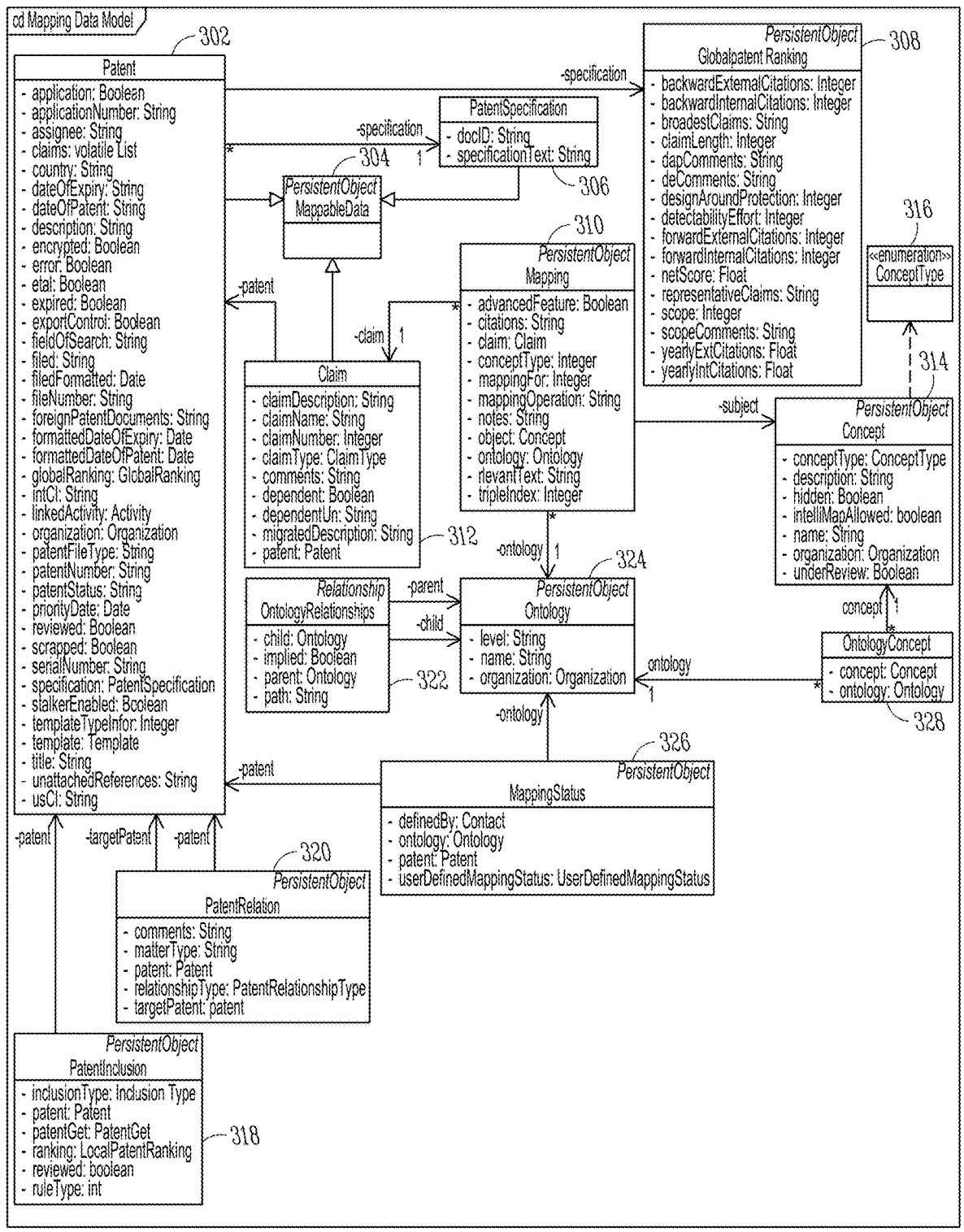
FIGS. 3-8 are data model diagrams, according to example embodiments.

FIG. 3, according to an example embodiment, illustrates data models related generally to mappable data. Shown are models and relationships for a Patent 302, Mappable Data 304, Patent Specification 306, Global Patent Ranking 308, Mapping 310, claim 312, Concept 314, Concept Type 316, Patent Inclusion 318, Patent Relation 320, Ontology Relationships 322, Ontology 324, Mapping Status 326, and Ontology Concept 328. Each model may contain one or more elements that are defined either by the system or a user. Further, as illustrated, some models are related to each in other in a one to many relationship. For example, an Ontology object 324 may be related to many Ontology Concept objects 328.

In an example embodiment, Patent model 302 includes types of information related to a patent including, but not limited to, whether or not it is an application, the number of claims, when it was filed, what organization it may belong to, the serial number, and its status. As can be seen, each piece of information may have an associated class such as a Boolean or string. In some cases, the type is actually another class (e.g., global ranking has a class of Global Ranking). Further shown are the elements of a data model that relate to another data model. For example, example Mapping Status 326, Patent Relation 320, Patent Inclusion 318, and claim 312 models all include an element of patent with a class of Patent. This relationship allows the system to examine a Claim class and determine the Patent in which the Claim is included.

In some embodiments, the Mapping 310 data model defines persistent objects that define the relationships between the a concept (e.g., technology categories and scope concept), a claim, and an ontology. As shown, there are many elements that a Mapping 320 class may include, such as, but not limited to, citations, notes, ontology, concept type and claim. Further, in an example embodiment, many Mapping objects may be related to one Ontology object and one Claim Object. Thus, if one were to examine a Mapping object, there would be a relationship defining the ontology to which the object belongs to as well as the claim to which it has been assigned. In addition, there may be an integer signifying the type of concept to which the Mapping object belongs. As data model Concept Type 316 suggests each type of concept may be enumerated as well as be defined by an integer value. For example, the concept of scope concept may be given the value of '1' Also, the "object" element illustrated has an associated class of Concept 314. Accordingly, the Mapping object may be linked to an example concept that has been defined as "two wheeled transportation." The mapping operation element may define the relationship between the cited claim and the concept. For example, a concept may be directly mapped to a claim. Other possibilities are discussed further with reference to FIG. 10. Accordingly, a Mapping object may contain the following information with regards to some of the displayed elements.

claim: Claim A
conceptType: 1
Object: Two wheeled transportation
ontology: Bikes
mapping operation: Directly Mapped In an example embodiment, a Mapping object is created each time the system receives an indication a concept is to be mapped to a claim. In an embodiment, an indication may be stored that a concept is not mapped to a claim.

In an example embodiment, a Concept 314 object is created for every user defined concept as well as any concept the system may define automatically. Each Concept 314 may contain, but is not limited to elements of, conceptType, description, hidden, intelliMapAllowed, keywordLabel, name, organization, and underReview. As discussed above, a Concept 314 object may contain an enumeration of the ConceptType 316 object. For example, the conceptType element may have an example value of "scope concept." The description element may describe when a concept should be applied to a claim or other helpful information relating to the concept. The intelliMapAllowed Boolean may indicate whether the system may automatically apply the concept to other claims included in the system. For example, a concept type might be "keyword." These keywords may be verbatim phrases or individual words in the claim. Thus, a user may be able to safely have the system search other claims and find the same keyword and automatically create Mapping 310 objects for the keyword and found claims. The intelliMapAllowed may indicate whether the system should search automatically for these keywords.

In an example embodiment, the OntologyConcept 328 class only contains two elements, ontology and concept. An Ontology Concept 328 may be created to signify the relationship between a Concept 314 object and an Ontology 324 object. As shown, an Ontology 324 object may include many OntologyConcept objects. Also, as shown, a Concept 314 object may belong to many OntologyConcept 328 objects.

Also shown in FIG. 3, is the PatentInclusion 318 object. A PatentInclusion Object may include elements of inclusionType, patent, patentSet, ranking, reviewed, and ruleType. A PatentInclusion 318 object may be used to signify the relationship between a patent and a patentSet. This relationship is more fully explained with reference to FIG. 4.

Figure 4:
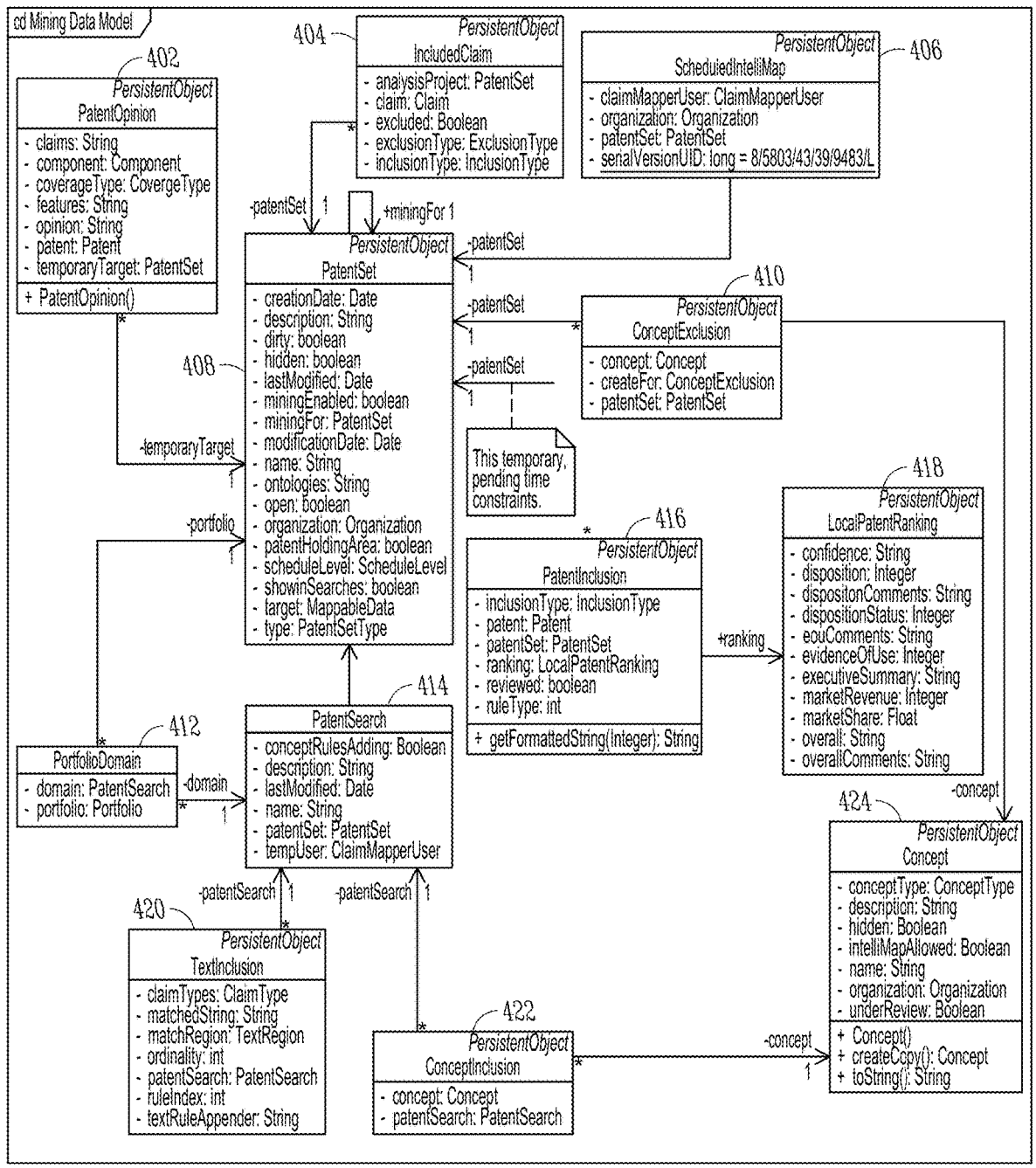

FIG. 4, according to an example embodiment, illustrates data models related, generally, to mining mapped data. Shown are models and relationships for PatentOpinion 402, IncludedClaim 404, ScheduledIntelliMap 406, PatentSet 408, ConceptExclusion 410, PortfolioDomain 412, PatentSearch 414, PatentInclusion 416, LocalPatentRanking 418, TextInclusion 420, ConceptInclusion 422, and Concept 424 classes. In some embodiments, classes with the same name as in FIG. 3 are defined similarly. For example, Concept class 424 may contain the same elements as Concept class 314. However, as illustrated, additional functions are included that may operate on the class. For example, function "createCopy( )" is illustrated in Concept class 424.

In an example embodiment, the PatentSet 408 class operates as the central class for mining. As illustrated, many of the other classes shown relate to the PatentSet 408 class. A PatentSet object may have many PatentInclusion 416, ConceptExclusion 410, and IncludedClaim 404 objects. Also, in an example embodiment, a PatentSet object may have many ConceptInclusion 422 objects related to it by virtue of the PatentSearch 414 class. Through user interfaces presented to a user and user input, a Patent Set may be defined. This may be done by a user adding claims manually or by a more sophisticated method involving a user defining which concepts to exclude or include. The various data models support an almost endless amount of customization for users of the system in the creation of patent sets.

In an example embodiment, the created patent sets may be saved for future use, as well as themselves becoming the basis for creating a new patent set. This may enable a user to efficiently search through any number of patents. The system may operate in such a manner that when a request is made to retrieve patents included in a patent set, the system responds by applying the relationships defined by the objects for that patent set. For example, the ConceptExclusion objects. This execution method may allow newly mapped patents to be included or excluded from the patent set with no additional input from a user. Thus, if a user wishes to find the intersection between a patent set related to vehicles and a patent set related to audio, the most current mapped patents available will be presented. As will be discussed in greater detail with respect to portfolio mapping, the ability to create patent sets and combine them may greatly speed up the process of finding common concepts across patents.

Figure 5:
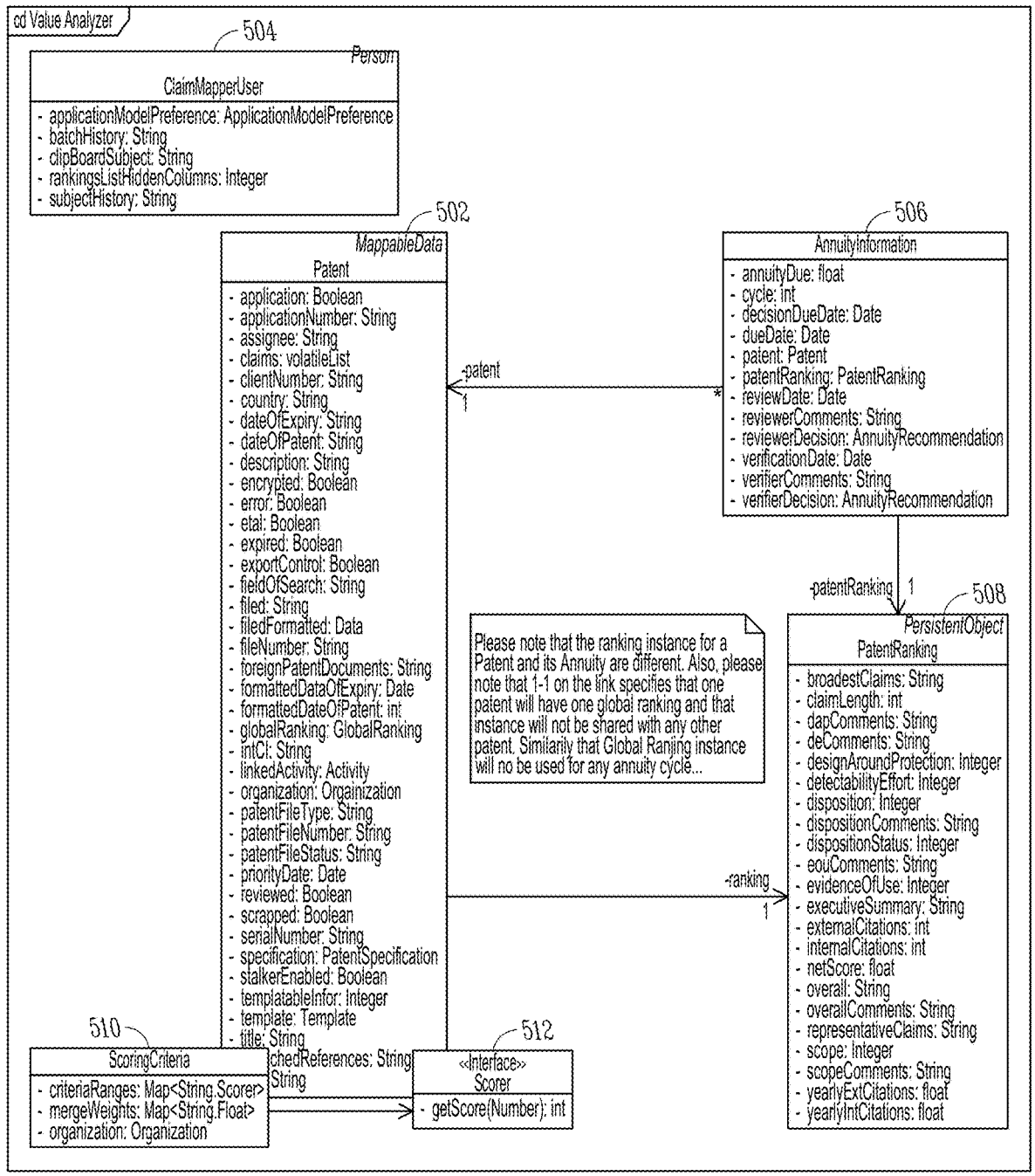

FIG. 5, according to an example embodiment, illustrates data models related, generally, to annuity data. Shown are models and relationships for Patent 502, ClaimMappedUser 504, AnnuityInformation 506, PatentRanking 508, ScoringCritetia 510, and Scorer objects 512. In an example embodiment to further enable a person to quickly analyze a large group of patent claims, patents may be given a rating. In an example embodiment, only the broadest independent claim in each patent is given a ranking, as the broadest claim will often have the most value. The patent claims may be ranked according to multiple criteria, including, but not limited to scope, detectability, and the ability to design around the patent. In an example embodiment, the ranking information may be stored in a PatentRanking object and retrieved through the Scorer interface. Each criteria may be given a weighting depending on the client's needs. For example, a client may decide that scope is twice as important as the other two criteria. Therefore, the formula to rank the patents may be:

$$0.5(\text{scope}) + 0.25(\text{detectability}) + 0.25(\text{design around}) = \text{rating}.$$

Once all of the patents have been ranked, the results may be presented to the user in a web browser, in the form of a chart, or using any other suitable display mechanism.

An AnnuityInformation object may include information related to annuities for an issued patent. Depending on the rating and annuity information of a patent, a user may automatically let patents go abandoned, a user may be alerted, or an annuity may automatically be paid. Other example embodiments will be obvious to one skilled in the art.

Figure 6:
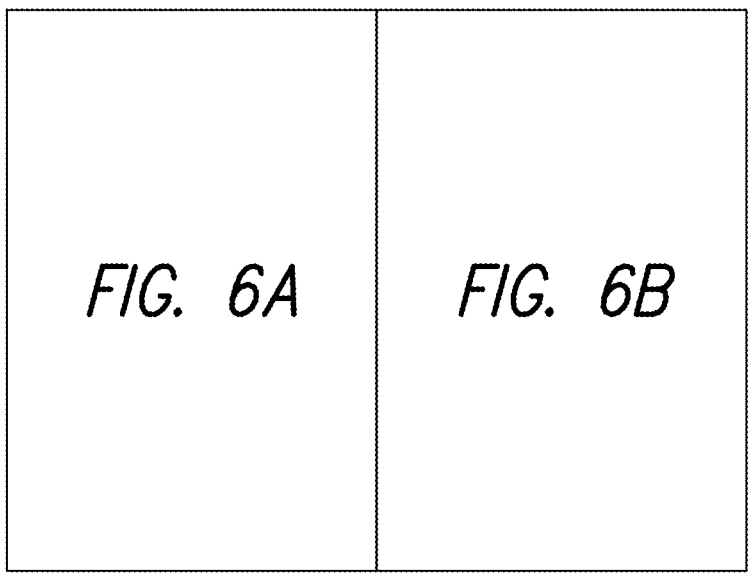
Figure 6A:
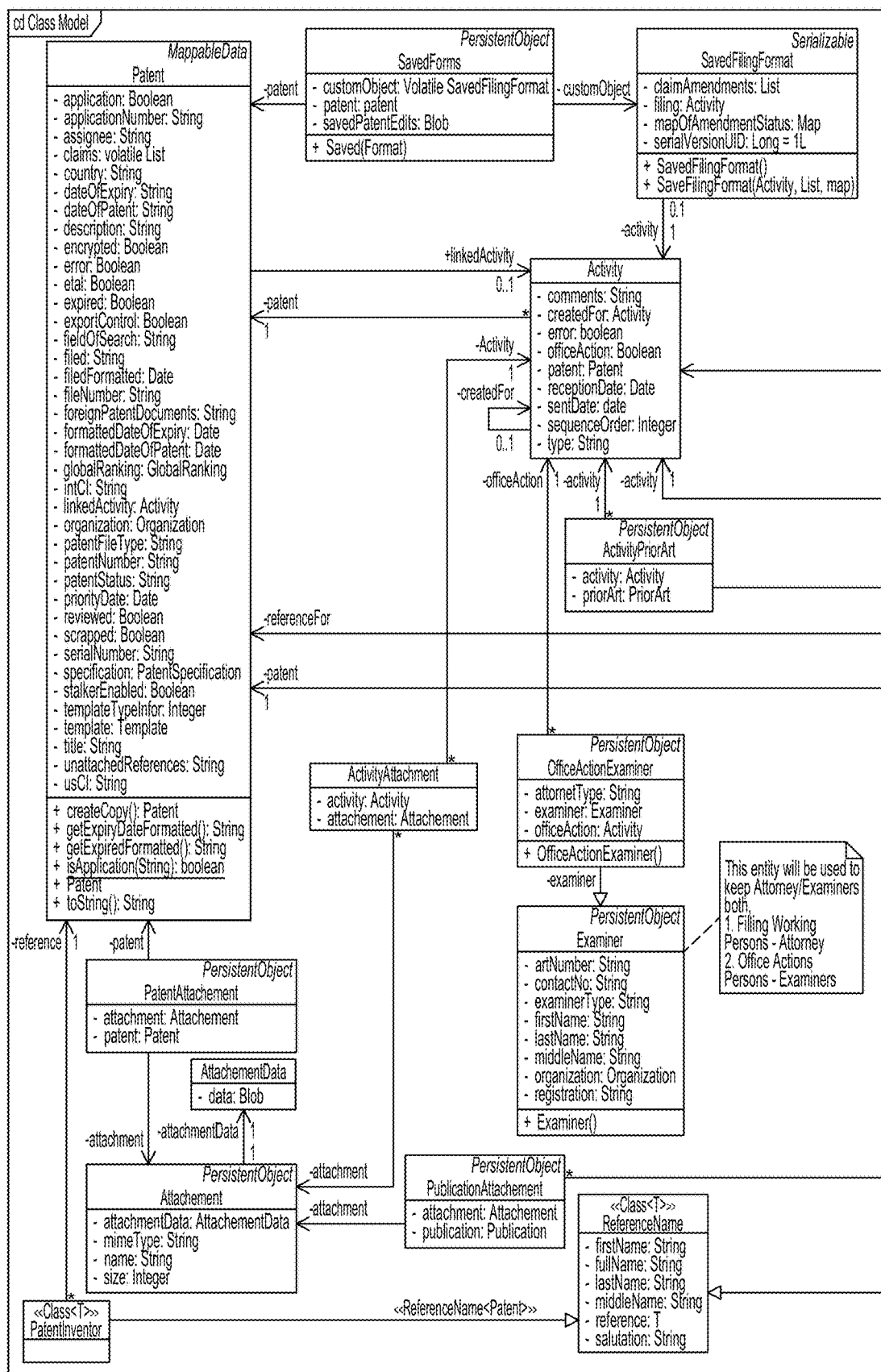
Figure 6B:
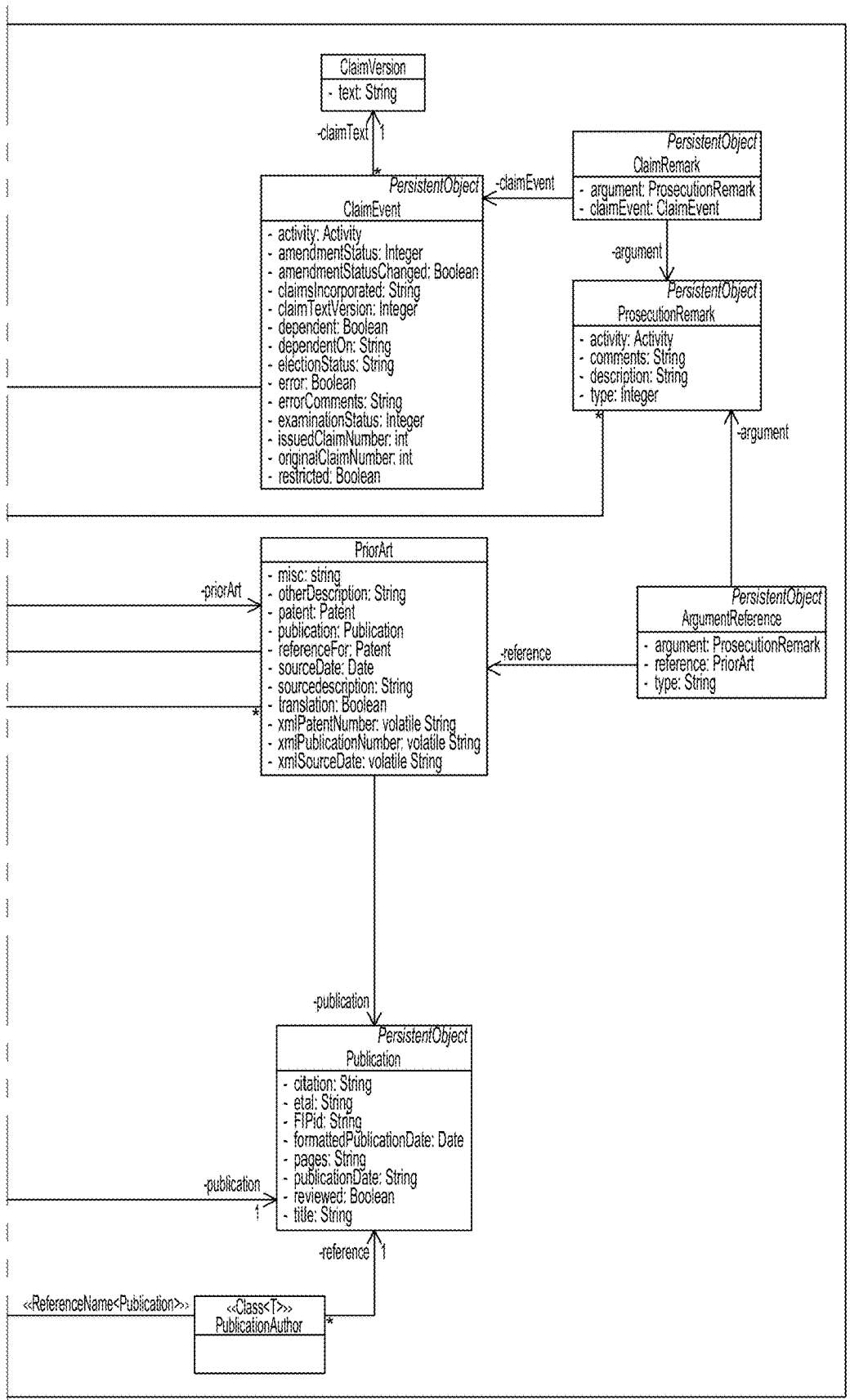
Figure 7:
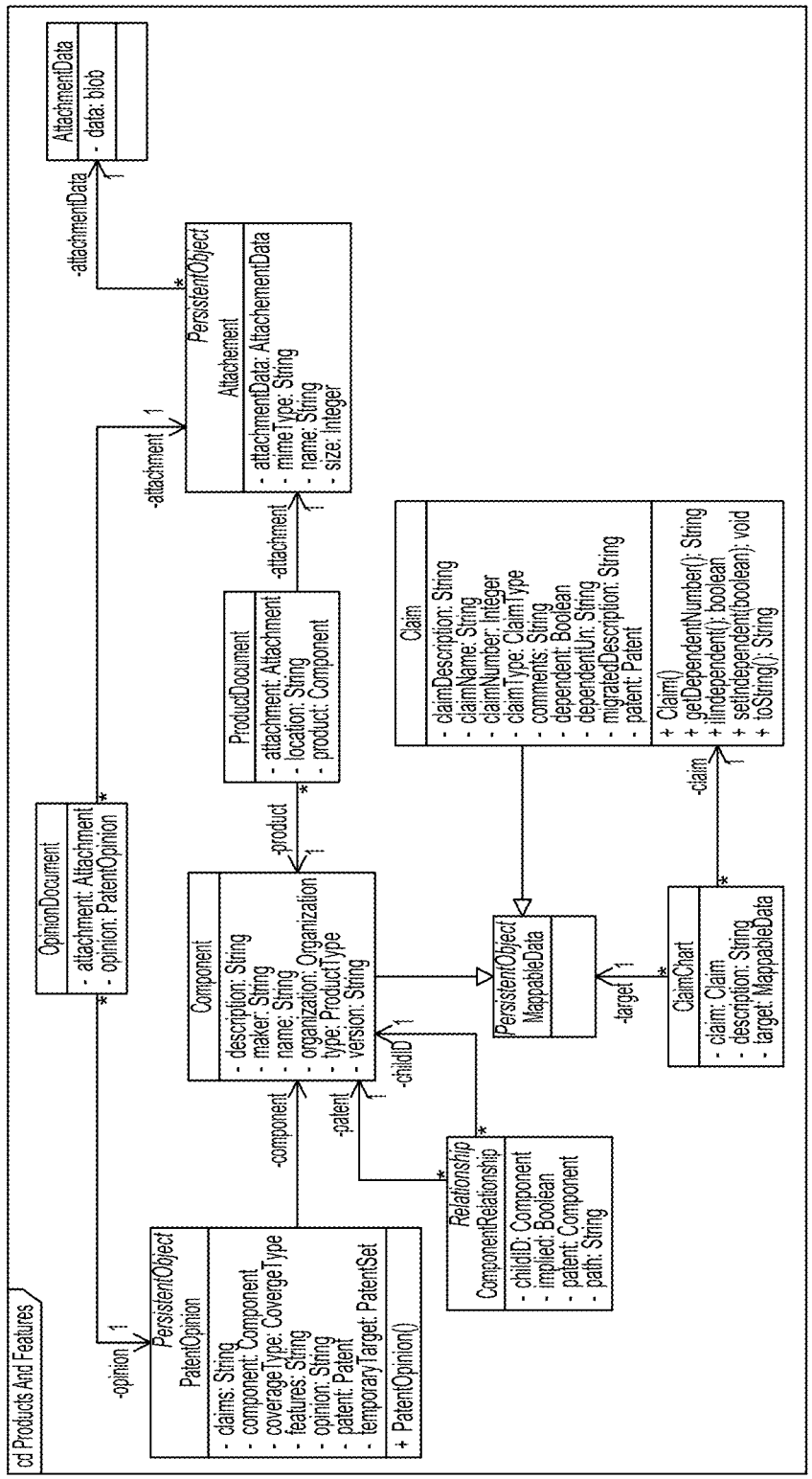
Figure 8:
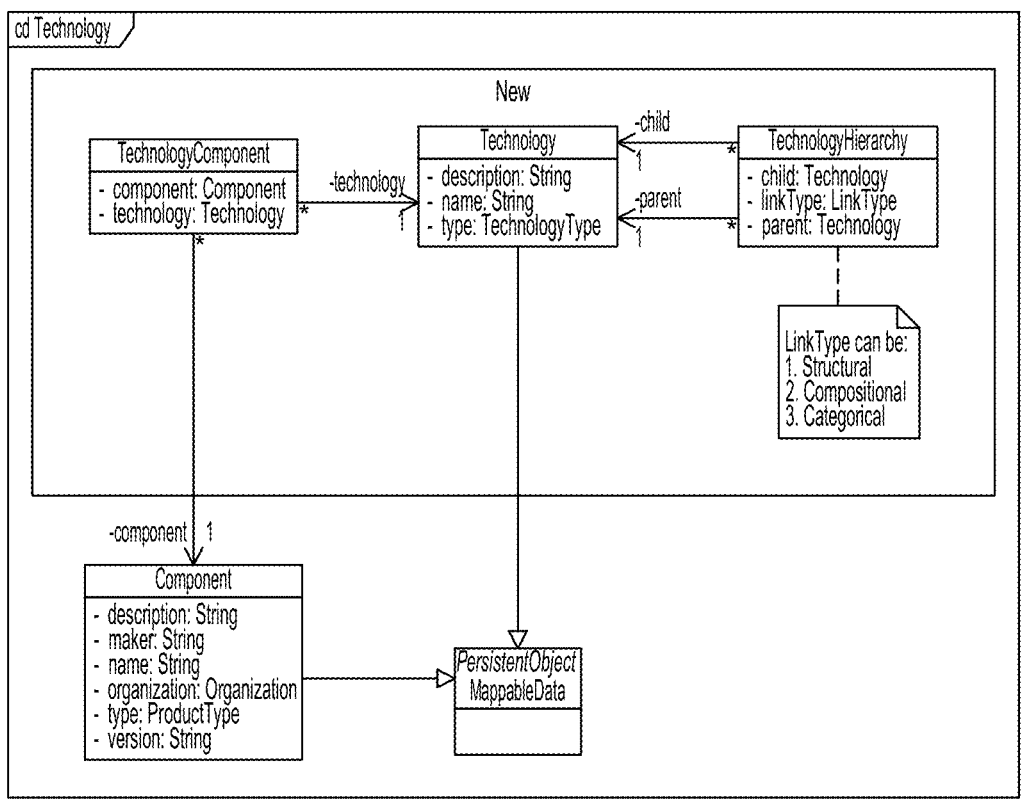

FIG. 6, according to an example embodiment, illustrates data models related generally to patent tracking. FIG. 7, according to an example embodiment, illustrates data models related generally to products and features. FIG. 8, according to an example embodiment, illustrates data models related generally to technology hierarchies.

Portfolio Mapping

Figure 9:
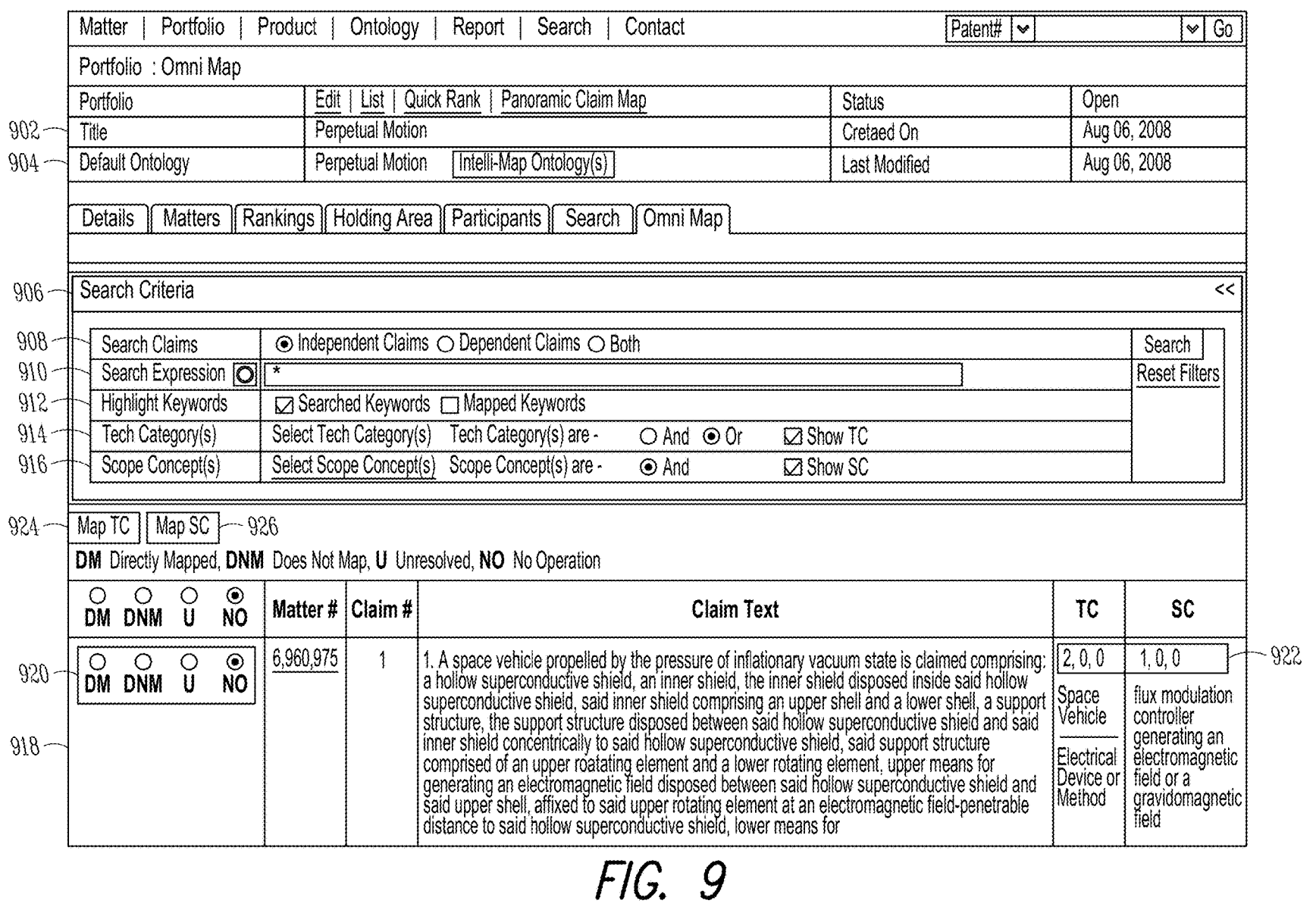

FIG. 9 illustrates an example user interface that may be utilized to facilitate the methods described to map patent claims, according to an example embodiment. Displayed is the title 902 of a patent portfolio, controls are also illustrated that allow a user to edit to the portfolio, list the patents in the portfolio, "quick rank," and generate a panoramic claim map. Also shown is the "Default Ontology" 904 being used. In an example embodiment, "Quick Rank" allows a user to map all the patent claims in a patent to concepts at the same time. An ontology, in an example embodiment, includes the different concepts available to a user to map to one or more of the patent claims. Further, there is an example search criteria box 906 which allows a user to specify a search query. Included are options to narrow the search by type of claim 908 including searching independent claims, dependent claims, or both. The search expression box 910 may allow a user to specify a regular expression to use as a search query. There is also an option to have keywords highlighted 912 in the search results. In an example embodiment, this may include the searched for keywords or keywords that have previously been mapped to the claims. Also shown are options to narrow the search results by technology categories 914 and scope concepts 916.

Figure 10:
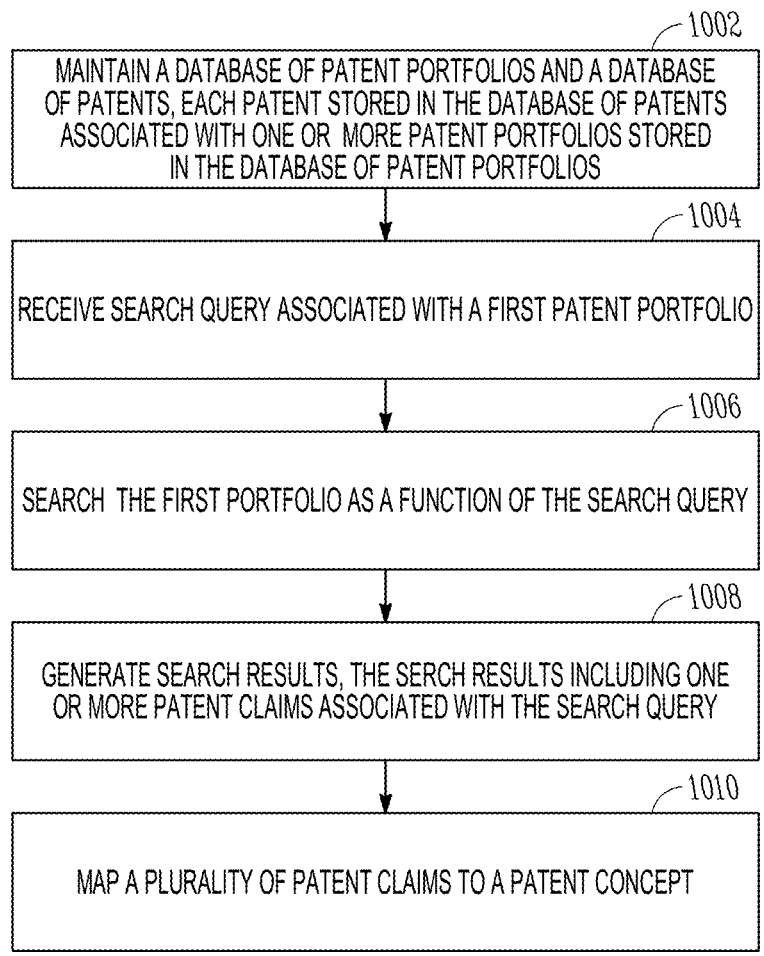

FIG. 10 illustrates a method to map concepts to patent claims according to an example embodiment. A user interface such as the one illustrated in FIG. 9 may be used to facilitate this example method. Further, in an example embodiment, the method may be implemented using the data models and server device described above (e.g., server device 106 with reference to FIG. 1). At block 1002, a database of patent portfolios and a database of patents are maintained, each patent stored in the database of patents associated with one or more patent portfolios stored in the database of patent portfolios. A database management system may be used (DBMS) for storing and retrieving data from a data store which includes the database of patents and database of patent portfolios. In some embodiments, the DBMS is a relational database management system (RDBMS). In some other embodiments, the data store includes storing data in a Resource Description Framework Schema (RDFS). In some embodiments, communication with the data store includes using a language such as Structured Query Language (SQL) or eXtensible Markup Language (XML).

In an example embodiment, a database of ontologies may also be maintained, the ontologies including one or more patent concepts. As discussed above, an ontology may include all the metadata (patent concepts) that one may wish to map to a patent claim. For instance, the one or more patent concepts may include a technology category. The one or more patent claims may also include a scope concept, the scope concept defining a scope to which a patent claim is limited. Keywords may also be used as patent concepts. These may be any term or short phrase that appears in the claim, exactly as it appears in the claim. As these terms are taken from the claims, they may be thought of as limitations in the sense that if the term cannot be read on an accused device, the claim probably does not cover the accused device. Example user interfaces showing scope concepts in an ontology can be seen with reference to FIG. 11.

In an example embodiment, at block 1004, a search query associated with a first patent portfolio is retrieved. A user of the system may wish to search a previously created portfolio of patents. A patent portfolio may include patents that a user wishes to analyze. For example, a portfolio might include all of the patents for a company ABC Corp (ABC). A portfolio may be stored and defined as a patent set in the patent set database (e.g., patent set database 222 in FIG. 2) ABC might have received information on a potential infringing product. In order to find the patent claims relevant to the product, ABC may wish to map its entire patent portfolio and use the resulting mapped portfolio to quickly find the best claims to assert in an infringement lawsuit. However, it may also be useful to map the patents of the alleged infringer. These patents may also be added to the portfolio as it is likely ABC's patents and the alleged infringer's patents will have overlapping subject matter.

The search query may help to narrow down the patent. In an example embodiment, the search query many include a regular expression. For example, if the search query is "*" all the patent claims in the patent portfolio will be displayed. Boolean expressions such as "car && dog" may also be used. In some example embodiments, an option is included to only search independent claims, dependent claims, or to search both. In some example embodiments, the portfolio may further be narrowed by using patent concepts that have been included in the current ontology.

Figure 12:
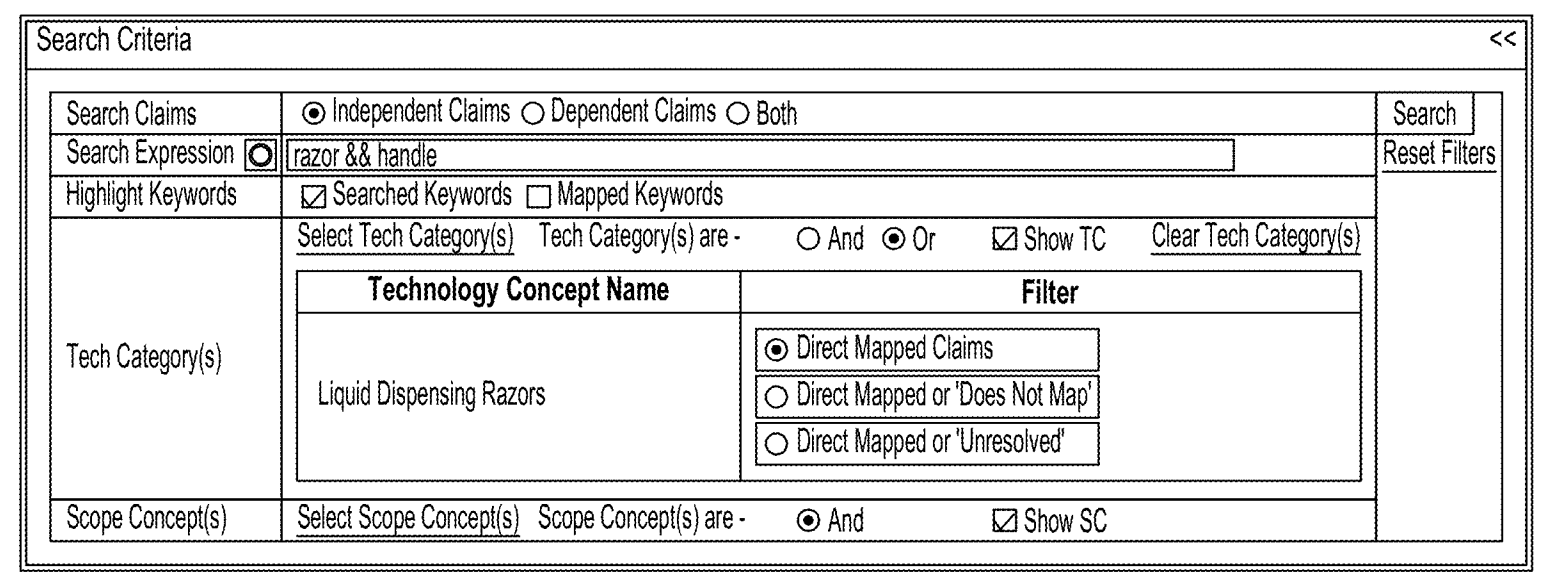

FIG. 12 shows an example user interface with example options available to search by technology category. An example option is presented allowing a user to search technology categories disjunctively or conjunctively. In an example embodiment, each technology category in the ontology is shown to the user with three example options "Direct mapped claims," "Direct Mapped or 'Does Not Map,'" and "Direct Mapped or 'Unresolved.'" These terms will be discussed in greater detail with respect to block 1010.

FIG. 13 shows an example user interface with example options available to search by scope concept. In an example embodiment, each scope concept in the ontology is shown to the user with four example options "Direct mapped claims," "Do not include Direct Mapped or 'Does Not Map,'" "Direct Mapped or 'Does Not Map,'" and "Direct Mapped and 'Unresolved.'" These terms will be discussed in greater detail with respect to block 1010.

Referring back to FIG. 10, in an example embodiment at block 1006, the first portfolio is searched as a function of the search query. At block 1008, in an example embodiment, search results 918 are generated, the search results including one or more patent claims associated with the search query. Using the search query provided, a query may be formatted as an SQL query or other suitable format to query the underlying databases. Generating the search results may include retrieving patent claims which include terms from the search query and synonyms of the terms as well as plural versions of terms in the search query. The results of the query may then be presented to the user in an example user interface as shown in FIG. 9. Only one patent claim is illustrated, however, more patent claims may have resulted from the search and may be shown simultaneous as to have the ability to manipulate multiple patent claims. Column headings may include four radio buttons 920 signifying the options available for mapping, the matter number, the claim number, the claim text, and other technology categories or scope concepts currently mapped to the claim. Because the generated search results are searching an entire portfolio of patents it may be possible that not all of the claims of a given patent will match to the search query. A trio of numbers 922 may also be displayed for each claim in relationship to the technology category heading and the scope concept heading. These represent the nature of the relationship between the claim and the technology category or scope concept. For example, as illustrated, claim 1 has two technology categories directly mapped: "space vehicle" and "Electric Device or Method." It also has one scope concept directly mapped.

Referring back to FIG. 10, at block 1010, in an example embodiment, a plurality of patent claims are mapped to a patent concept. In an example embodiment, in addition to the database of patents and patent portfolios, a database of patent claims may be maintained. The database of patent claims may be administered and interacted with using a DBMS as described above. As described more felly with reference to FIG. 3, each patent claim may have one or more patent concepts that have been mapped to the claim. As discussed above with reference to narrowing down search results, the relationship between a patent concept and a patent claim may take on many forms. For example, the relationship may be one where the patent concept is directly mapped to a patent claim. This may indicate that a user who looked at the claim made the decision that the patent claim was in a particular technology category, for example. Another relationship may indicate that a patent concept is not mapped to a patent claim. If a user is sure that a particular claim is not in a technology category, for example, it may be beneficial for that information to be saved so that the mapping process is not unnecessarily duplicative.

With reference back to FIG. 9, a user may select one or more patent claims to map based on the radio buttons displayed. In an example embodiment, there are four radio buttons indicating options for the claim: "Direct Mapped," "Does Not Map," "Unresolved," and "No Operation." The first two options are described in detail above. The "Unresolved" radio button may indicate that a user is not sure whether the concept should be mapped to the patent claim. This may be helpful in cases where the user does not have the legal or technical expertise to make a decision one way or another. A more senior user may then review the unresolved patent claims en masse at a later time. The last radio button may indicate that a user does not wish to have any relationship defined between the patent claim and a patent concept. In an example embodiment the "No Operation" radio button is selected by default for all the patent claims returned from the search query.

Upon a user indicating a preferred mapping for each patent claim, a user may further indicate a preference of which category of patent concept to map. In an example embodiment, there are two categories: technology categories and scope concepts (e.g., elements 924 & 926 in FIG. 9). In an example embodiment, a user clicks on the button corresponding to their preference and this preference is sent to the service device which detects the category of concept the user clicked. In response, a user interface is presented to the user corresponding to his or her preference. For example, FIG. 14, may be presented.

Figures 14, 15:
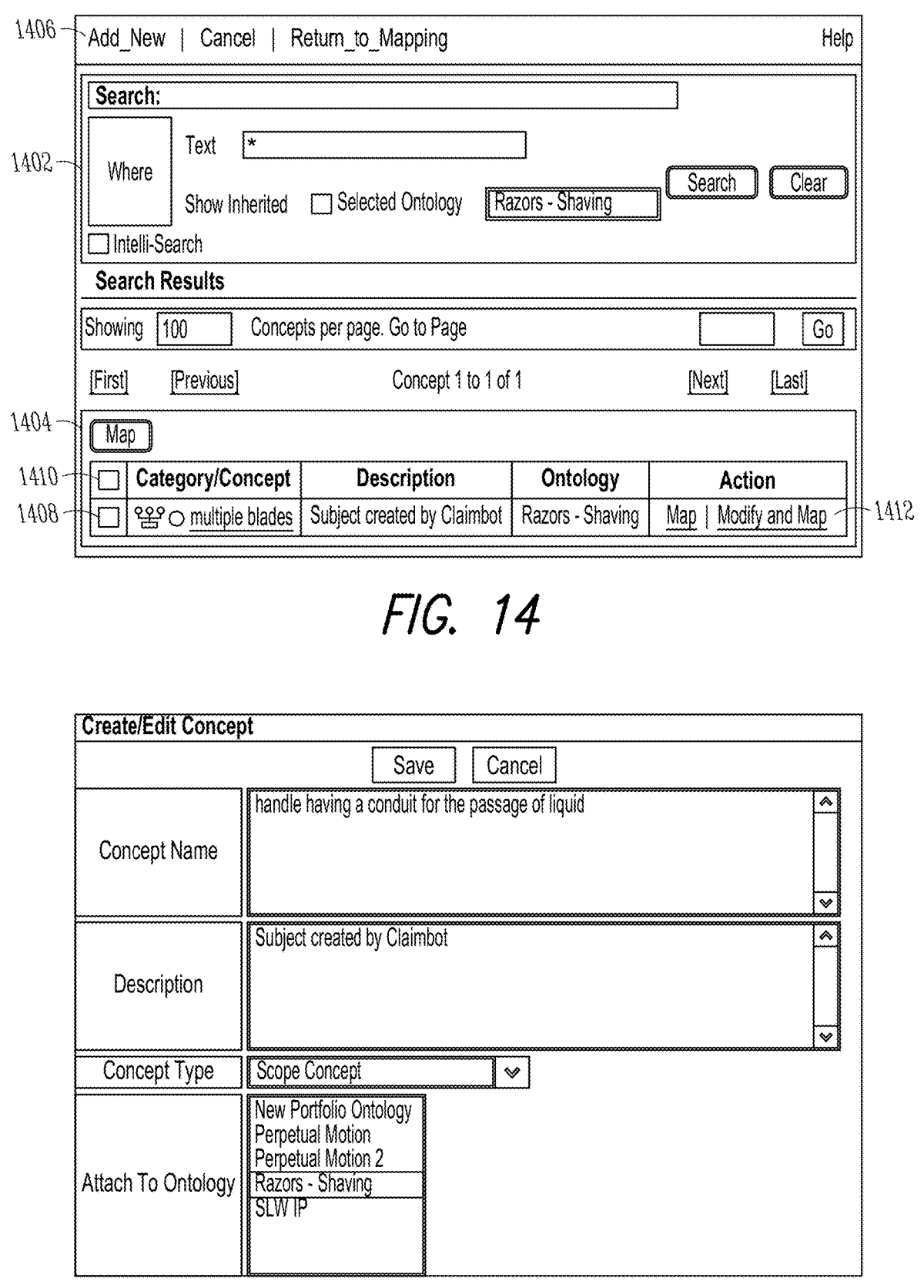

FIG. 14 illustrates an example search box 1402 and an example search results 1404 section. Across the top is an option to add a new patent concept 1406 (see FIG. 15 for a more detailed look at an example method to add a patent concept). Other options may include returning to the main mapping screen (e.g. FIG. 9) or canceling the mapping. In an example embodiment, the search box allows a user to search across an entire ontology for potential patent concepts. Similar to searching for patent claims, a user may enter a regular expression such as '*' to retrieve all the concepts included in the present ontology. For example, the results of the search 1404 displayed in FIG. 14 only returns "multiple blades." A checkbox is presented allowing a user to select the concept 1408. If there is more than one concept displayed a user may select more than one of the concepts by selecting the respective checkboxes next to the patent concepts. A checkbox at the top of the results may be selected if a user wishes to select all 1410 of the concepts returned from the ontology search.

Further example options may be presented to the right of each concept. An option to "modify and map" 1412 may be selected if the user wishes to modify the concept. This may be useful if a user wishes to broaden the concept so that it may be mapped to more patent claims. For example, a narrow technology category may have been defined as "power computer speakers." Rather than a user defining a new technology category of "passive computer speakers," the user might decide it makes more logical sense to only have one technology category titled "computer speakers." In an example embodiment, the user can safely select "modify and map" and change the technology category to "computer speakers." This may safely be done because all "powered computer speakers" are also "computer speakers." In an example embodiment, every patent claim, regardless of which portfolio(s) it may be included in, will be updated to reflect the modified concept. Thus, it may not be advisable to narrow a concept without being certain every patent claim in the system adheres to the modified concept. In an example embodiment, a warning may be displayed to the user explaining the effects of modifying a concept.

In an example embodiment, an indication of a relationship between the patent concept and the plurality of claims in the database of patents may be stored (e.g., updating one or more databases). This may be accomplished, for example, by the user selecting the map button as displayed in FIG. 14. As discussed above, a user may have selected multiple patent claims resulting from searching and may have further indicated a preference for one or more patents claims to have concepts directly mapped as well as indicated a preference to have one or more patent claims have patent concepts not mapped. Thus, in an example embodiment, the indication of the relationship may include an indication that the plurality of patent claims are not mapped to the patent concept. In an example embodiment, the indication of the relationship includes an indication that the plurality of patent claims are mapped to the patent concept.

It some example embodiments mapping a plurality of patent claims to a patent concept includes defining the patent concept. Defining the patent concept may be initiated by a user clicking on the example "add_new" button 1406 as displayed in FIG. 14. An example user interface that may be presented to the user in response to this selection is illustrated in FIG. 15. Two example options may be presented, "Save" and "Cancel." Also shows are two input text boxes, "Concept Name" and "Description." The concept name may be the actual concept and may be, for example, either a technology category or a scope concept. A user may indicate which category of patent concept the new concept belongs using a pull down menu. The user may further wish to add the concept to an existing ontology by selecting one or more ontologies as presented in FIG. 15.

Report and Chart Generation

As described, the system may allow the generation of visual representation of the data included in the databases to further maximize the value of concepts to patent claims. In some example embodiments the charts may be interactive. In some example embodiments, a method to generate the charts includes formulating a query to send to one or more databases, the query requesting whether or not a set of patent claims have been mapped to a set of patent concepts. An additional query may be sent to the databases to determine additional metadata about the patent claims including, but not limited to, the filing data and owner of each patent. Ranking data may be received for each patent concept retrieved from the databases. In an example embodiment, the system generates a relationship between a ranking, a patent concept, and a patent claim and displays the relationship to the user in the form of a chart. The ranking data may be stored in the database or may be received from a user. In some embodiments, ranking data may include integer values of disparate range (e.g., 1-10 or 1-100) alphabetical letters (e.g., a grading scale of A-F), or any other means to characterize a claim or concept.

In an example embodiment, a competitor landscape chart may be generated. An example simple competitor landscape chart is shown in FIG. 16. Shown is the title, patent number, filing data, total claims, each independent claim, and owner of each patent in a patent set. The patent set may reflect the patents owned by the competitors of a company requesting the map. The scope concepts that have been mapped to the patent claims in the patent set may be displayed as rows in the chart. If a scope concept has been mapped to a patent claim than the intersecting cell between the patent claim and concept may be filled in, checked, change color, patterned, shaded or otherwise have an indication of the mapping. Additional columns may indicate the competitor that first introduced a concept as well as the date it was introduced. This may be determined by examining each patent that has a concept mapped to at least one of the claims and examining the dates of each of the matching patents. In addition, the scope concepts may be sorted by frequency. Each competitor may be assigned a color or other designation such that a user may quickly determine which company owns each patent as well as who introduced what concepts first.

In an example embodiment, a product coverage chart may be generated. An example product coverage chart is shown in FIG. 17. As with FIG. 16, relevant patent information for patents included in the patent set is displayed. Also, displayed is a column titled "Has Feature?" This column may have values ranging from one to three signifying the degree to which the product includes the concept. For example, a value of three may mean the product definitely includes the concept and a value of one means the product definitely does not relate to the concept. Based on these values, the chart may dynamically update and determine values for the claim coverage and product coverage rows. For example, SC 1 and SC 5 both have a rating of '3' and are present in all of the claims of patent "Title 1." Thus, "Title 1" has a claim coverage of '3' and a product coverage value of "potentially applies." It is only "potentially applies" because it cannot be known for certain whether the patent applies but only that that SC 1 and SC 5 are present in the claims. However, because scope concepts always describe limitations, if a claim has two scope concepts mapped, as shown with respect to the claims in patent "Title 2," the lowest ratings score will control the claim coverage. As shown, SC 6 is described as not being present in the product and the "Title 2" claims have been mapped to SC 6. Therefore, regardless of the fact the SC 3 has also been mapped and the product has this feature, the "Title 2" claims cannot apply to the product as they are at least limited to SC 6.

This chart may also allow interactivity with a user. This interactivity may include the user changing the "Has feature" values and the chart automatically updating the claim coverage and product coverage rows. For example, if the SC 1 rating was changed to '1', the claim coverage value of the patent "Title 1" may change to "1" signifying the patent does not apply to the product. In some embodiments, any changes that result from input from the user are highlighted on the chart. This may allow a user to quickly see the effects of potential changes to product coverage.

FIG. 18 illustrates an example freedom to operate chart. In an example embodiment, a freedom to operate chart allows a user to quickly see which patents may be necessary to obtain licenses from or purchase to produce a product, sell a service, etc. FIG. 18 is similar to FIG. 17 except for in place of a "Has feature?" column there is a "Need Feature?" column. The values in this column may represent whether or not, and to what extent, a user believes a feature is necessary in his or her product. A '3' may indicate that the scope concept is necessary, a '2' may indicate the scope concept is wanted, but not needed, and a '1' may indicate the scope concept is not needed. In an example embodiment, the "claim status" row shown in FIG. 18 reflects whether a patent in the patent set needs to be licensed or purchased in order for the user to operate freely. As with the product coverage chart, the lowest value in the "need feature" column controls. Thus, patent "Title 1" is not needed even though SC 1 is mapped to all the claims and the user has indicated the feature is necessary. Similarly to above, a user may interact with the ratings to see in real-time the impact of removing or adding features in terms of the number of patents needing to be licensed or purchased.

FIG. 19 illustrates an example claim/patent valuation chart. In an example embodiment, a claim/patent valuation chart allows a user to see which patents/claims may be necessary to license, etc., to maximize the value of a currently owned patent or patent claim. FIG. 19 is similar to FIG. 17 except the values in the ratings column reflect whether or not a scope concept is necessary to maximize a patent's value. The values in this column may represent whether or not, and to what extent, a user believes a feature is necessary in maximize a patent's value. A '3' may indicate that the scope concept is necessary, a '2' may indicate the scope concept is wanted, but not needed, and a '1' may indicate the scope concept is not needed. In an example embodiment, the "claim value" row shown in FIG. 19 reflects whether a patent in the patent set needs to be licensed or purchased in order to maximize the user's patent. As with the product coverage chart, the lowest, value in the rating column controls. Thus, patent "Title 1" is not important, even though SC 1 is mapped to all the claims and the user has indicated a high value for SC 1. Similarly to the above charts, a user may interact with the chart by changing the ratings to see in real-time the effects on patents in the patent set.

FIG. 20 illustrates an example validity chart. In an example embodiment, a validity chart allows a user to see the overlap between a patent and a patent set. FIG. 20 is similar to FIG. 17 except the values in the ratings column reflect whether or not a feature is shown in the patent in question (the patent to which the patent set is being compared). The values in this column may represent whether or not, and to what extent, a user believes a feature is present in the patent in question. A '3' may indicate that the scope concept is shown, a '2' may indicate the scope concept is possibly shown, and a '1' may indicate the scope concept is not shown. In an example embodiment, the claim status row shown in FIG. 20 reflects the extent to which the patent in question and the patents in the patent set overlap. Unlike the product coverage chart, if two scope concepts are mapped to a patent, but contain different ratings, the feature rating becomes "some overlap". Thus, even though SC 5 has been rated as not shown and mapped to patent "Title 1," SC 1 is also mapped to the patent but is shown and therefore there is some overlap between the patent in question and patent "Title 1." A finding of "complete overlap" may indicate to a user that a patent or claim is completed anticipated. As above, the user may interact with the chart by changing the ratings to see in real-time the effects on patents in the patent set.

Figure 22:
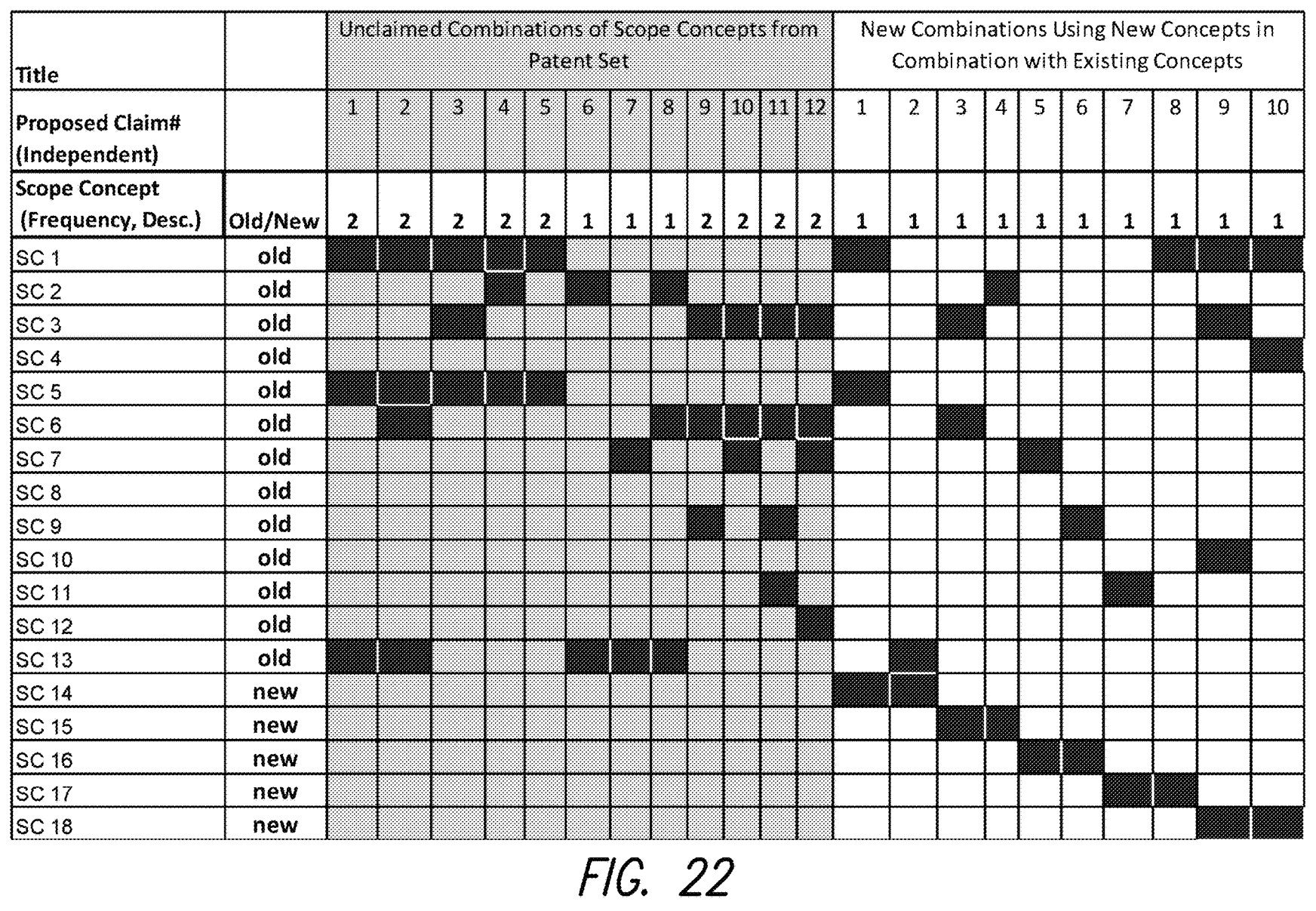

FIG. 21 illustrates an example white space analysis chart. In an example embodiment, a white space analysis chart allows a user to see the frequency in which scope concepts appear in a patent set. In some embodiments there are scope concepts that are in no patent claims. The chart may be color coded to allow a user to quickly ascertain the least frequently used scope concepts. FIG. 22 illustrates an example white space claim generation chart. In an example embodiment the generated chart illustrates suggested combinations of unclaimed combinations of existing scope concepts as well as suggested combinations of new scope concepts with existing scope concepts.

Computer System

Figure 23:
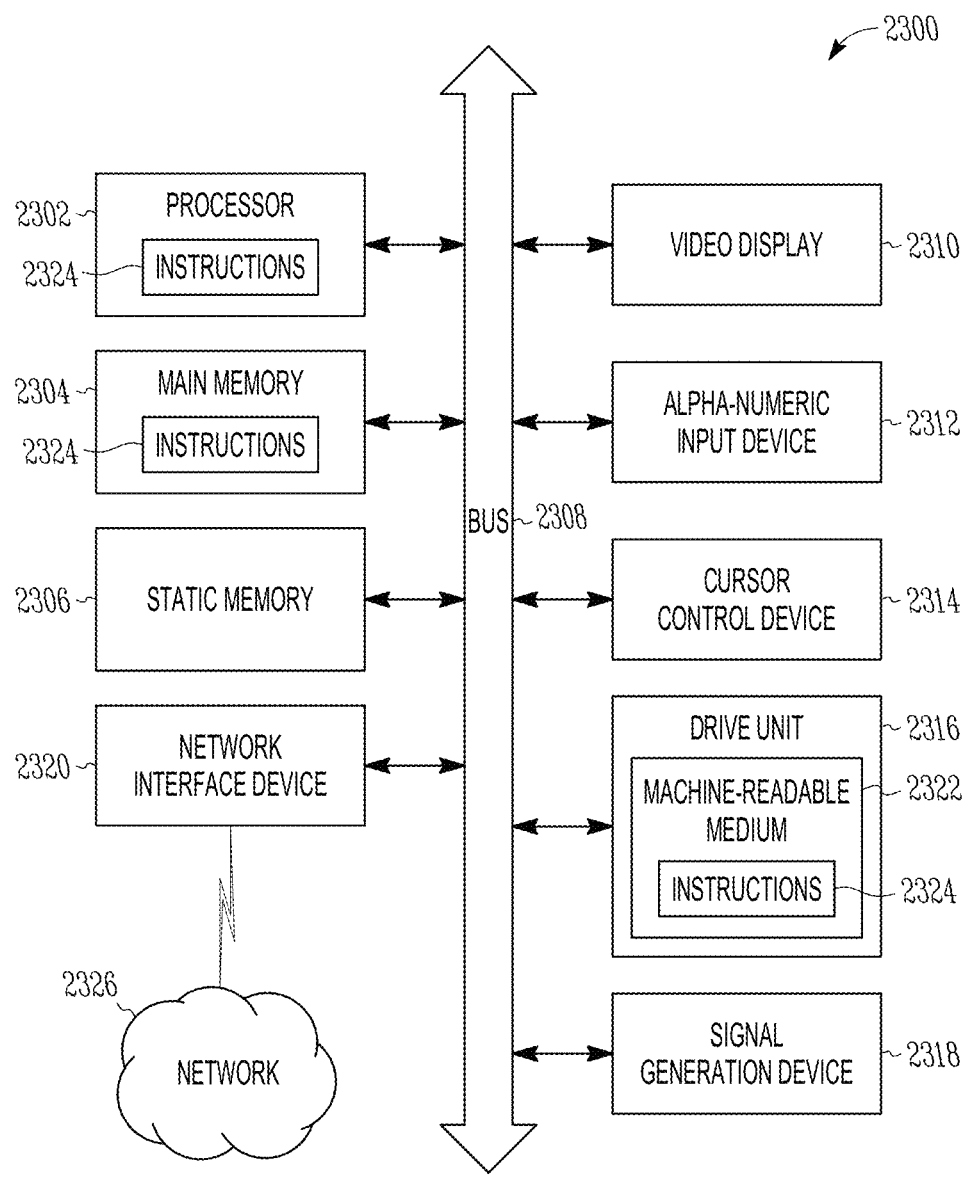
FIG. 23 is a computer system, according to an example embodiment.

FIG. 23 shows a diagrammatic representation of a machine in the example form of a computer system 2300 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The machine may be a Personal Computer (PC), a tablet PC, a Set-Top Box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which are linked (e.g., either by hardwired, wireless, or a combination of hardwired and wireless connections) through a network both perform tasks. In a distributed system environment, program modules may be located in both local and remote memory-storage devices (see below).

The example computer system 2300 includes a processor 2302 (e.g., a Central Processing Unit (CPU), a Graphics Processing Unit (GPU) or both), a main memory 2304 and a static memory 2306, which communicate with each other via a bus 2308. The computer system 2300 may further include a video display unit 2310 (e.g., a Liquid Crystal Display (LCD) or a Cathode Ray Tube (CRT)). The computer system 2300 may also includes an alphanumeric input device 2312 (e.g., a keyboard), a User Interface (UI) cursor controller (e.g., a mouse), a disc drive unit 2316, a signal generation device 2318 (e.g., a speaker) and a network interface device (e.g., a transmitter) 2320.

The disc drive unit 2316 includes a machine-readable medium 2328 on which is stored one or more sets of instructions 2317 and data structures (e.g., software) embodying or utilized by any one or more of the methodologies or functions illustrated herein. The software may also reside, completely or at least partially, within the main memory 2304 and/or within the processor 2302 during execution thereof by the computer system 2300, the main memory 2304 and the processor 2302 also constituting machine-readable media.

The instructions 2317 may further be transmitted or received over a network (e.g., the INTERNET) 2326 via the network interface device 2320 utilizing any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
    maintaining a database of patent portfolios and a database of patents, each patent stored in the database of patents associated with one or more patent portfolios stored in the database of patent portfolios;
    generating a patent mapping graphical user interface including a search expression entry user interface element for receiving a search query that is automatically associated with a selected patent portfolio;
    receiving, via the search expression entry user interface element, a search query associated with a first patent portfolio;
    searching the first portfolio as a function of the search query;
    generating, for display in the patent mapping graphical user interface, search results, the search results including one or more patent claims associated with the search query;
    upon receipt of an indication of a selection of a patent mapping user interface element, displaying a patent concept graphical user interface that includes a patent concept entry user interface element for receipt of a patent concept and a selectable submission user interface element for submission of the patent concept;
    upon receipt of an indication of a selection of the selectable submission user interface element, defining a patent set based on the selection of the selectable submission user interface element, and generating a mapping object for each of the one or more patent claims, wherein the mapping object describes a relationship between the patent concept, a respective patent claim of the one or more patent claims, and an ontology;
    adding the mapped one or more patent claims to the patent set by applying the relationship described by the mapping object;
    mapping the one or more patent claims to the patent concept using the mapping object for each of the one or more patent claims; and
    displaying the mapped one or more patent claims in the patent mapping graphical user interface.

2. The method of claim 1, further comprising:
    maintaining a database of ontologies, the ontologies including one or more patent concepts, wherein the patent concept entry user interface includes a list of selectable user interface elements associated with the one or more patent concepts, and wherein the patent concept is received upon receipt of an indication of a selection of a member of the list of selectable user interface elements.

3. The method of claim 2, wherein the one or more patent concepts includes a technology category.

4. The method of claim 2, wherein the one or more patent concepts includes a scope concepts, the scope concept defining a scope to which a patent claim is limited.

5. The method of claim 1, wherein mapping the one or more patent claims to the patent concept further comprises:
    maintaining a database of patent claims, the database of patent claims including the one or more patent claims; and
    storing an indication of the mapping object in the database of patent claims.

6. The method of claim 5, wherein the indication of the mapping object includes an indication that the one or more patent claims are mapped to the patent concept.

7. A system comprising:
at least one processor; and
memory including instructions that, when executed by the at least one processor, cause the at least one processor to perform operations to:
maintain a database of patent portfolios and a database of patents, each patent stored in the database of patents associated with one or more patent portfolios stored in the database of patent portfolios;
generate a patent mapping graphical user interface including a search expression entry user interface element for receiving a search query that is automatically associated with a selected patent portfolio;
receive, via the search expression entry user interface element, a search query associated with a first patent portfolio;
search the first portfolio as a function of the search query;
generate, for display in the patent mapping graphical user interface, search results, the search results including one or more patent claims associated with the search query;
upon receipt of an indication of a selection of a patent mapping user interface element, display a patent concept graphical user interface that includes a patent concept entry user interface element for receipt of a patent concept and a selectable submission user interface element for submission of the patent concept;
upon receipt of an indication of a selection of the selectable submission user interface element, define a patent set based on the selection of the selectable submission user interface element, and generate a mapping object for each of the one or more patent claims, wherein the mapping object describes a relationship between the patent concept, a respective patent claim of the one or more patent claims, and an ontology;
add the mapped one or more patent claims to the patent set by applying the relationship described by the mapping object;
map the one or more patent claims to the patent concept using the mapping object for each of the one or more patent claims; and
display the mapped one or more patent claims in the patent mapping graphical user interface.

8. The system of claim 7, further comprising instructions to:
maintain a database of ontologies, wherein the ontologies include one or more patent concepts, wherein the patent concept entry user interface includes a list of selectable user interface elements associated with the one or more patent concepts, and wherein the patent concept is received upon receipt of an indication of a selection of a member of the list of selectable user interface elements.

9. The system of claim 8, wherein the one or more patent concepts includes a technology category.

10. The system of claim 8, wherein the one or more patent concepts includes a scope concepts, the scope concept defining a scope to which a patent claim is limited.

11. The system of claim 7, wherein the instructions to map the one or more patent claims to the patent concept further comprises instructions to:
maintain a database of patent claims, the database of patent claims including the one or more patent claims; and
store an indication of the mapping object in the database of patent claims.

12. The system of claim 11, wherein the indication of the mapping object includes an indication that the one or more patent claims are mapped to the patent concept.

13. The system of claim 11, wherein the indication of the mapping object includes an indication that the one or more patent claims are mapped to the patent concept.

14. At least one non-transitory machine-readable medium including instructions that, when executed by at least one processor, cause the at least one processor to perform operations to:
maintain a database of patent portfolios and a database of patents, each patent stored in the database of patents associated with one or more patent portfolios stored in the database of patent portfolios;
generate a patent mapping graphical user interface including a search expression entry user interface element for receiving a search query that is automatically associated with a selected patent portfolio;
receive, via the search expression entry user interface element, a search query associated with a first patent portfolio;
search the first portfolio as a function of the search query;
generate, for display in the patent mapping graphical user interface, search results, the search results including one or more patent claims associated with the search query;
upon receipt of an indication of a selection of a patent mapping user interface element, display a patent concept graphical user interface that includes a patent concept entry user interface element for receipt of a patent concept and a selectable submission user interface element for submission of the patent concept;
upon receipt of an indication of a selection of the selectable submission user interface element, define a patent set based on the selection of the selectable submission user interface element, and generate a mapping object for each of the one or more patent claims, wherein the mapping object describes a relationship between the patent concept, a respective patent claim of the one or more patent claims, and an ontology;
add the mapped one or more patent claims to the patent set by applying the relationship described by the mapping object;
map the one or more patent claims to the patent concept using the mapping object for each of the one or more patent claims; and
display the mapped one or more patent claims in the patent mapping graphical user interface.

15. The at least one non-transitory machine readable medium of claim 14, further comprising instructions to:
maintain a database of ontologies, wherein the ontologies include one or more patent concepts, wherein the patent concept entry user interface includes a list of selectable user interface elements associated with the one or more patent concepts, and wherein the patent concept is received upon receipt of an indication of a selection of a member of the list of selectable user interface elements.

16. The at least one non-transitory machine readable medium of claim 15, wherein the one or more patent concepts includes a technology category.

17. The at least one non-transitory machine readable medium of claim 15, wherein the one or more patent concepts includes a scope concepts, the scope concept defining a scope to which a patent claim is limited.

18. The at least one non-transitory machine readable medium of claim 14, wherein the instructions to map the one or more patent claims to the patent concept further comprises instructions to:
  maintain a database of patent claims, the database of patent claims including the one or more patent claims; and
  store an indication of the mapping object in the database of patent claims.

19. The at least one non-transitory machine readable medium of claim 18, wherein the indication of the mapping object includes an indication that the one or more claims are not mapped to the patent concept.

20. The at least one non-transitory machine readable medium of claim 18, wherein the indication of the mapping object includes an indication that the one or more patent claims are mapped to the patent concept.

* * * * *